United States Patent
Itano et al.

(10) Patent No.: US 12,180,408 B2
(45) Date of Patent: Dec. 31, 2024

(54) COMPOSITION CONTAINING REFRIGERANT, USE OF SAME, FREEZER HAVING SAME, AND METHOD FOR OPERATING SAID FREEZER

(71) Applicant: DAIKIN INDUSTRIES, LTD., Osaka (JP)

(72) Inventors: Mitsushi Itano, Osaka (JP); Shun Ohkubo, Osaka (JP); Daisuke Karube, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 366 days.

(21) Appl. No.: 17/549,392

(22) Filed: Dec. 13, 2021

(65) Prior Publication Data

US 2022/0177762 A1    Jun. 9, 2022

Related U.S. Application Data

(63) Continuation of application No. PCT/JP2020/024215, filed on Jun. 19, 2020.

(30) Foreign Application Priority Data

Jun. 19, 2019   (JP) .................. 2019-114158

(51) Int. Cl.
*C09K 5/04*   (2006.01)

(52) U.S. Cl.
CPC .......... *C09K 5/045* (2013.01); *C09K 2205/22* (2013.01); *C09K 2205/40* (2013.01)

(58) Field of Classification Search
CPC .................. C09K 5/045; C09K 2205/40
See application file for complete search history.

(56) References Cited

U.S. PATENT DOCUMENTS

| | | |
|---|---|---|
| 2016/0333243 A1 | 11/2016 | Fukushima et al. |
| 2016/0347981 A1 | 12/2016 | Fukushima |
| 2017/0002245 A1 | 1/2017 | Fukushima |
| 2019/0257553 A1 | 8/2019 | Ono et al. |

FOREIGN PATENT DOCUMENTS

| | | | |
|---|---|---|---|
| WO | 2015/115252 | 8/2015 | |
| WO | 2015/125534 | 8/2015 | |
| WO | WO-2015115252 A1 * | 8/2015 | ............ C07C 21/18 |
| WO | 2015/141678 | 9/2015 | |

(Continued)

OTHER PUBLICATIONS

Arai, Working medium for heat cycle, composition for heat cycle system, and heat cycle system, 2015, Full Document (Year: 2015).*

(Continued)

*Primary Examiner* — Nael N Babaa
(74) *Attorney, Agent, or Firm* — Wenderoth, Lind & Ponack, L.L.P.

(57) ABSTRACT

An object of the present disclosure is to provide a novel low-GWP mixed refrigerant. To solve this problem, the present disclosure provides a composition comprising a refrigerant, the refrigerant comprising trans-1,2-difluoroethylene (HFO-1132 (E)), trifluoroethylene (HFO-1123), 1,3,3,3-tetrafluoropropene (R1234ze), and difluoromethane (R32).

16 Claims, 17 Drawing Sheets

(56) References Cited

FOREIGN PATENT DOCUMENTS

WO    2018/047816    3/2018

OTHER PUBLICATIONS

International Search Report issued Sep. 1, 2020 in International (PCT) Application No. PCT/JP2020/024215.
Extended European Search Report issued Aug. 16, 2023 in European Patent Application No. 20827425.8.
International Preliminary Report on Patentability issued Dec. 19, 2021 in International (PCT) Application No. PCT/JP2020/024215.

* cited by examiner

COMPOSITION CONTAINING REFRIGERANT, USE OF SAME, FREEZER HAVING SAME, AND METHOD FOR OPERATING SAID FREEZER

TECHNICAL FIELD

The present disclosure relates to a composition comprising a refrigerant, use of the composition, a refrigerating machine having the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$: HFC-32 or R32) and pentafluoroethane ($C_2HF_5$: HFC-125 or R125), and is a pseudo-azeotropic composition.

However, the global warming potential (GWP) of R410A is 2088. Due to growing concerns about global warming, R32, which has a GWP of 675, has been increasingly used.

For this reason, various low-GWP mixed refrigerants that can replace R410A have been proposed (PTL 1).

CITATION LIST

Patent Literature

PTL 1: WO2015/141678

SUMMARY

A composition comprising a refrigerant, the refrigerant comprising trans-1,2-difluoroethylene (HFO-1132 (E)), trifluoroethylene (HFO-1123), 1,3,3,3-tetrafluoropropene (R1234ze), and difluoromethane (R32).

Advantageous Effects

The refrigerant according to the present disclosure has a low GWP.

DESCRIPTION OF EMBODIMENTS

Figure 1:
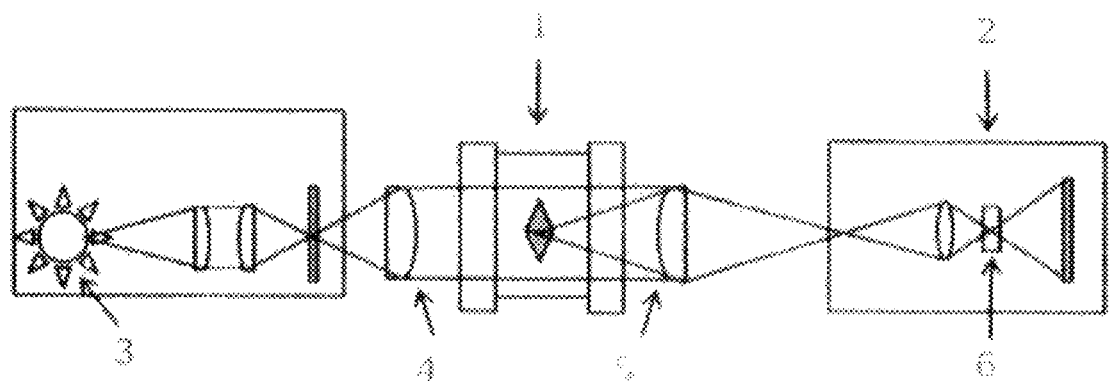
FIG. 1 is a schematic view of an apparatus used in a flammability test.
Figure 2:
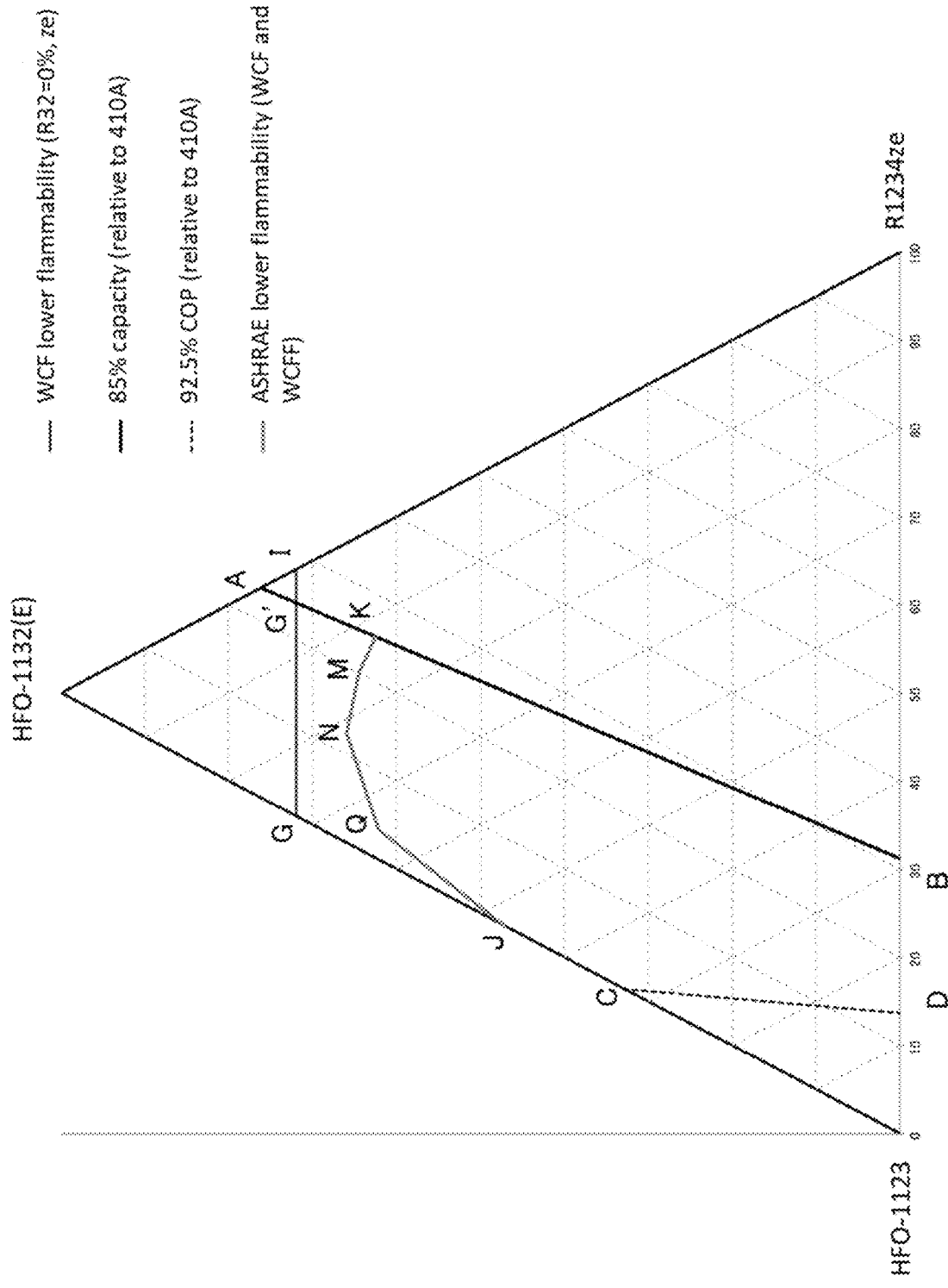
FIG. 2 is a diagram showing points A to D, G, G', I to K, N, M, I, and Q, and line segments that connect these points to each other in a ternary composition diagram in which the sum of HFO-1132 (E), HFO-1123, and R1234ze is 100 mass %.
Figure 3:
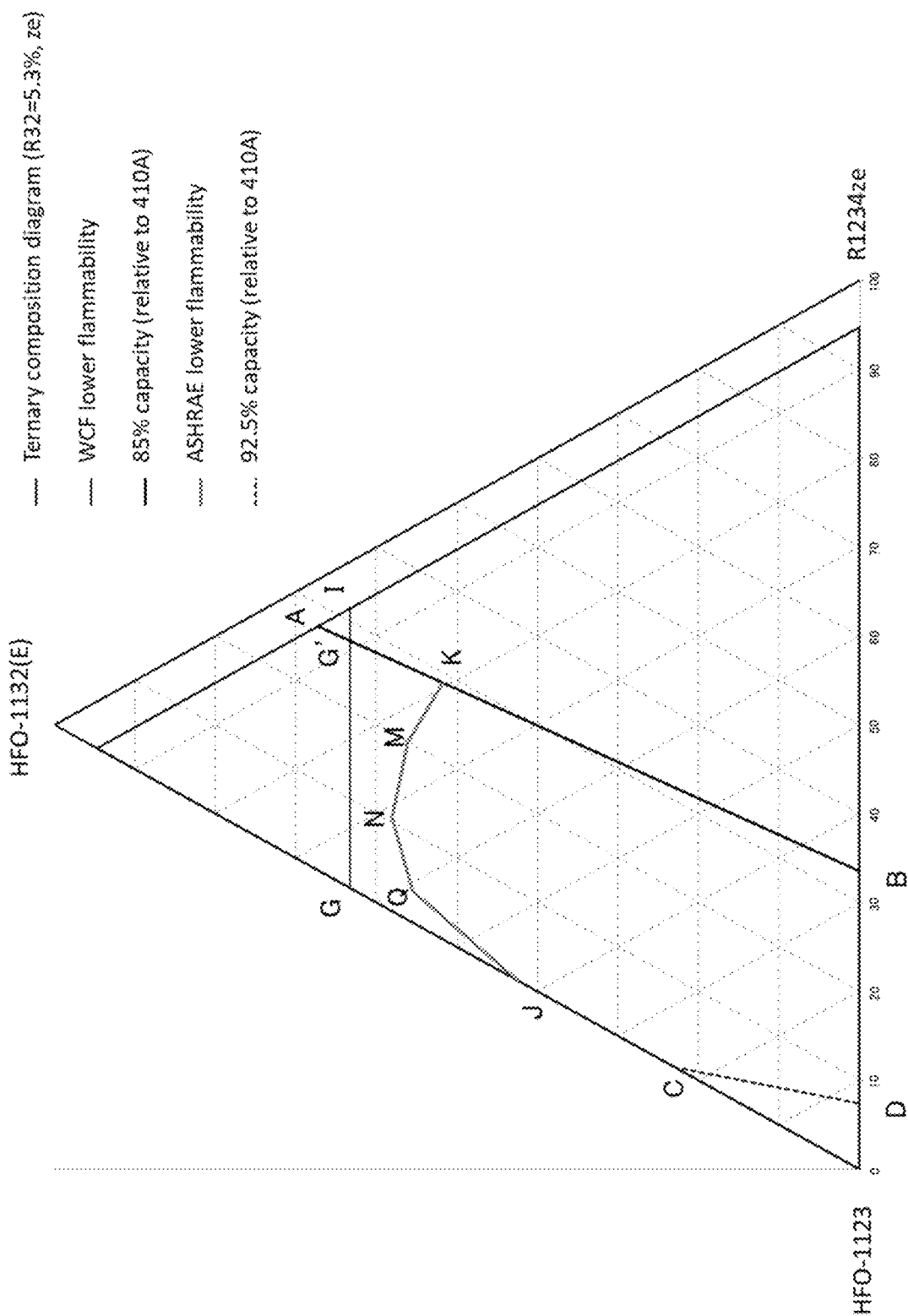
FIG. 3 is a diagram showing points A to D, G, G', I to K, N, M, I, and Q, and line segments that connect these points to each other in a ternary composition diagram in which the sum of HFO-1132 (E), HFO-1123, and R1234ze is 94.7 mass % (R32 content is 5.3 mass %).
Figure 4:
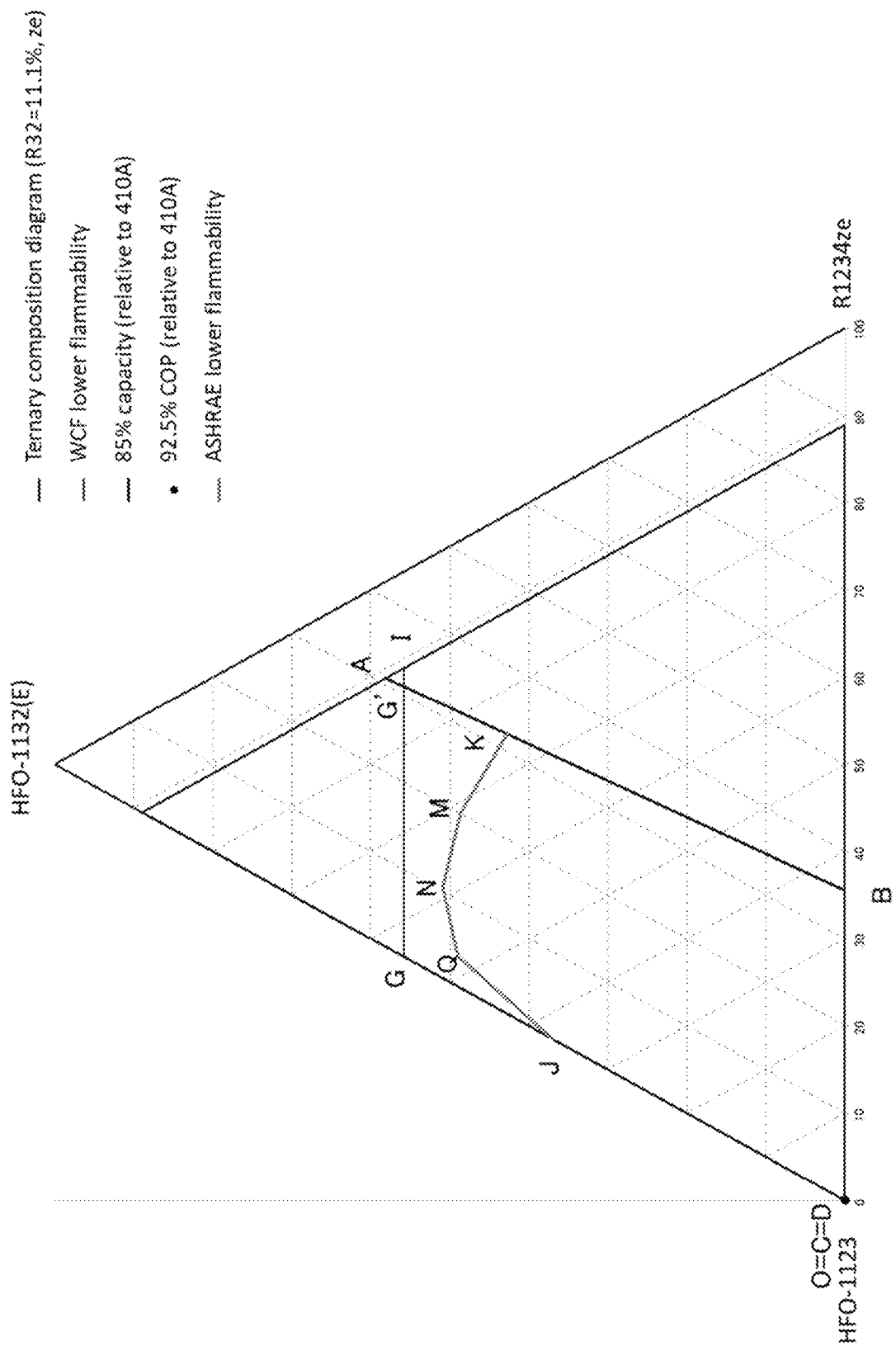
FIG. 4 is a diagram showing points A to D, G, G', I to K, N, M, I, and Q, and line segments that connect these points to each other in a ternary composition diagram in which the sum of HFO-1132 (E), HFO-1123, and R1234ze is 88.9 mass % (R32 content is 11.1 mass %).
Figure 5:
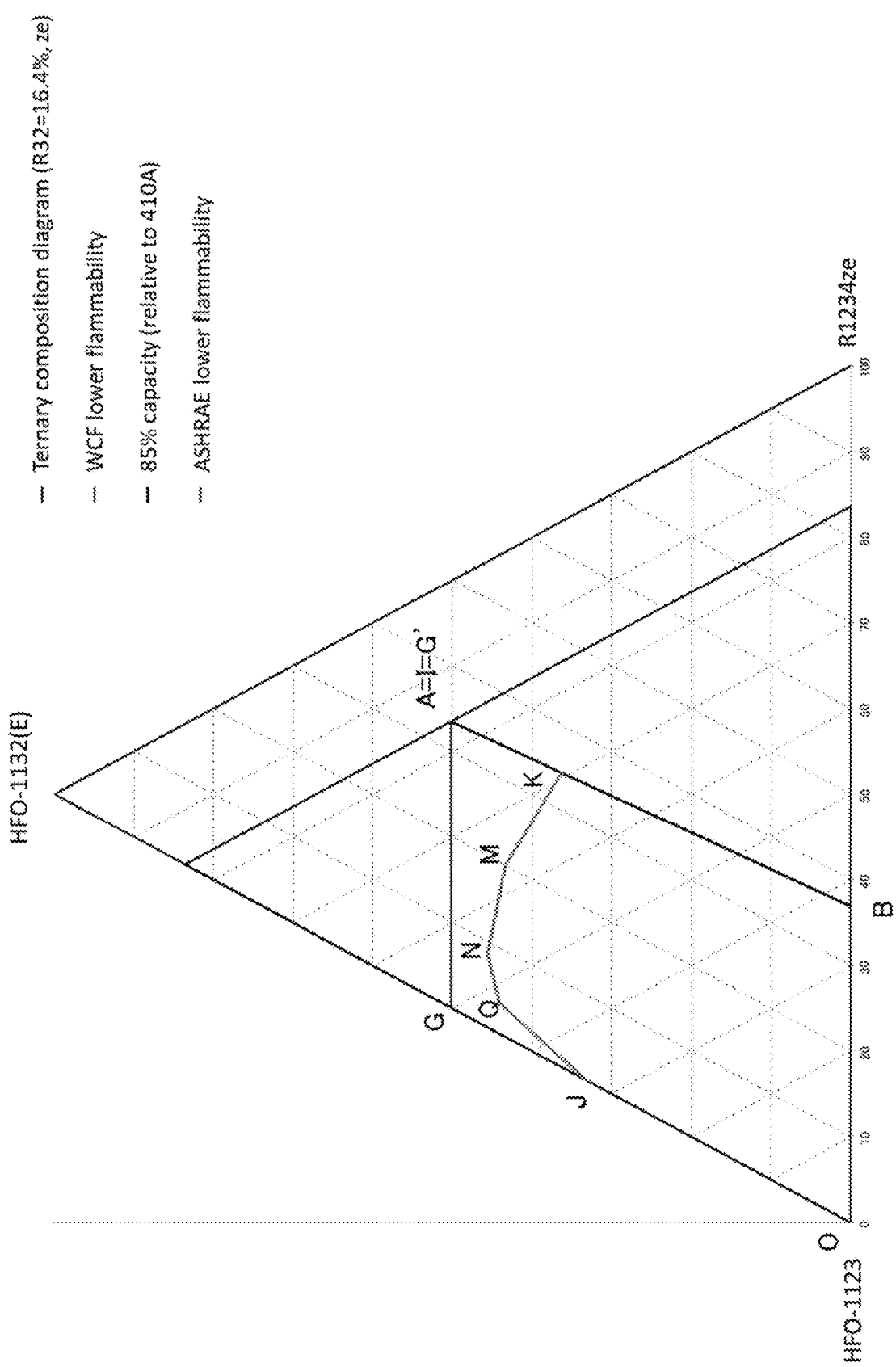
FIG. 5 is a diagram showing points A, B, G, G', I to K, N, M, I, O, and Q, and line segments that connect these points to each other in a ternary composition diagram in which the sum of HFO-1132 (E), HFO-1123, and R1234ze is 83.6 mass % (R32 content is 16.4 mass %).
Figure 6:
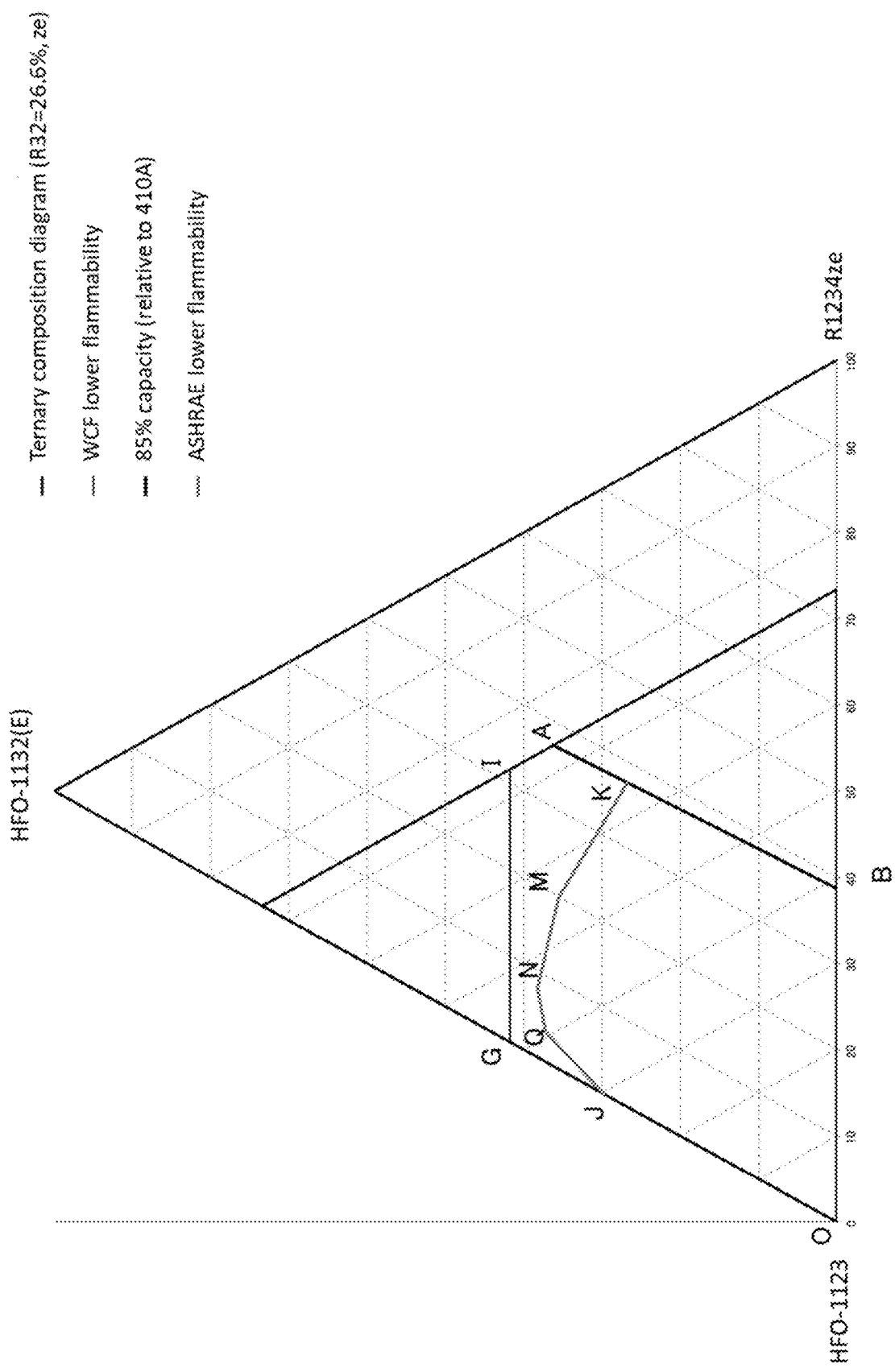
FIG. 6 is a diagram showing points A, B, G, I to K, N, M, I, O, and Q, and line segments that connect these points to each other in a ternary composition diagram in which the sum of HFO-1132 (E), HFO-1123, and R1234ze is 73.4 mass % (R32 content is 26.6 mass %).
Figure 7:
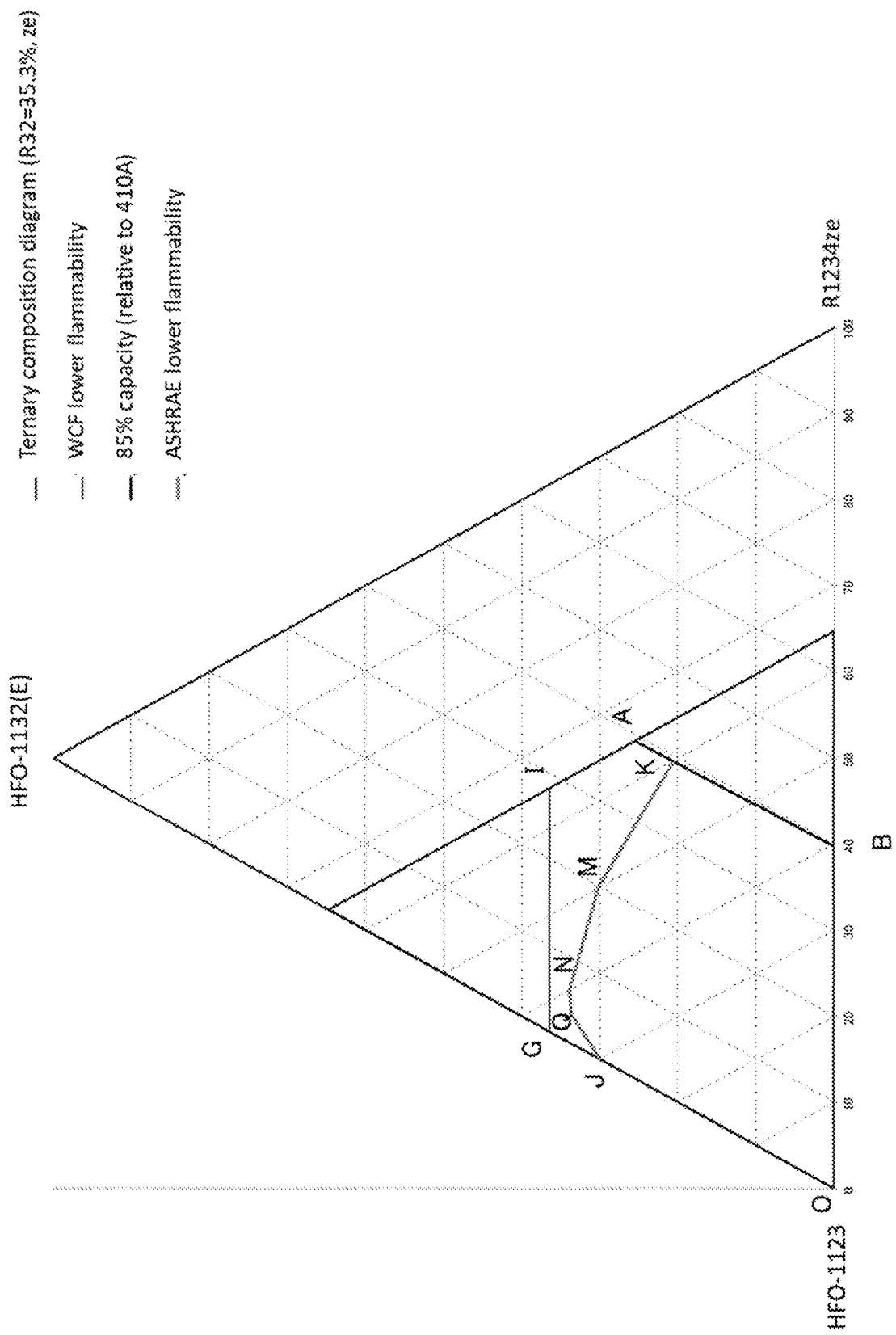
FIG. 7 is a diagram showing points A, B, G, I to K, N, M, I, O, and Q, and line segments that connect these points to each other in a ternary composition diagram in which the sum of HFO-1132 (E), HFO-1123, and R1234ze is 64.7 mass % (R32 content is 35.3 mass %).
Figure 8:
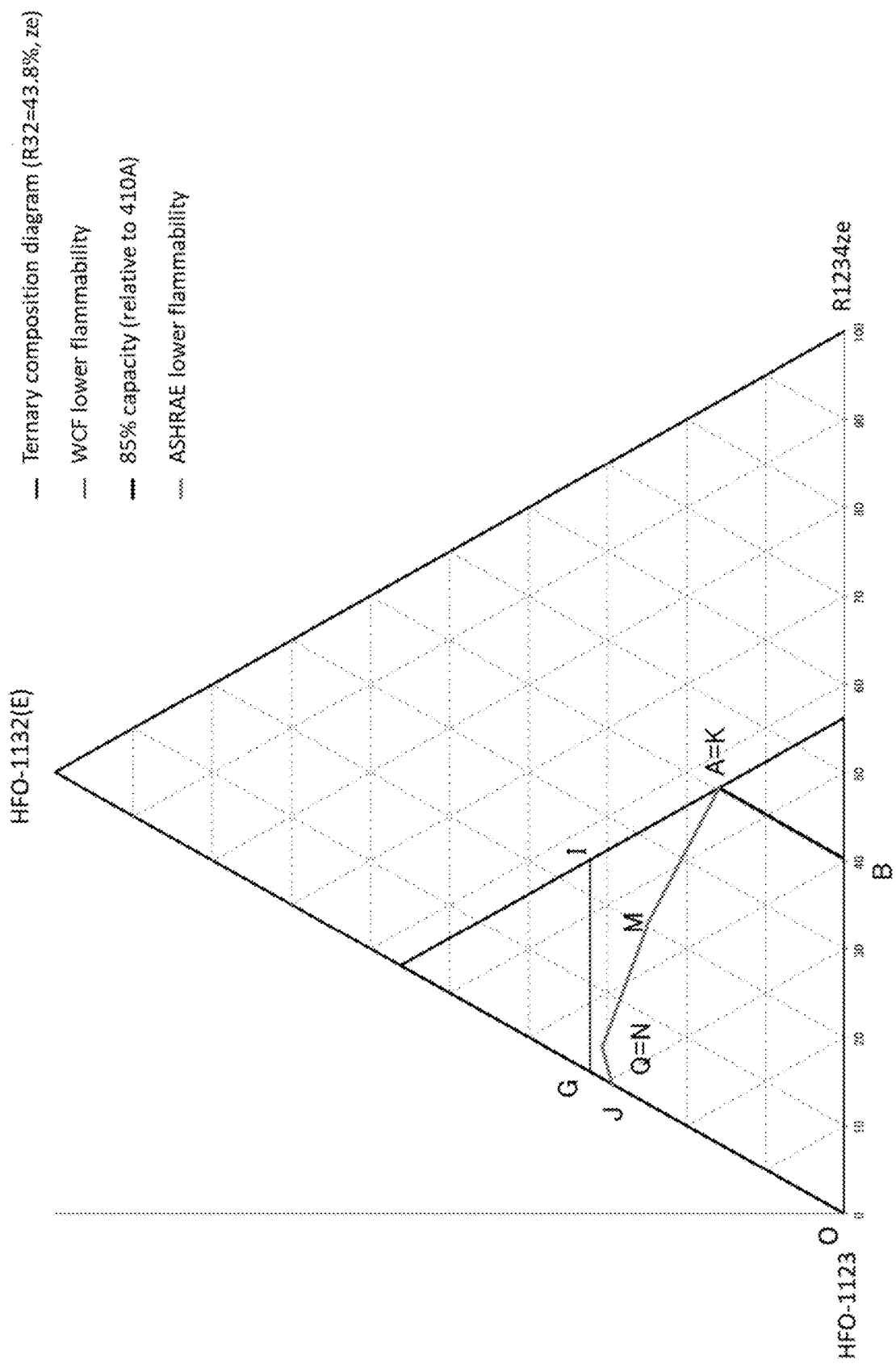
FIG. 8 is a diagram showing points A, B, G, I to K, N, M, I, O, and Q, and line segments that connect these points to each other in a ternary composition diagram in which the sum of HFO-1132 (E), HFO-1123, and R1234ze is 56.2 mass % (R32 content is 43.8 mass %).
Figure 9:
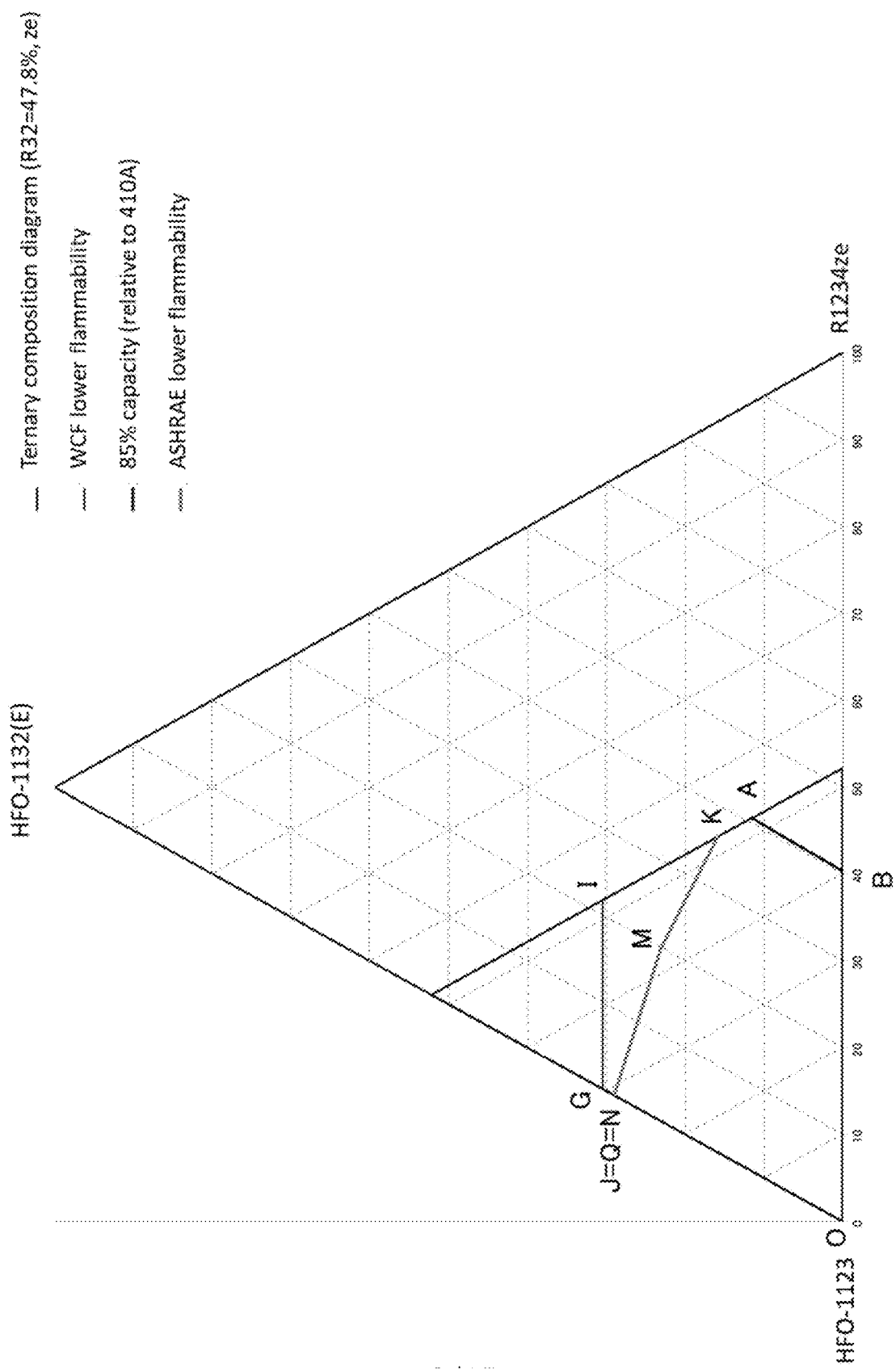
FIG. 9 is a diagram showing points A, B, G, I to K, N, M, I, O, and Q, and line segments that connect these points to each other in a ternary composition diagram in which the sum of HFO-1132 (E), HFO-1123, and R1234ze is 52.2 mass % (R32 content is 47.8 mass %).
Figure 10:
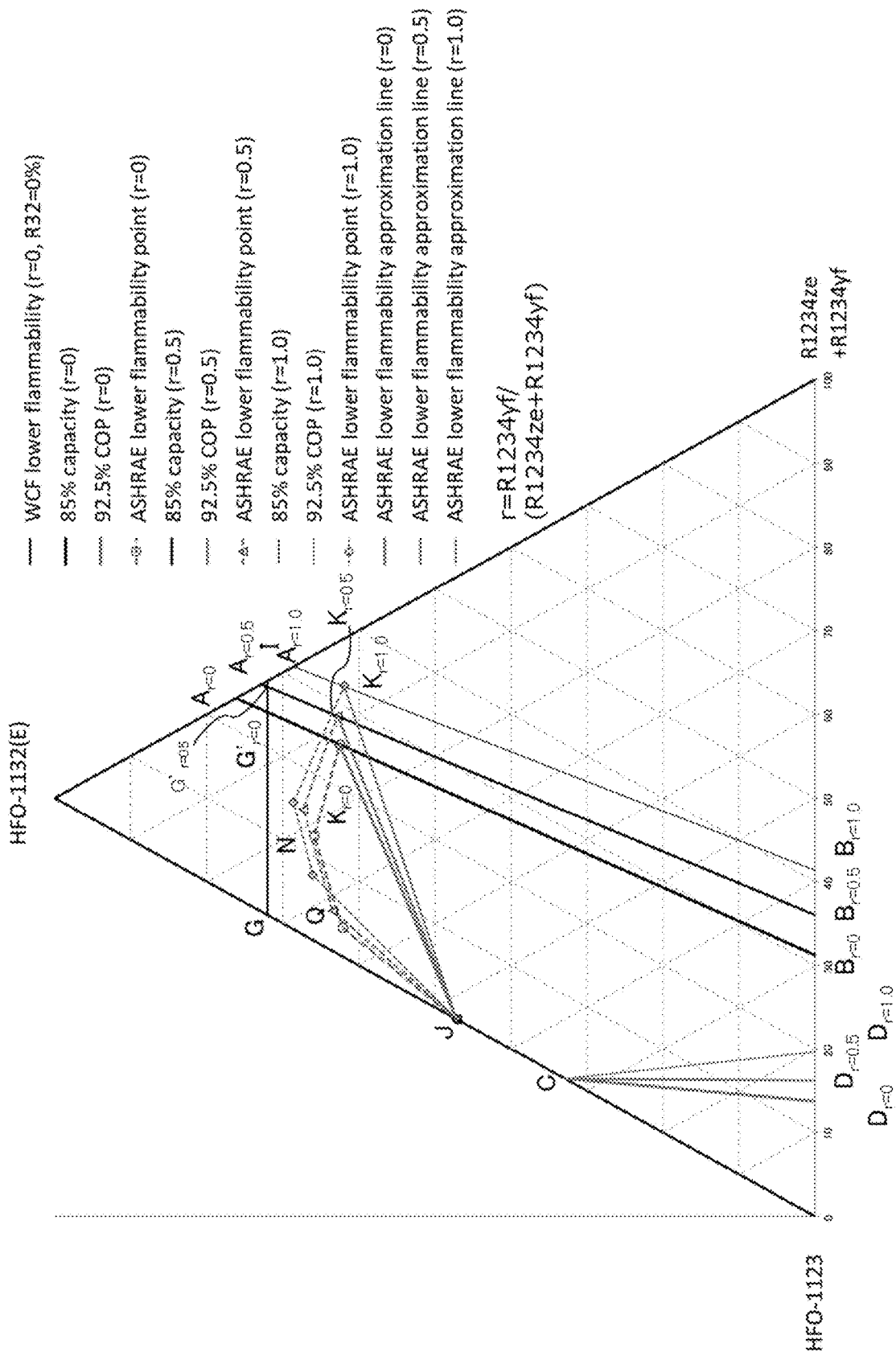
FIG. 10 is a diagram showing points $A_r$, $B_r$, C, $D_r$, G, $G'_r$, J, and $K_r$, and line segments that connect these points to each other in a ternary composition diagram in which the sum of HFO-1132 (E), HFO-1123, R1234yf, and R1234ze is 100 mass %.
Figure 11:
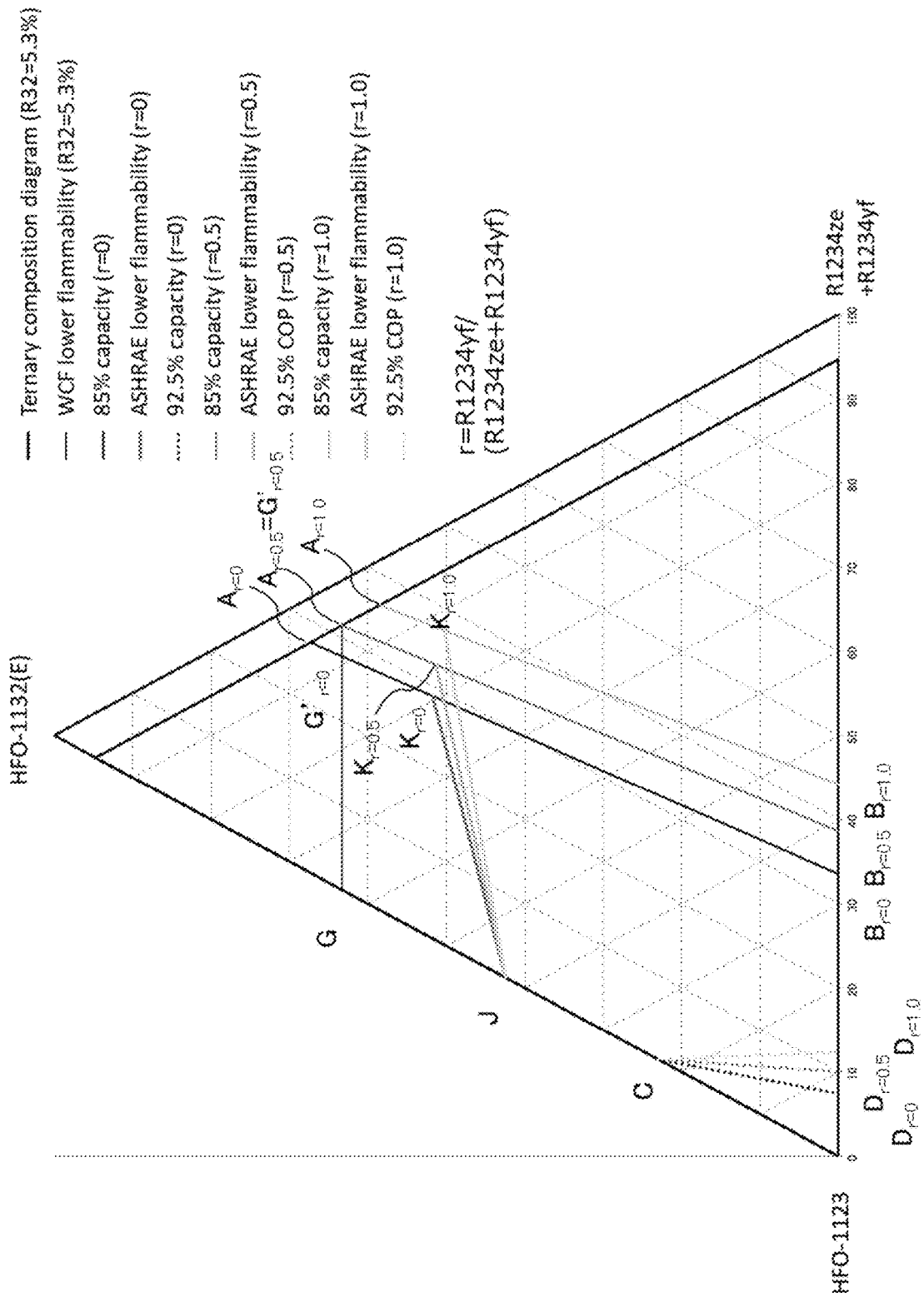
FIG. 11 is a diagram showing points $A_r$, $B_r$, C, $D_r$, G, $G'_r$, J, and $K_r$, and line segments that connect these points to each other in a ternary composition diagram in which the sum of HFO-1132 (E), HFO-1123, R1234yf, and R1234ze is 94.7 mass % (R32 content is 5.3 mass %), when the ratio of R1234yf to the sum of R1234yf and R1234ze is r.
Figure 12:
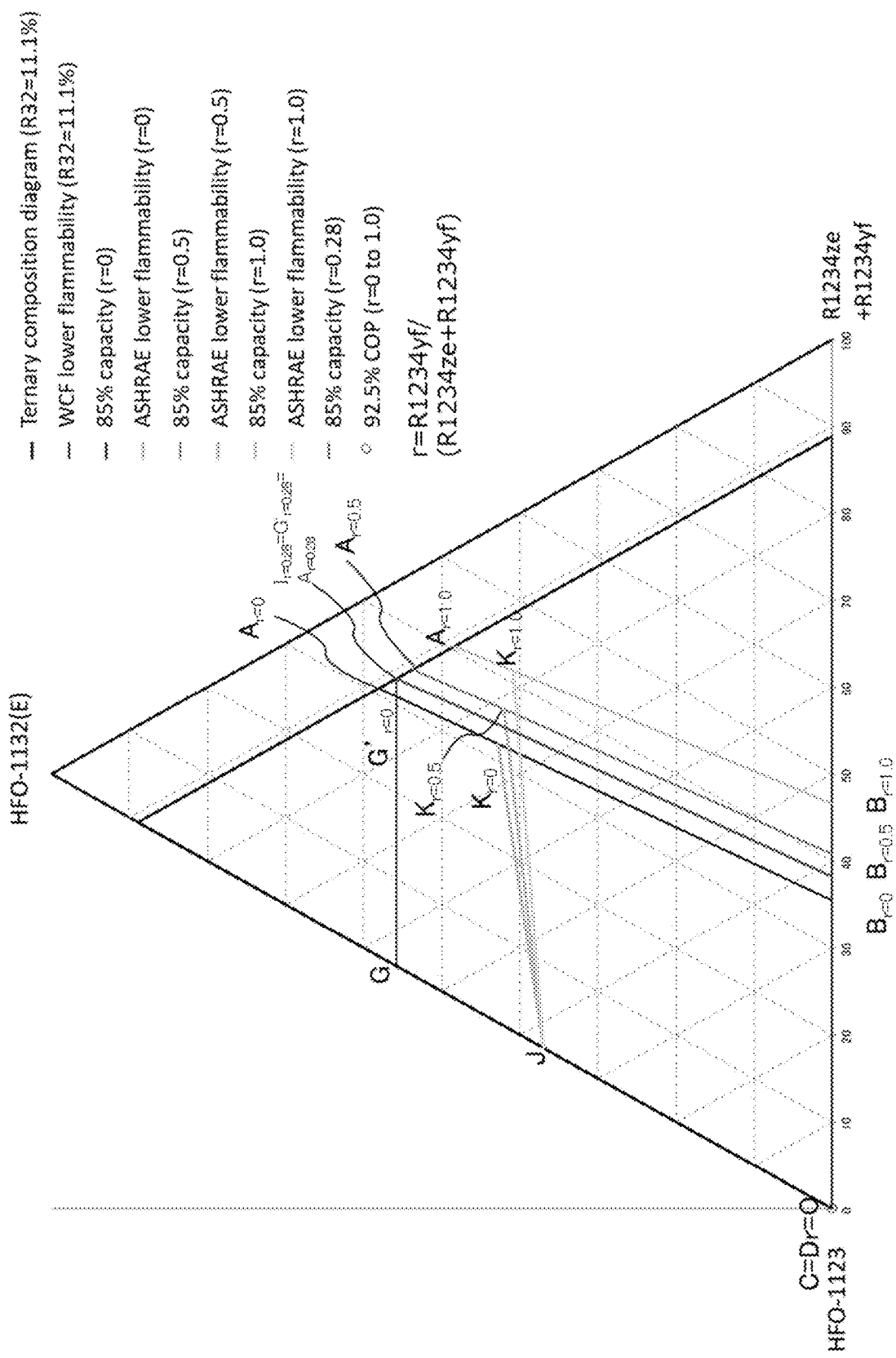
FIG. 12 is a diagram showing points $A_r$, $B_r$, C, $D_r$, G, $G'_r$, J, $K_r$, and O, and line segments that connect these points to each other in a ternary composition diagram in which the sum of HFO-1132 (E), HFO-1123, R1234yf, and R1234ze is 88.9 mass % (R32 content is 11.1 mass %), when the ratio of R1234yf to the sum of R1234yf and R1234ze is r.
Figure 13:
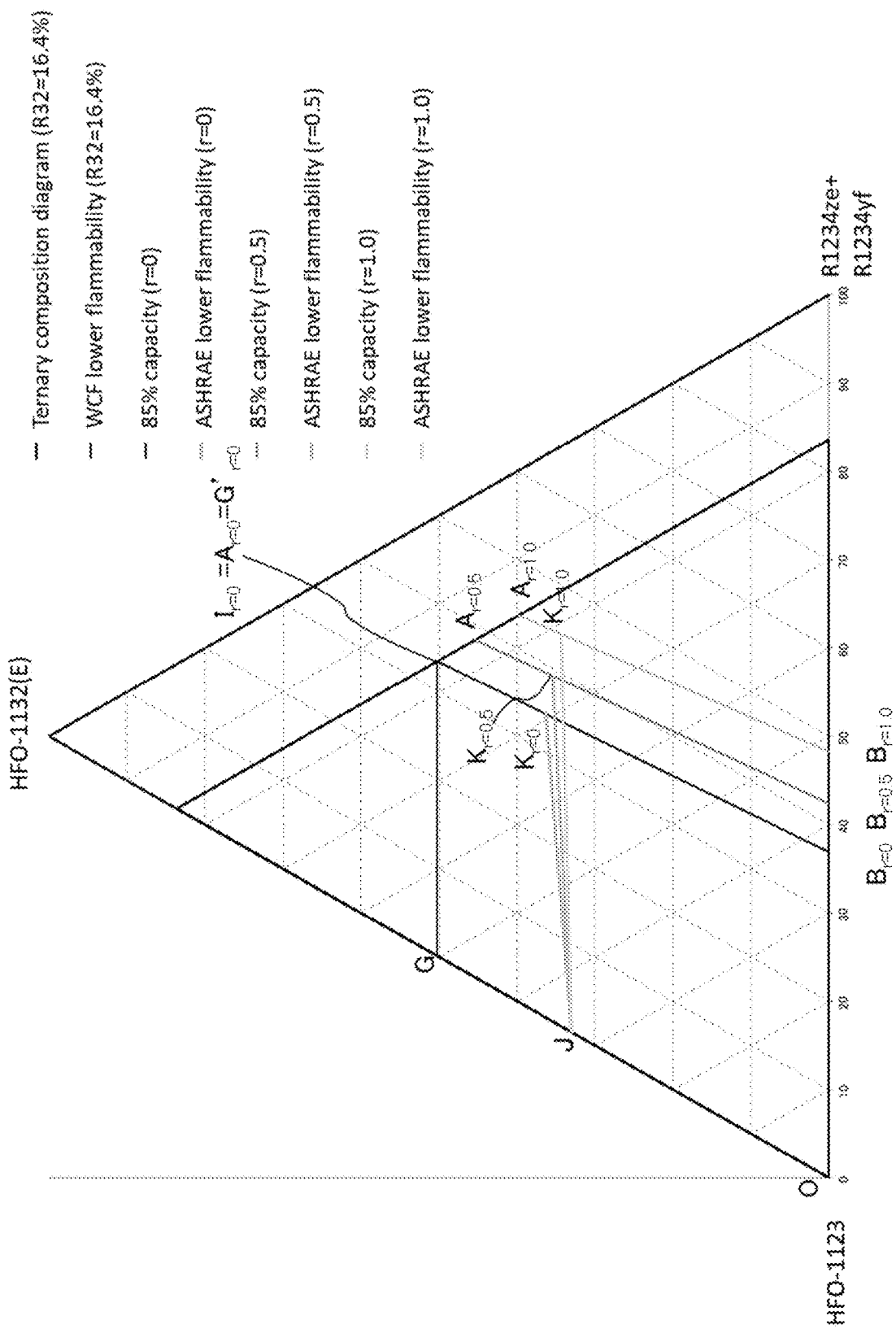
FIG. 13 is a diagram showing points $A_r$, $B_r$, G, $I_r$, J, $K_r$, and O, and line segments that connect these points to each other in a ternary composition diagram in which the sum of HFO-1132 (E), HFO-1123, R1234yf, and R1234ze is 83.6 mass % (R32 content is 16.4 mass %), when the ratio of R1234yf to the sum of R1234yf and R1234ze is r.
Figure 14:
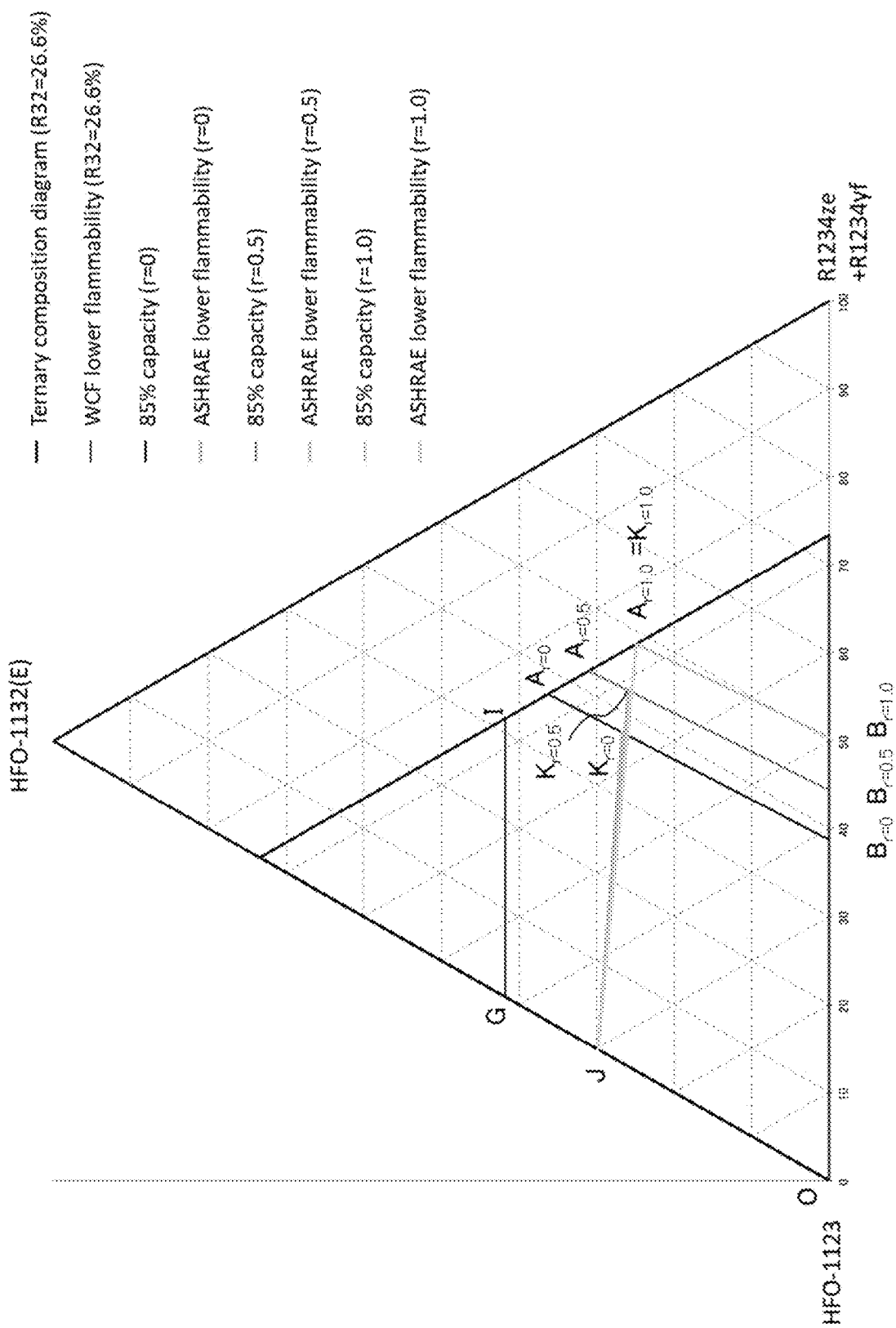
FIG. 14 is a diagram showing points $A_r$, $B_r$, G, I, J, $K_r$, and O, and line segments that connect these points to each other in a ternary composition diagram in which the sum of HFO-1132 (E), HFO-1123, R1234yf, and R1234ze is 73.4 mass % (R32 content is 26.6 mass %), when the ratio of R1234yf to the sum of R1234yf and R1234ze is r.
Figure 15:
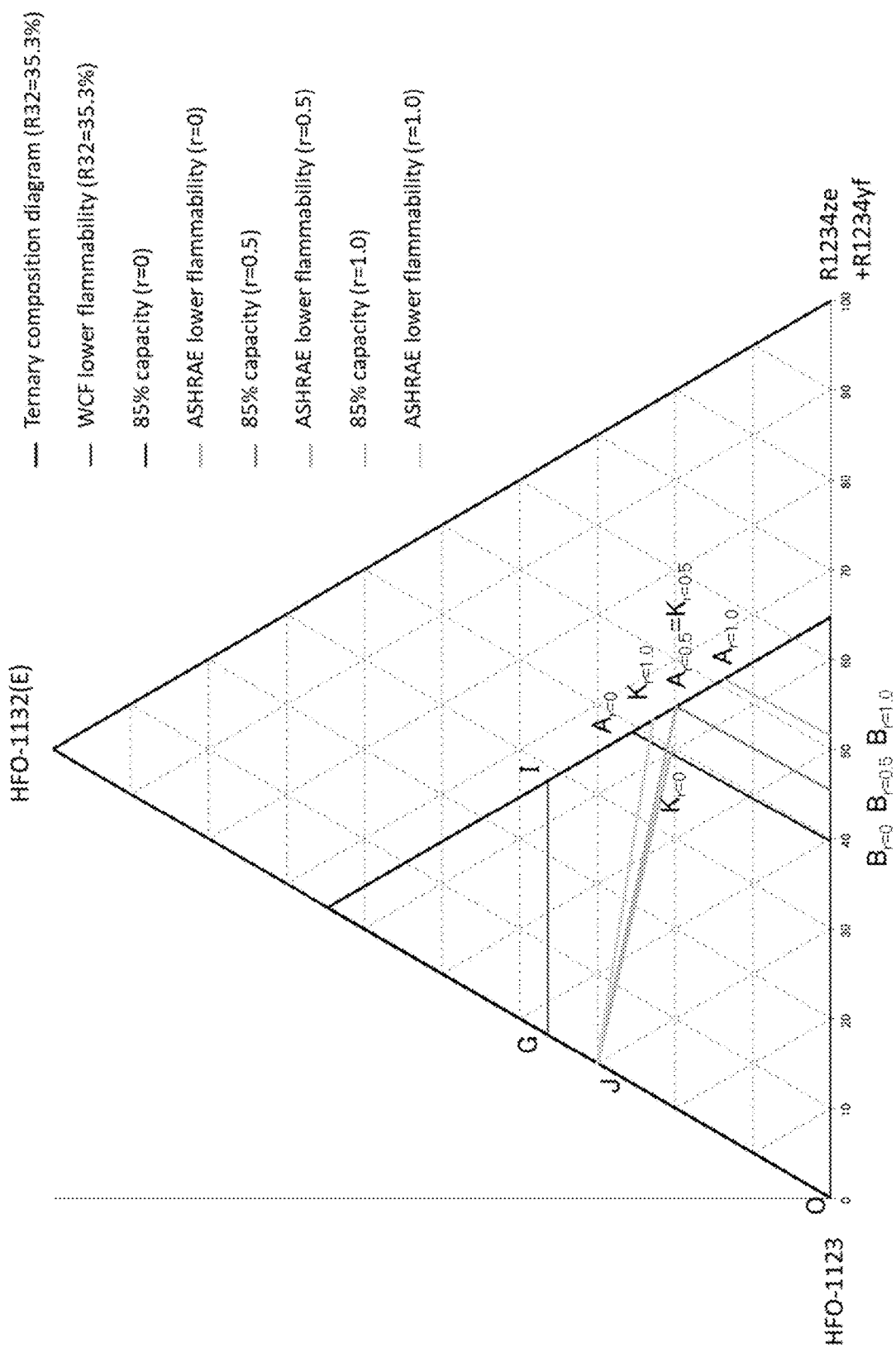
FIG. 15 is a diagram showing points G, I, J, $K_r$, and O, and line segments that connect these points to each other in a ternary composition diagram in which the sum of HFO-1132 (E), HFO-1123, R1234yf, and R1234ze is 64.7 mass % (R32 content is 35.3 mass %), when the ratio of R1234yf to the sum of R1234yf and R1234ze is r.
Figure 16:
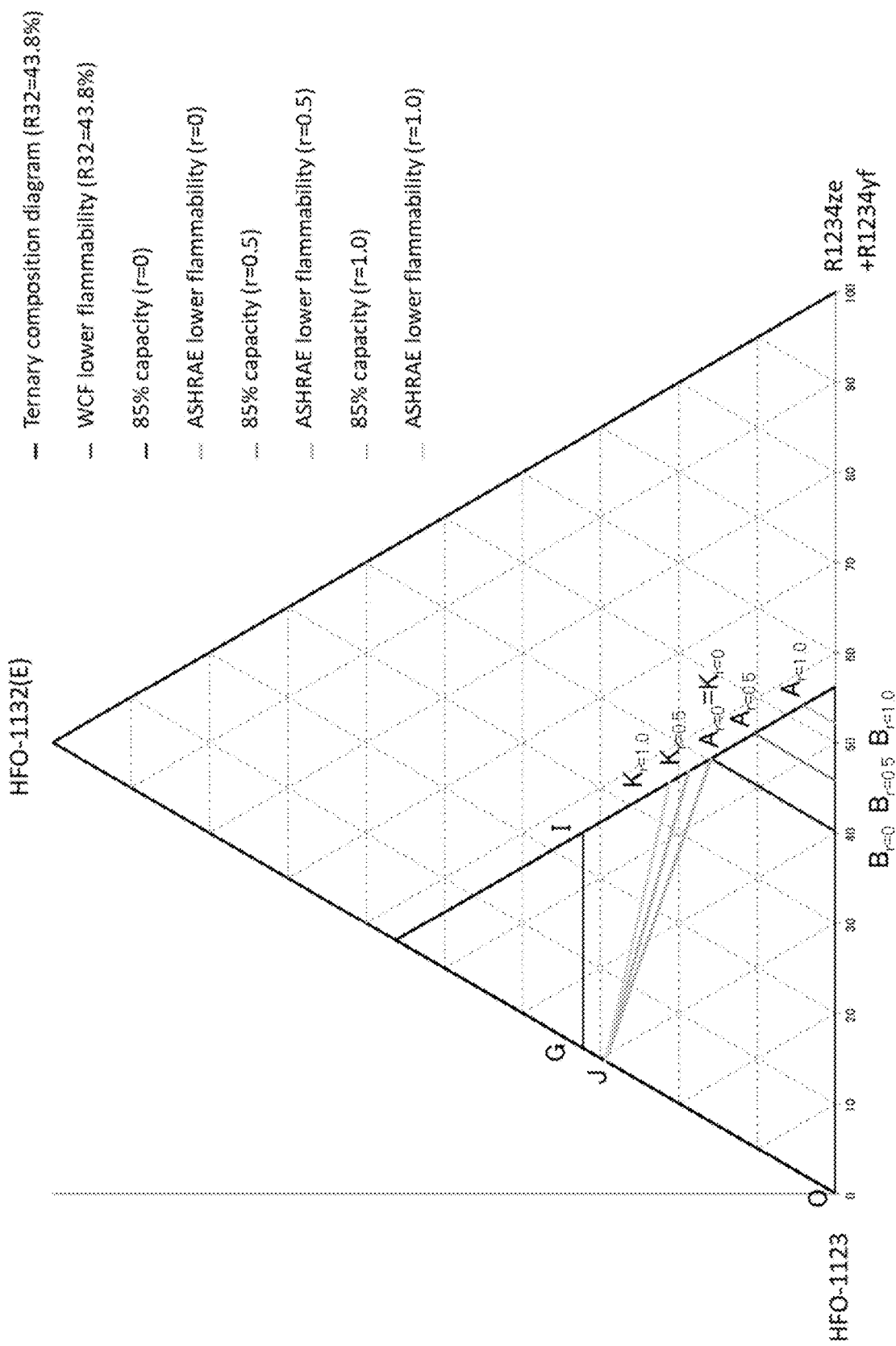
FIG. 16 is a diagram showing points $A_r$, $B_r$, G, I, J, $K_r$, and O, and line segments that connect these points to each other in a ternary composition diagram in which the sum of HFO-1132 (E), HFO-1123, R1234yf, and R1234ze is 56.2 mass % (R32 content is 43.8 mass %), when the ratio of R1234yf to the sum of R1234yf and R1234ze is r.
Figure 17:
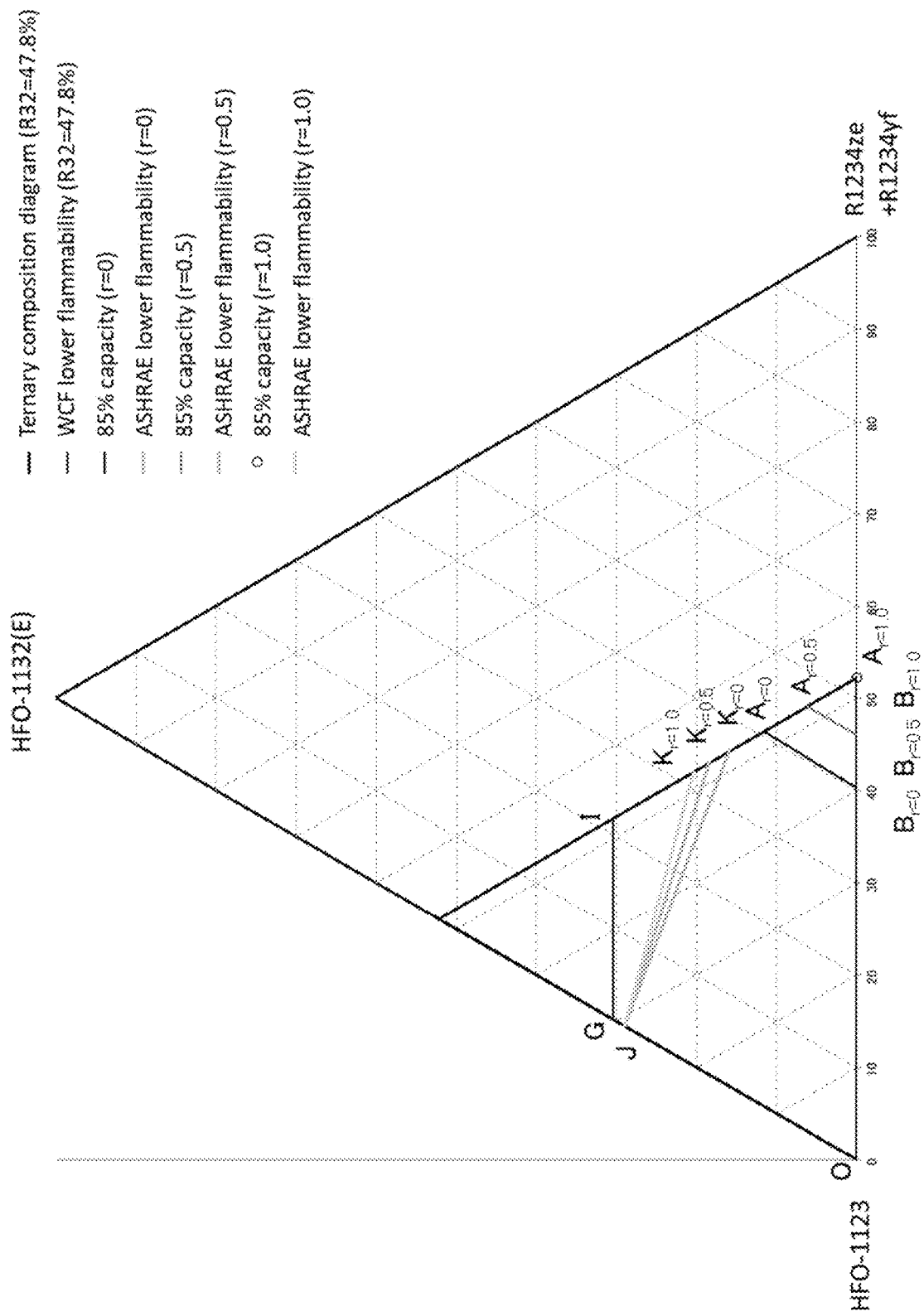
FIG. 17 is a diagram showing points $A_r$, $B_r$, G, I, J, $K_r$, and O, and line segments that connect these points to each other in a ternary composition diagram in which the sum of HFO-1132 (E), HFO-1123, R1234yf, and R1234ze is 52.2 mass % (R32 content is 47.8 mass %), when the ratio of R1234yf to the sum of R1234yf and R1234ze is r.

The present inventors conducted intensive studies to solve the above problems, and consequently found that a mixed refrigerant comprising trans-1,2-difluoroethylene (HFO-1132 (E)), 2,3,3,3-tetrafluoro-1-propene (R1234yf), trifluoroethylene (HFO-1123), and difluoromethane (R32) has the above properties.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that the flammability classification according to the US ANSI/ASHRAE Standard 34-2013 is determined to be classified as "Class 2L."

1. Refrigerant

1.1 Refrigerant Component

The refrigerant according to the present disclosure comprises trans-1,2-difluoroethylene (HFO-1132 (E)), trifluoroethylene (HFO-1123), 2,3,3,3-tetrafluoro-1-propene (R1234yf), and difluoromethane (R32). In this specification, this refrigerant is sometimes referred to as "Refrigerant 1."

The refrigerant according to the present disclosure may further comprise 2,3,3,3-tetrafluoro-1-propene (R1234yf). This refrigerant is sometimes referred to as "Refrigerant 2" in this specification. The refrigerants according to the present disclosure have a low GWP.

The refrigerant according to the present disclosure is preferably a refrigerant wherein
when the mass % of HFO-1132 (E), HFO-1123, R1234ze, and R32 based on their sum is respectively represented by x, y, z, and a,
if $0 < a \leq 11.1$, coordinates (x,y,z) in a ternary composition diagram in which the sum of HFO-1132 (E), HFO-1123, and R1234ze is (100−a) mass % are within the range of a figure surrounded by straight lines GG', G'B, BD, DC, and CG that connect the following 5 points:
point G $(0.0314a^2 - 1.8079a + 72.0, 100-a-x, 0.0)$,
point G' $(0.0314a^2 - 1.8079a + 72.0, -0.0199a^2 + 0.0677a + 3.8, 100-a-x-y)$,
point B $(0.0, 0.0057a^2 - 1.4197a + 68.462, 100-a-y)$,
point D $(0.0, 0.0234a^2 + 0.0647a + 86.3, 100-a-y)$, and
point C $(-0.189a^2 - 0.8664a + 32.9, 100-a-x, 0.0)$,
or on the straight lines GG', G'B, and DC (excluding point B, point D, point C, and point G);
if $11.1 < a \leq 16.4$, coordinates (x,y,z) in the ternary composition diagram are within the range of a figure surrounded by straight lines GG', G'B, BO, and OG that connect the following 4 points:
point G $(0.015a^2 - 1.4701a + 70.266, 100-a-x, 0.0)$,
point G' $(-1.0566a + 67.528, -0.3962a + 6.4981, 100-a-x-y)$,
point B $(0.0, 0.0057a^2 - 1.4197a + 68.462, 100-a-y)$, and
point O $(0.0, 100-a, 0.0)$,
or on the straight lines GG' and G'B (excluding point B, point O, and point G);

if 16.4<a≤26.6, coordinates (x,y,z) in the ternary composition diagram are within the range of a figure surrounded by straight lines GI, IA, AB, BO, and OG that connect the following 5 points:
point G ($0.015a^2-1.4701a+70.266$, 100−a−x, 0.0),
point I ($0.015a^2-1.4701a+70.266$, 0.0, 100−a−x),
point A ($0.0076a^2-1.7a+76.031$, 0.0, 100−a−x),
point B (0.0, $0.0057a^2-1.4197a+68.462$, 100−a−y), and
point O (0.0, 100−a, 0.0),
or on the straight lines GI and AB (excluding point C, point I, point A, and point B);
if 26.6<a≤43.8, coordinates (x,y,z) in the ternary composition diagram are within the range of a figure surrounded by straight lines GI, IA, AB, BO, and OG that connect the following 5 points:
point G ($0.00738a^2-1.0762a+65.22$, 100−a−x, 0.0),
point I ($0.00738a^2-1.0762a+65.22$, 0.0, 100−a−x),
point A ($0.00582a^2-1.5915a+74.4$, 0.0, 100−a−x),
point B (0.0, $0.00328a^2-1.3169a+67.421$, 100−a−y), and
point O (0.0, 100−a, 0.0),
or on the straight lines GI and AB (excluding point G, point I, point A, and point B); and
if 43.8<a≤47.8, coordinates (x,y,z) in the ternary composition diagram are within the range of a figure surrounded by straight lines GI, IA, AB, BO, and OG that connect the following 5 points:
point G (−0.45a+51.91, 100−a−x, 0.0),
point I (−0.45a+51.91, 0.0, 100−a−x),
point A (−1.075a+62.985, 0.0, 100−a−x),
point B (0.0, −1.025a+60.895, 100−a−y), and
point O (0.0, 100−a, 0.0),
or on the straight lines GI and AB (excluding point G, point I, point A, and point B). When the requirements above are satisfied, the refrigerant according to the present disclosure has a refrigerating capacity ratio of 85% or more relative to that of R410A, and a COP ratio of 92.5% or more relative to that of R410A, and further ensures a WCF lower flammability.

The refrigerant according to the present disclosure is preferably a refrigerant wherein
when the mass % of HFO-1132 (E), HFO-1123, R1234ze, and R32 based on their sum is respectively represented by x, y, z, and a,
if 0<a≤11.1, coordinates (x,y,z) in a ternary composition diagram in which the sum of HFO-1132 (E), HFO-1123, and R1234ze is (100−a) mass % are within the range of a figure surrounded by straight lines JQ, QN, NM, MK, KB, BD, DC, and CJ that connect the following 8 points:
point J (100−a−y, $0.0072a^2-0.1704a+52.9$, 0.0),
point Q ($0.0112a^2-1.3048a+62.1$, 96.5−a−x, 3.5),
point N ($0.0207a^2-1.5817a+65.9$, $-0.0547a^2+1.1392a+21.6$, 100−a−x−Y),
point M ($0.0278a^2-1.7325a+64.5$, 80.0−a−x, 20.0),
point K ($0.0421a^2-2.2419a+62.5$, 100−a−x−z, $-0.0132a^2+0.768a+25.1$),
point B (0.0, $0.0057a^2-1.4197a+68.462$, 100−a−y),
point D (0.0, $0.0234a^2+0.0647a+86.3$, 100−a−y), and
point C ($-0.189a^2-0.8664a+32.9$, 100−a−x, 0.0),
or on the straight lines JQ, QN, NM, MK, and KB (excluding point J and point B);
if 11.1<a≤26.6, coordinates (x,y,z) in the ternary composition diagram are within the range of a figure surrounded by straight lines JQ, QN, NM, MK, KB, BO, and OJ that connect the following 7 points:
point J (100−a−y, $-0.0285a^2+0.5371a+49.443$, 0.0),
point Q ($0.0166a^2-1.382a+62.291$, 96.5−a−x, 3.5),
point N ($0.0183a^2-1.5044a+65.339$, $-0.0395a^2+1.4643a+16.116$, 100−a−x−y),
point M ($0.0145a^2-1.4001a+62.448$, 80.0−a−x, 20.0),
point K ($0.0184a^2-1.7325a+59.763$, 100−a−x−z, $-0.009a^2+0.6996a+25.34$),
point B (0.0, $0.0057a^2-1.4197a+68.462$, 100−a−y), and
point O (0.0, 100−a, 0.0),
or on the straight lines JQ, QN, NM, MK, and KB (excluding point J and point B);
if 26.6<a≤43.8, coordinates (x,y,z) in the ternary composition diagram are within the range of a figure surrounded by straight lines JQ, QN, NM, MK, KB, BO, and OJ that connect the following 7 points:
point J (100−a−y, $0.00542a^2-1.3598a+75.92$, 0.0),
point Q ($0.0049a^2-0.728a+53.204$, 96.5−a−x, 3.5),
point N ($0.0075a^2-0.971a+58.81$, $-0.0038a^2-0.0303a+30.581$, 100−a−x−y),
point M ($0.0019a^2-0.7375a+53.782$, 80.0−a−x, 20.0),
point K ($0.0086a^2-1.2345a+53.442$, 100−a−x−z, $-0.0045a^2+0.4752a+28.157$),
point B (0.0, $0.00328a^2-1.3169a+67.421$, 100−a−y), and
point O (0.0, 100−a, 0.0),
or on the straight lines JQ, QN, NM, MK, and KB (excluding point J and point B); and
if 43.8<a≤47.8, coordinates (x,y,z) in the ternary composition diagram are within the range of a figure surrounded by straight lines JN, NM, MK, KA, AB, BO, and OJ that connect the following 7 points:
point J (100−a−y, −0.9a+66.22, 0.0),
point N (−0.425a+49.315, −0.3a+8.86, 100−a−x−y),
point M (−0.525a+48.095, 80.0−a−x, 20.0),
point K (15.9, 0.0, 84.1−a),
point A (−1.075a+62.985, 0.0, 100−a−x),
point B (0.0, −1.025a+60.895, 100−a−y), and
point O (0.0, 100−a, 0.0),
or on the straight lines NM, MK, KA, and AB (excluding point J and point B). When the requirements above are satisfied, the refrigerant according to the present disclosure has a refrigerating capacity ratio of 85% or more relative to that of R410A, and a COP ratio of 92.5% or more relative to that of R410A, and further ensures an ASHRAE lower flammability.

The refrigerant according to the present disclosure is preferably a refrigerant wherein
when the mass % of HFO-1132 (E), HFO-1123, R1234yf, R1234ze, and R32 based on their sum is respectively x, y, $z_1$, $z_2$, and a, the sum of $z_1$ and $z_2$ is z, $z_1/z$ is r, and w=$-0.00162a^2-0.0097a+0.592$,
if 0<a≤11.1, and 0<r≤w, coordinates (x,y,z) in a ternary composition diagram whose vertices are a point of (100−a) mass % of HFO-1132 (E), a point of (100−a) mass % of HFO-1123, and a point of (100−a) mass % of the sum of R1234yf and R1234ze are within the range of a figure surrounded by straight lines $GG'_r$, $G'_rB_r$, $B_rD_r$, $D_rC$, and CG that connect the following 5 points:
point G ($0.0314a^2-1.8079a+72.0$, 100−a−x, 0.0),
point $G'_r$ ($0.0314a^2-1.8079a+72.0$, $(-0.0708a^2+0.9972a-4.8964)r^2+(0.0424a^2-0.7622a-3.5518)r+(-0.0199a^2+0.0677a+3.8)$, 100−a−x−y),
point $B_r$ (0.0, $-r^2+(0.004a^2-0.1343a-9.1)r+(0.008a^2-1.4765a+68.8)$, 100−a−y),
point $D_r$ (0.0, $(-0.0603a^2+0.8857a-2.4)r^2+(0.1143a^2-0.9267a-3.8)r+(0.0079a^2+0.1471a+86.3)$, 100−a−y), and
point C ($-0.189a^2-0.8664a+32.9$, 100−a−x, 0.0), or on the straight lines GG'$_r$, G'$_r$B$_r$, and D$_r$C (excluding point G, point B$_r$, point D$_r$, and point C);

if 0<a≤11.1, and w<r≤1, coordinates (x,y,z) in the ternary composition diagram are within the range of a figure surrounded by straight lines GI, IA$_r$, A$_r$B$_r$, B$_r$D$_r$, D$_r$C, and CG that connect the following 6 points:

point G (0.0314a$^2$−1.8079a+72.0, 100−a−x, 0.0),
point I (0.0314a$^2$−1.8079a+72.0, 0.0, 100−a−x),
point A$_r$ ((−0.0031a$^2$+0.0165a−1.6)r$^2$+(0.0095a$^2$−0.2769a−6.0)r+(0.0084a$^2$−1.7237a+76.2), 0.0, 100−a−x),
point B$_r$ (0.0, (−a$^2$)r$^2$+(0.004a$^2$−0.1343a−9.1)r+(0.008a$^2$−1.4765a+68.8), 100−a−y),
point D$_r$ (0.0, (−0.0603a$^2$+0.8857a−2.4)r$^2$+(0.1143a$^2$−0.9267a−3.8)r+(0.0079a$^2$+0.1471a+86.3), 100−a−y), and
point C (−0.189a$^2$−0.8664a+32.9, 100−a−x, 0.0), or on the straight lines GI, IA$_r$, A$_r$B$_r$, and D$_r$C (excluding point G, point I, point A$_r$, point B$_r$, point D$_r$, and point C);

if 11.1<a≤16.4, and 0<r≤w, coordinates (x,y,z) in the ternary composition diagram are within the range of a figure surrounded by straight lines GG'$_r$, G'$_r$B$_r$, B$_r$O, and OG that connect the following 4 points:

point G (0.015a$^2$−1.4701a+70.266, 100−a−x, 0.0),
point G' (0.021a$^2$−0.1227a+4.6878, (4.1824a$^2$−114.54a+753.47)r$^2$+(0.0346a$^2$+0.3301a−14.707)r+(−0.0099a$^2$−0.1227a+4.6878), 100−a−x−y),
point B$_r$ (0.0, (0.0839a$^2$−3.138a+23.492)r$^2$+(−0.0396a$^2$+1.4292a−21.082)r+(0.0057a$^2$−1.4197a+68.462), 100−a−y), and
point O (0.0, 100−a, 0.0), or on the straight lines GG'$_r$ and G'$_r$B$_r$ (excluding point G and point B$_r$);

if 11.1<a≤16.4, and w<r≤1, coordinates (x,y,z) in the ternary composition diagram are within the range of a figure surrounded by straight lines GI, IA$_r$, A$_r$B$_r$, B$_r$O, and OG that connect the following 5 points:

point G (0.015a$^2$−1.4701a+70.266, 100−a−x, 0.0),
point I (0.015a$^2$−1.4701a+70.266, 0.0, 100−a−x),
point A$_r$ ((0.1221a$^2$−4.6027a−34.247)r$^2$+(−0.0564a$^2$+2.0217a−23.397)r+(0.0076a$^2$−1.7a+76.031), 0.0, 100−a−x),
point B$_r$ (0.0, (0.0839a$^2$−3.1.38a+23.492)r$^2$+(−0.0396a$^2$+1.4292a−21.082)r+(0.0057a$^2$−1.4197a+68.462), 100−a−y), and
point O (0.0, 100−a, 0.0), or on the straight lines GI, IA$_r$, and A$_r$B$_r$ (excluding point G, point I, point A$_r$, and point B$_r$);

if 16.4<a≤26.6, coordinates (x,y,z) in the ternary composition diagram are within the range of a figure surrounded by straight lines GI, IA$_r$, A$_r$B$_r$, B$_r$O, and OG that connect the following 5 points:

point G (0.015a$^2$−1.4701a+70.266, 100−a−x, 0.0),
point I (0.015a$^2$−1.4701a+70.266, 0.0, 100−a−x),
point A$_r$ ((0.1221a$^2$−4.6027a−34.247)r$^2$+(−0.0564a$^2$+2.0217a−23.397)r+(0.0076a$^2$−1.7a+76.031), 0.0, 100−a−x),
point B$_r$ (0.0, (0.0839a$^2$−3.138a+23.492)r$^2$+(−0.0396a$^2$+1.4292a−21.082)r+(0.0057a$^2$−1.4197a+68.462), 100−a−y), and
point O (0.0, 100−a, 0.0), or on the straight lines GI, IA$_r$, and A$_r$B$_r$ (excluding point G, point I, point A$_r$, and point B$_r$);

if 26.6<a≤43.8, coordinates (x,y,z) in the ternary composition diagram are within the range of a figure surrounded by straight lines GI, IA$_r$, A$_r$B$_r$, B$_r$O, and OG that connect the following 5 points:

point G (0.00738a$^2$−1.0762a+65.22, 100−a−x, 0.0),
point I (0.00738a$^2$−1.0762a+65.22, 0.0, 100−a−x),
point A$_r$ ((−0.009465a$^2$+0.6769a−13.119)r$^2$+(0.01143a$^2$−0.846a+4.9102)r+(0.005842a$^2$−1.5915a+74.4), 0.100−a−x),
point B$_r$ (0.0, (−0.00279a$^2$+0.1483a−2.5871)r$^2$+(0.00277a$^2$−0.1588a−8.822)r+(0.00327a$^2$−1.3169a+67.421), 100−a−y), and
point O (0.0, 100−a, 0.0), or on the straight lines GI, IA$_r$, and A$_r$B$_r$ (excluding point G, point I, point A$_r$, and point B$_r$); and if 43.8<a≤47.8, coordinates (x,y,z) in the ternary composition diagram are within the range of a figure surrounded by straight lines GI, IA$_r$, A$_r$B$_r$, B$_r$O, and OG that connect the following 5 points:

point G (−0.45a+51.91, 100−a−x, 0.0),
point I (−0.45a+51.91, 0.0, 100−a−x),
point A$_r$ ((−1.6r$^2$+(0.05a−12.39)r+(−1.075a+62.985), 0.100−a−x),
point B$_r$ (0.0, (3.8a−167.84)r$^2$+(−3.8a+155.94)r+(−1.025a+60.895), 100−a−y), and
point O (0.0, 100−a, 0.0), or on the straight lines GI, IA$_r$, and A$_r$B$_r$ (excluding point G, point I, point A$_r$, and point B$_r$). When the requirements above are satisfied, the refrigerant according to the present disclosure has a refrigerating capacity ratio of 85% or more relative to that of R410A, and a COP ratio of 92.5% or more relative to that of R410A, and further ensures a WCF lower flammability.

The refrigerant according to the present disclosure is preferably a refrigerant wherein when the mass % of HFO-1132 (E), HFO-1123, R1234yf, R1234ze, and R32 based on their sum is respectively x, y, z$_1$, z$_2$, and a, the sum of z$_1$ and z$_2$ is z, z$_1$/z is r, and v=−0.0581a+2.5484, if 0<a≤11.1, coordinates (x,y,z) in a ternary composition diagram whose vertices are a point of (100−a) mass % of HFO-1132 (E), a point of (100−a) mass % of HFO-1123, and a point of (100−a) mass % of the sum of R1234yf and R1234ze are within the range of a figure surrounded by straight lines JK$_r$, K$_r$B$_r$, B$_r$D$_r$, D$_2$C, and CJ that connect the following 5 points:

point J (−0.0072a$^2$−0.8296a+47.1, 100−a−x, 0.0),
point K$_r$ ((−0.0241a$^2$+0.4296a−2.8)r$^2$+(0.033a$^2$−0.6279a+2.0)r+(0.0421a$^2$−2.2419a+62.5), (0.0142a$^2$−0.3016a+1.4)r$^2$+(−0.0167a$^2$+0.2395a−7.9)r+(−0.0289a$^2$+0.4739a+12.4), 100−a−x−y),
point B$_r$ (0.0, r$^2$+(0.004a$^2$−0.1343a−9.1)r+(0.008a$^2$−1.4765a+68.8), 100−a−y),
point D$_r$ (0.0, (−0.0603a$^2$+0.8857a−2.4)r$^2$+(0.1143a$^2$−0.9267a−3.8)r+(0.0079a$^2$+0.1471x+86.3), 100−a−y), and
point C (−0.189a$^2$−0.8664a+32.9, 100−a−x, 0.0), or on the straight lines JK$_r$, K$_r$B$_r$, B$_r$D$_r$, and D$_r$C (excluding point J, point B$_r$, point D$_r$, and point C);

if 11.1<a≤26.6, coordinates (x,y,z) in the ternary composition diagram are within the range of a figure surrounded by straight lines JK$_r$, K$_r$B$_r$, B$_r$O, and OJ that connect the following 4 points:

point J (0.0285a$^2$−1.5371a+50.557, 100−a−x, 0.0),
point K$_r$ ((0.0556a$^2$−2.057a+14.984)r$^2$+(−0.0217a$^2$+0.7843a−6.9374)r+(0.0184a$^2$−1.7325a+59.763), (0.0567a$^2$−2.162a+16.817)r$^2$+(−0.0298a$^2$+1.0456a−15.236)r+(−0.0094a$^2$+0.0329a+14.897), 100−a−x−y), point $B_r$ (0.0, $(0.0839a^2-3.138a+23.492)r^2+(-0.0396a^2+1.4292a-21.082)r+(0.0057a^2-1.4197a+68.462)$, 100−a−y), and point O (0.0, 100−a, 0.0), or on the straight lines $JK_r$ and $K_rB_r$ (excluding point J and point $B_r$);

if $26.6<a\leq35.3$, and $0<r\leq v$, coordinates (x,y,z) in the ternary composition diagram are within the range of a figure surrounded by straight lines $JK_r$, $K_rB_r$, $B_rO$, and OJ that connect the following 4 points:

point J ($-0.00542a^2+0.3598a+24.08$, 100−a−x, 0.0), point $K_r$ ($((-0.2299a+5.7149)r^2+(0.1379a-5.069)r+(-0.7011x+45.351)$, $(0.069a-2.4345)r^2+(-0.1264a-5.1368)r+(-0.4943a+22.247)$, 100−a−x−y), point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$ and $K_rB_r$ (excluding point J and point $B_r$);

if $26.6<a\leq35.3$, and $v<r\leq1$, coordinates (x,y,z) in the ternary composition diagram are within the range of a figure surrounded by straight lines $JK_r$, $K_rA_r$, $A_rB_r$, $B_rO$, and OJ that connect the following 5 points:

point J ($-0.00542a^2+0.3598a+24.08$, 0.0, 100−a−x), point $K_r$ ($((-0.3218a+8.1609)r^2+(1.4023a-38.701)r+(-1.3103a+61.555)$, 0.0, 100−a−x), point $A_r$ ($((-0.00946a^2+0.6769a-13.119)r^2+(0.01143a^2-0.846a+4.9102)r+(0.00584a^2-1.5915a+74.4)$, 0.0, 100−a−x), point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$, $K_rA_r$, and $A_rB_r$ (excluding point J, point $A_r$, and point $B_r$);

if $35.3<a\leq43.8$, and $0<r\leq v$, coordinates (x,y,z) in the ternary composition diagram are within the range of a figure surrounded by straight lines $JK_r$, $K_rB_r$, $B_rO$, and OJ that connect the following 4 points:

point J ($-0.00542a^2+0.3598a+24.08$, 100−a−x, 0.0), point $K_r$ ($((0.2824a-12.367)r^2+(0.0235a-1.0306)r+(-0.5529a+40.119)$, $(1.1294a-49.468)r+(-0.5647a+24.734)$, 100−a−x−y), point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$ and $K_rB_r$ (excluding point J and point $B_r$);

if $35.3<a\leq43.8$, and $v<r\leq1$, coordinates (x,y,z) in the ternary composition diagram are within the range of a figure surrounded by straight lines $JK_r$, $K_rA_r$, $A_rB_r$, $B_rO$, and OJ that connect the following 5 points:

point J ($-0.00542a^2+0.3598a+24.08$, 100−a−x, 0.0), point $K_r$ ($((0.2588a-12.336)r^2+(-0.5294a+29.488)r+(0.0706a+12.808)$, 0.0, 100−a−x)), point $A_r$ ($((-0.00946a^2+0.6769a-13.119)r^2+(0.01143a^2-0.846a+4.9102)r+(0.00584a^2-1.5915a+74.4)$, 0.0, 100−a−x), point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$, $K_rA_r$, and $A_rB_r$ (excluding point J, point $A_r$, and point $B_r$); and if $43.8<a\leq47.8$, coordinates (x,y,z) in the ternary composition diagram are within the range of a figure surrounded by straight lines $JK_r$, $K_rA_r$, $A_rB_r$, $B_rO$, and OJ that connect the following 5 points:

point J ($-0.1a+33.78$, 100−a−x, 0.0), point $K_r$ ($-r^2+(-0.2a+15.06)r+15.9$, 0.0, 100−a−x), point $A_r$ ($-1.6r^2+(0.05a-12.39)r+(-1.075a+62.985)$, 0.0, 100−a−x), point $B_r$ (0.0, $(3.8a-167.84)r^2+(-3.8a+155.94)r+(-1.025a+60.895)$, 100−a−y), and point O (0.0, 100−a, 0.0), or on the straight lines $JK_r$, $K_rA_r$, and $A_rB_r$ (excluding point J, point $A_r$, and point $B_r$). When the requirements above are satisfied, the refrigerant according to the present disclosure has a refrigerating capacity ratio of 85% or more relative to that of R410A, and a COP ratio of 92.5% or more relative to that of R410A, and further ensures an ASHRAE lower flammability.

Refrigerant 1 according to the present disclosure may further comprise other additional refrigerants in addition to HFO-1132 (E), HFO-1123, R1234ze, and R32 as long as the above properties and effects are not impaired. In this respect, the refrigerant according to the present disclosure preferably comprises HFO-1132 (E), HFO-1123, R1234ze, and R32 in a total amount of 99.5 mass % or more, more preferably 99.75 mass % or more, and even more preferably 99.9 mass % or more, based on the entire refrigerant.

Further, Refrigerant 2 according to the present disclosure may further comprise other additional refrigerants in addition to HFO-1132 (E), HFO-1123, R1234ze, R1234yf, and R32 as long as the above properties and effects are not impaired. In this respect, the refrigerant according to the present disclosure preferably comprises HFO-1132 (E), HFO-1123, R1234ze, R1234yf, and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

1.2. Use

The refrigerant according to the present disclosure can be preferably used as a working fluid in a refrigerating machine.

The composition according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as tracers.
FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may contain one or more tracers at a total concentration of about 10 parts per million by weight (ppm) to about 1000 ppm based on the entire refrigerant composition. The refrigerant composition according to the present disclosure may preferably contain one or more tracers at a total concentration of about 30 ppm to about 500 ppm, and more preferably about 50 ppm to about 300 ppm, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises the step of circulating the refrigerant according to the present disclosure in a refrigerating machine.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132 (E)), trifluoroethylene (HFO-1123), 1,3,3,3-tetrafluoropropene (R1234ze), and difluoromethane (R32).

Item 2.

The composition according to Item 1,
wherein
when the mass % of HFO-1132 (E), HFO-1123, R1234ze, and R32 based on their sum in the refrigerant is respectively represented by x, y, z, and a,
if $0<a\leq11.1$, coordinates (x,y,z) in a ternary composition diagram in which the sum of HFO-1132 (E), HFO-1123, and R1234ze is (100−a) mass % are within the range of a figure surrounded by straight lines GG', G'B, BD, DC, and CC that connect the following 5 points:
point G $(0.0314a^2-1.8079a+72.0, 100-a-x, 0.0)$,
point G' $(0.0314a^2-1.8079a+72.0, -0.0199a^2+0.0677a+3.8, 100-a-x-y)$,
point B $(0.0, 0.0057a^2-1.4197a+68.462, 100-a-y)$,
point D $(0.0, 0.0234a^2+0.0647a+86.3, 100-a-y)$, and
point C $(-0.189a^2-0.8664a+32.9, 100-a-x, 0.0)$,
or on the straight lines GG', G'B, and DC (excluding point B, point D, point C, and point G);
if $11.1<a\leq16.4$, coordinates (x,y,z) in the ternary composition diagram are within the range of a figure surrounded by straight lines GG', G'B, BO, and OG that connect the following 4 points:
point G $(0.015a^2-1.4701a+70.266, 100-a-x, 0.0)$,
point G' $(-1.0566a+67.528, -0.3962a+6.4981, 100-a-x-y)$,
point B $(0.0, 0.0057a^2-1.4197a+68.462, 100-a-y)$, and
point O $(0.0, 100-a, 0.0)$,
or on the straight lines GG' and G'B (excluding point B, point O, and point G);
if $16.4<a\leq26.6$, coordinates (x,y,z) in the ternary composition diagram are within the range of a figure surrounded by straight lines GI, IA, AB, BO, and OG that connect the following 5 points:
point G $(0.015a^2-1.4701a+70.266, 100-a-x, 0.0)$,
point I $(0.015a^2-1.4701a+70.266, 0.0, 100-a-x)$,
point A $(0.0076a^2-1.7a+76.031, 0.0, 100-a-x)$,
point B $(0.0, 0.0057a^2-1.4197a+68.462, 100-a-y)$, and
point O $(0.0, 100-a, 0.0)$,
or on the straight lines GI and AB (excluding point G, point I, point A, and point B);
if $26.6<a\leq43.8$, coordinates (x,y,z) in the ternary composition diagram are within the range of a figure surrounded by straight lines GI, IA, AB, BO, and OG that connect the following 5 points:
point G $(0.00738a^2-1.0762a+65.22, 100-a-x, 0.0)$,
point I $(0.00738a^2-1.0762a+65.22, 0.0, 100-a-x)$,
point A $(0.00582a^2-1.5915a+74.4, 0.0, 100-a-x)$,
point B $(0.0, 0.00328a^2-1.3169a+67.421, 100-a-y)$, and
point O $(0.0, 100-a, 0.0)$,
or on the straight lines GI and AB (excluding point G, point I, point A, and point B); and
if $43.8<a\leq47.8$, coordinates (x,y,z) in the ternary composition diagram are within the range of a figure surrounded by straight lines GI, IA, AB, BO, and OG that connect the following 5 points:
point G (−0.45a+51.91, 100−a−x, 0.0),
point I (−0.45a+51.91, 0.0, 100−a−x),
point A (−1.075a+62.985, 0.0, 100−a−x),
point B (0.0, −1.025a+60.895, 100−a−y), and
point O (0.0, 100−a, 0.0),
or on the straight lines GI and AB (excluding point G, point I, point A, and point B).

Item 3.

The composition according to Item 1,
wherein
when the mass % of HFO-1132 (E), HFO-1123, R1234ze, and R32 based on their sum in the refrigerant is respectively represented by x, y, z, and a,
if $0<a\leq11.1$, coordinates (x,y,z) in a ternary composition diagram in which the sum of HFO-1132 (E), HFO-1123, and R1234ze is (100−a) mass % are within the range of a figure surrounded by straight lines JQ, QN, NM, MK, KB, BD, DC, and CJ that connect the following 8 points:
point J (100−a−y, $0.0072a^2-0.1704a+52.9$, 0.0),
point Q ($0.0112a^2-1.3048a+62.1$, 96.5−a−x, 3.5),
point N ($0.0207a^2-1.5817a+65.9$, $-0.0547a^2+1.1392a+21.6$, 100−a−x−y),
point M ($0.0278a^2-1.7325a+64.5$, 80.0−a−x, 20.0),
point K ($0.0421a^2-2.2419a+62.5$, 100−a−x−z, $-0.0132a^2+0.768a+25.1$),
point B (0.0, $0.0057a^2-1.4197a+68.462$, 100−a−y),
point D (0.0, $0.0234a^2+0.0647a+86.3$, 100−a−y), and
point C ($-0.189a^2-0.8664a+32.9$, 100−a−x, 0.0),
or on the straight lines JQ, QN, NM, MK, and KB (excluding point J and point B);
if $11.1<a\leq26.6$, coordinates (x,y,z) in the ternary composition diagram are within the range of a figure surrounded by straight lines JQ, QN, NM, MK, KB, BO, and OJ that connect the following 7 points:
point J (100−a−y, $-0.0285a^2+0.5371a+49.443$, 0.0),
point Q ($0.0166a^2-1.382a+62.291$, 96.5−a−x, 3.5),
point N ($0.0183a^2-1.5044a+65.339$, $-0.0395a^2+1.4643a+16.116$, 100−a−x−y),
point M ($0.0145a^2-1.4001a+62.448$, 80.0−a−x, 20.0),
point K ($0.0184a^2-1.7325a+59.763$, 100−a−x−z, $-0.009a^2+0.6996a+25.34$),
point B (0.0, $0.0057a^2-1.4197a+68.462$, 100−a−y), and
point O (0.0, 100−a, 0.0),
or on the straight lines JQ, QN, NM, MK, and KB (excluding point J and point B);
if $26.6<a\leq43.8$, coordinates (x,y,z) in the ternary composition diagram are within the range of a figure surrounded by straight lines JQ, QN, NM, MK, KB, BO, and OJ that connect the following 7 points:
point J (100−a−y, $0.00542a^2-1.3598a+75.92$, 0.0),
point Q ($0.0049a^2-0.728a+53.204$, 96.5−a−x, 3.5),
point N ($0.0075a^2-0.971a+58.81$, $-0.0038a^2-0.0303a+30.581$, 100−a−x−y)
point M ($0.0019a^2-0.7375a+53.782$, 80.0−a−x, 20.0),
point K ($0.0086a^2-1.2345a+53.442$, 100−a−x−z, $-0.0045a^2+0.4752a+28.157$),
point B (0.0, $0.00328a^2-1.3169a+67.421$, 100−a−y), and
point O (0.0, 100−a, 0.0),
or on the straight lines JQ, QN, NM, MK, and KB (excluding point J and point B); and
if $43.8<a\leq47.8$, coordinates (x,y,z) in the ternary composition diagram are within the range of a figure surrounded by straight lines JN, NM, MK, KA, AB, BO, and OJ that connect the following 7 points:
point J (100−a−y, −0.9a+66.22, 0.0),
point N (−0.425a+49.315, −0.3a+8.86, 100−a−x−y),
point M (−0.525a+48.095, 80.0−a−x, 20.0),
point K (15.9, 0.0, 84.1−a),
point A (−1.075a+62.985, 0.0, 100−a−x),
point B (0.0, −1.025a+60.895, 100−a−y), and
point O (0.0, 100−a, 0.0),
or on the straight lines NM, MK, KA, and AB (excluding point J and point B).

Item 4.

The composition according to Item 1,
wherein the refrigerant further comprises 2,3,3,3-tetrafluoro-1-propene (R1234yf).

Item 5.

The composition according to Item 4, wherein
when the mass % of HFO-1132 (E), HFO-1123, R1234yf, R1234ze, and R32 based on their sum in the refrigerant is respectively x, y, $z_1$, $z_2$, and a, the sum of $z_1$ and $z_2$ is z, $z_1/z$ is r, and $w=-0.00162a^2-0.0097a+0.592$,
if $0<a\leq11.1$, and $0<r\leq w$, coordinates (x,y,z) in a ternary composition diagram whose vertices are a point of (100−a) mass % of HFO-1132 (E), a point of (100−a) mass % of HFO-1123, and a point of (100−a) mass % of the sum of R1234yf and R1234ze are within the range of a figure surrounded by straight lines GG'$_r$, G'$_r$B$_r$, B$_r$D$_r$, D$_r$C, and CC that connect the following 5 points:
point G ($0.0314a^2-1.8079a+72.0$, 100−a−x, 0.0),
point G'$_r$ ($0.0314a^2$ $1.8079a+72.0$, ($-0.0708a^2+0.9972a-4.8964)r^2+(0.0424a^2-0.7622a-3.5518)r+(-0.0199a^2+0.0677a+3.8)$, 100−a−x−y),
point B$_r$ (0.0, $-r^2+(0.004a^2-0.1343a-9.1)r+(0.008a^2-1.4765a+68.8)$, 100−a−y),
point D$_r$ (0.0, $(-0.0603a^2+0.8857a-2.4)r^2+(0.1143a^2-0.9267a-3.8)r+(0.0079a^2+0.1471a+86.3)$, 100−a−y), and
point C ($-0.189a^2-0.8664a+32.9$, 100−a−x, 0.0),
or on the straight lines GG'$_r$, G'$_r$B$_r$, and D$_r$C (excluding point G, point B$_r$, point D$_r$, and point C);
if $0<a\leq11.1$, and $w<r\leq1$, coordinates (x,y,z) in the ternary composition diagram are within the range of a figure surrounded by straight lines GI, IA$_r$, A$_r$B$_r$, B$_r$D$_r$, D$_r$C, and CG that connect the following 6 points:
point G ($0.0314a^2-1.8079a+72.0$, 100−a−x, 0.0),
point I ($0.0314a^2-1.8079a+72.0$, 0.0, 100−a−x),
point A$_r$ ($((-0.0031a^2+0.0165a-1.6)r^2+(0.0095a^2-0.2769a-6.0)r+(0.0084a^2-1.7237a+76.2)$, 0.0, 100−a−x),
point B$_r$ (0.0, $(-a^2)r^2+(0.004a^2-0.1343a-9.1)r+(0.008a^2-1.4765a+68.8)$, 100−a−y),
point D$_r$ (0.0, $(-0.0603a^2+0.8857a-2.4)r^2+(0.1143a^2-0.9267a-3.8)r+(0.0079a^2+0.1471a+86.3)$, 100−a−y), and
point C ($-0.189a^2-0.8664a+32.9$, 100−a−x, 0.0),
or on the straight lines GI, IA$_r$, A$_r$B$_r$, and D$_r$C (excluding point G, point I, point A$_r$, point B$_r$, point D$_r$, and point C);
if $11.1<a\leq16.4$, and $0<r\leq w$, coordinates (x,y,z) in the ternary composition diagram are within the range of a figure surrounded by straight lines GG'$_r$, G'$_r$B$_r$, B$_r$O, and OG that connect the following 4 points:

point G $(0.015a^2-1.4701a+70.266, 100-a-x, 0.0)$,
point G$'_r$ $(0.021a^2-0.1227a+4.6878, (4.1824a^2-114.54a+753.47)r^2+(0.0346a^2+0.3301a-14.707)r+(-0.0099a^2-0.1227a+4.6878), 100-a-x-y)$,
point B$_r$ $(0.0, (0.0839a^2-3.1.38a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines GG$'_r$ and G$'_r$B$_r$ (excluding point G and point B$_r$);
  if $11.1<a\leq16.4$, and $w<r\leq1$, coordinates (x,y,z) in the ternary composition diagram are within the range of a figure surrounded by straight lines GI, IA$_r$, A$_r$B$_r$, B$_r$O, and OG that connect the following 5 points:
point G $(0.015a^2-1.4701a+70.266, 100-a-x, 0.0)$,
point I $(0.015a^2-1.4701a+70.266, 0.0, 100-a-x)$,
point A$_r$ $((0.1221a^2-4.6027a-34.247)r^2+(-0.0564a^2+2.0217a-23.397)r+(0.0076a^2-1.7a+76.031), 0.0, 100-a-x)$,
point B$_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines GI, IA$_r$, and A$_r$B$_r$ (excluding point G, point I, point A$_r$, and point B$_r$);
  if $16.4<a\leq26.6$, coordinates (x,y,z) in the ternary composition diagram are within the range of a figure surrounded by straight lines GI, IA$_r$, A$_r$B$_r$, B$_r$O, and OG that connect the following 5 points:
point G $(0.015a^2-1.4701a+70.266, 100-a-x, 0.0)$,
point I $(0.015a^2-1.4701a+70.266, 0.0, 100-a-x)$,
point A$_r$ $((0.1221a^2-4.6027a-34.247)r^2+(-0.0564a^2+2.0217a-23.397)r+(0.0076a^2-1.7a+-76.031), 0.0, 100-a-x)$,
point B$_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines GI, IA$_r$, and A$_r$B$_r$ (excluding point G, point I, point A$_r$, and point B$_r$);
  if $26.6<a\leq43.8$, coordinates (x,y,z) in the ternary composition diagram are within the range of a figure surrounded by straight lines GI, IA$_r$, A$_r$B$_r$, B$_r$O, and OG that connect the following 5 points:
point G $(0.00738a^2-1.0762a+65.22, 100-a-x, 0.0)$,
point I $(0.00738a^2-1.0762a+65.22, 0.0, 100-a-x)$,
point A$_r$ $((-0.009465a^2+0.6769a-13.119)r^2+(0.01143a^2-0.846a+4.9102)r+(0.005842a^2-1.5915a+74.4), 0.100-a-x)$,
point B$_r$ $(0.0, (-0.00279a^2+0.1483a-2.5871)r^2+(0.00277a^2-0.1588a-8.822)r+(0.00327a^2-1.3169a+67.421), 100-a-y)$, and
point O $(0.0, 100-a, 0.0)$,
or on the straight lines GI, IA$_r$, and A$_r$B$_r$ (excluding point G, point I, point A$_r$, and point B$_r$); and
  if $43.8<a\leq47.8$, coordinates (x,y,z) in the ternary composition diagram are within the range of a figure surrounded by straight lines GI, IA$_r$, A$_r$B$_r$, B$_r$O, and OG that connect the following 5 points:
point G $(-0.45a+51.91, 100-a-x, 0.0)$,
point I $(-0.45a+51.91, 0.0, 100-a-x)$,
point A$_r$ $((-1.6r^2+(0.05a-12.39)r+(-1.075a+62.985), 0.100-a-x)$,
point B$_r$ $(0.0, (3.8a-167.84)r^2+(-3.8a+155.94)r+(-1.025a+60.895), 100-a-y)$, and
point O $(0.0, 100-a, 0.0)$, or on the straight lines GI, IA$_r$, and A$_r$B$_r$ (excluding point G, point I, point A$_r$, and point B$_r$).
Item 6.
The composition according to item 4, wherein
when the mass % of HFO-1132 (E), HFO-1123, R1234yf, R1234ze, and R32 based on their sum in the refrigerant is respectively x, y, $z_1$, $z_2$, and a, the sum of $z_1$ and $z_2$ is z, $z_1/z$ is r, and $v=-0.0581a+2.5484$,
if $0<a\leq11.1$, coordinates (x,y,z) in a ternary composition diagram whose vertices are a point of (100-a) mass % of HFO-1132 (E), a point of (100-a) mass % of HFO-1123, and a point of (100-a) mass % of the sum of R1234yf and R1234ze are within the range of a figure surrounded by straight lines JK$_r$, K$_r$B$_r$, B$_r$D$_r$, D$_r$C, and CJ that connect the following 5 points:
point J $(-0.0072a^2-0.8296a+47.1, 100-a-x, 0.0)$,
point K$_r$ $((-0.0241a^2+0.4296a-2.8)r^2+(0.033a^2-0.6279a+2.0)r+(0.0421a^2-2.2419a+62.5), (0.0142a^2-0.3016a+1.4)r^2+(-0.0167a^2+0.2395a-7.9)r+(-0.0289a^2+0.4739a+12.4), 100-a-x-y)$,
point B$_r$ $(0.0, r^2+(0.004a^2-0.1343a-9.1)r+(0.008a^2-1.4765a+68.8), 100-a-y)$,
point D$_r$ $(0.0, (-0.0603a^2+0.8857a-2.4)r^2+(0.1143a^2-0.9267a-3.8)r+(0.0079a^2+0.1471x+86.3), 100-a-y)$,
point C $(-0.189a^2-0.8664a+32.9, 100-a-x, 0.0)$,
or on the straight lines JK$_r$, K$_r$B$_r$, B$_r$D$_r$, and D$_r$C (excluding point J, point B$_r$, point D$_r$, and point C);
  if $11.1<a\leq26.6$, coordinates (x,y,z) in the ternary composition diagram are within the range of a figure surrounded by straight lines JK$_r$, K$_r$B$_r$, B$_r$O, and OJ that connect the following 4 points:
point J $(0.0285a^2-1.5371a+50.557, 100-a-x, 0.0)$,
point K$_r$ $((0.0556a^2-2.057a+14.984)r^2+(-0.0217a^2+0.7843a-6.9374)r+(0.0184a^2-1.7325a+59.763), (0.0567a^2-2.162a+16.817)r^2+(-0.0298a^2+1.0456a-15.236)r+(-0.0094a^2+0.0329a+14.897), 100-a-x-y)$,
point B$_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines JK$_r$ and K$_r$B$_r$ (excluding point J and point B$_r$);
  if $26.6<a\leq35.3$, and $0<r\leq v$, coordinates (x,y,z) in the ternary composition diagram are within the range of a figure surrounded by straight lines JK$_r$, K$_r$B$_r$, B$_r$O, and OJ that connect the following 4 points:
point J $(-0.00542a^2+0.3598a+24.08, 100-a-x, 0.0)$,
point K$_r$ $((-0.2299a+5.7149)r^2+(0.1379a-5.069)r+(-0.7011x+45.351), (0.069a-2.4345)r^2+(-0.1264a-5.1368)r+(-0.4943a+22.247), 100-a-x-y)$,
point B$_r$ $(0.0, (-0.00279a^2+0.1483a-2.5871)r^2+(0.00277a^2-0.1588a-8.822)r+(0.00327a^2-1.3169a+67.421), 100-a-y)$, and
point O $(0.0, 100-a, 0.0)$,
or on the straight lines JK$_r$ and K$_r$B$_r$ (excluding point J and point B$_r$);
  if $26.6<a\leq35.3$, and $v<r\leq1$, coordinates (x,y,z) in the ternary composition diagram are within the range of a figure surrounded by straight lines JK$_r$, K$_r$A$_r$, A$_r$B$_r$, B$_r$O, and OJ that connect the following 5 points:
point J $(-0.00542a^2+0.3598a+24.08, 0.0, 100-a-x)$,
point K$_r$ $((-0.3218a+8.1609)r^2+(1.4023a-38.701)r+(-1.3103a+61.555), 0.0, 100-a-x)$,
point A$_r$ $((-0.00946a^2+0.6769a-13.119)r^2+(0.01143a^2-0.846a+4.9102)r+(0.00584a^2-1.5915a+74.4), 0.0, 100-a-x)$, point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$, $K_rA_r$, and $A_rB_r$ (excluding point J, point $A_r$, and point $B_r$);

if $35.3<a\leq43.8$, and $0<r\leq v$, coordinates (x,y,z) in the ternary composition diagram are within the range of a figure surrounded by straight lines $JK_r$, $K_rB_r$, $B_rO$, and OJ that connect the following 4 points:

point J $(-0.00542a^2+0.3598a+24.08, 100-a-x, 0.0)$, point $K_r$ $((0.2824a-12.367)r^2+(0.0235a-1.0306)r+(-0.5529a+40.119)$, $(1.1294a-49.468)r+(-0.5647a+24.734)$, 100−a−x−y), point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$ and $K_rB_r$ (excluding point J and point $B_r$);

if $35.3<a\leq43.8$, and $v<r\leq1$, coordinates (x,y,z) in the ternary composition diagram are within the range of a figure surrounded by straight lines $JK_r$, $K_rA_r$, $A_rB_r$, $B_rO$, and OJ that connect the following 5 points:

point J $(-0.00542a^2+0.3598a+24.08, 100-a-x, 0.0)$, point $K_r$ $((0.2588a-12.336)r^2+(-0.5294a+29.488)r+(0.0706a+12.808), 0.0, 100-a-x))$, point $A_r$ $((-0.00946a^2+0.6769a-13.119)r^2+(0.01143a^2-0.846a+4.9102)r+(0.00584a^2-1.5915a+74.4)$, 0.0, 100−a−x), point $B_r$ (0.0, $(-0.00279a^2+0.1483a-2.5871)r^2+(0.00277a^2-0.1588a-8.822)r+(0.00327a^2-1.3169a+67.421)$, 100−a−y), and point O (0.0, 100−a, 0.0), or on the straight lines $JK_r$, $K_rA_r$, and $A_rB_r$ (excluding point J, point $A_r$, and point $B_r$); and if $43.8<a\leq47.8$, coordinates (x,y,z) in the ternary composition diagram are within the range of a figure surrounded by straight lines $JK_r$, $K_rA_r$, $A_rB_r$, $B_rO$, and OJ that connect the following 5 points:

point J $(-0.1a+33.78, 100-a-x, 0.0)$, point $K_r$ $(-r^2+(-0.2a+15.06)r+15.9, 0.0, 100-a-x)$, point $A_r$ $(-1.6r^2+(0.05a-12.39)r+(-1.075a+62.985), 0.0, 100-a-x)$, point $B_r$ (0.0, $(3.8a-167.84)r^2+(-3.8a+155.94)r+(-1.025a+60.895)$, 100−a−y), and point O (0.0, 100−a, 0.0), or on the straight lines $JK_r$, $K_rA_r$, and $A_rB_r$ (excluding point J, point $A_r$, and point $B_r$).

Item 7.

The composition according to any one of Items 1 to 6, for use as a working fluid for a refrigerating machine, wherein the composition further comprises a refrigeration oil.

Item 8.

The composition according to any one of Items 1 to 7, for use as an alternative refrigerant for R410A.

Item 9.

Use of the composition according to any one of Items 1 to 7 as an alternative refrigerant for R410A.

Item 10.

A refrigerating machine comprising the composition according to any one of Items 1 to 7 as a working fluid.

Item 11.

A method for operating a refrigerating machine, comprising the step of circulating the composition according to any one of Items 1 to 7 as a working fluid in a refrigerating machine.

Examples

The present disclosure is described in more detail below with reference to Examples. However, the present disclosure is not limited to the Examples.

Mixed refrigerants were prepared by mixing HFO-1132 (E), HFO-1123, R1234ze, and R32 at a mass % based on their sum as shown in Tables 1 to 11.

The GWP of compositions each comprising a mixture of R410A (R32=50%/R125=50%) was evaluated based on the values stated in the intergovernmental Panel on Climate Change (IPCC), fourth report. The GWP of HFO-1132 (E), which was not stated therein, was assumed to be 1 from HFO-1132a (GWP=1 or less) and HFO-1123 (GWP=0.3, described in PTL 1). The refrigerating capacity of compositions each comprising R410A and a mixture of HFO-1132 (E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity ratio of the mixed refrigerants relative to those of R410 were determined. The calculation conditions were as follows.

Evaporating temperature: 5° C.
Condensation temperature: 45° C.
Degree of superheating: 5 K
Degree of subcooling: 5 K
Compressor efficiency: 70%

Tables 1 to 11 show these values together with the GWP of each mixed refrigerant. The COP and refrigerating capacity are ratios relative to R410A.

The coefficient of performance (COP) was determined according to the following formula.

$$COP = \frac{\text{refrigerating capacity or heating capacity}}{\text{power consumption}}$$

TABLE 1

| Item | Unit | Com Ex1 | Com Ex2 O | Com Ex3 A | Com Ex4 B | Com Ex5 C | Com Ex6 D | Com Ex7 G | Example1 G' |
|---|---|---|---|---|---|---|---|---|---|
| HFO-1132(E) | mass % | R410A | 100.0 | 76.2 | 0.0 | 32.9 | 0.0 | 72.0 | 72.0 |
| HFO-1123 | mass % | | 0.0 | 0.0 | 68.8 | 67.1 | 86.3 | 28.0 | 3.8 |
| R1234ze | mass % | | 0.0 | 23.8 | 31.2 | 0.0 | 13.7 | 0.0 | 24.2 |
| R32 | mass % | | 0.0 | 0.0 | 0.0 | 0.0 | 0.0 | 0.0 | 0.0 |
| GWP | — | 2088 | 1 | 2 | 3 | 1 | 2 | 1 | 2 |
| COP ratio | % (relative to R410A) | 100 | 99.7 | 100.8 | 95.6 | 92.5 | 92.5 | 96.6 | 100.5 |
| Refrigerating capacity ratio | % (relative to R410A) | 100 | 98.3 | 85.0 | 85.0 | 107.4 | 98.0 | 103.1 | 85.4 |
| Condensation glide | ° C. | 0.1 | 0.0 | 3.2 | 6.9 | 0.2 | 2.7 | 0.5 | 3.6 |

TABLE 2

| Item | Unit | Com Ex8 A' | Com Ex9 B' | Example2 C' | Example3 D' |
|---|---|---|---|---|---|
| HFO-1132(E) | mass % | 61.7 | 20.0 | 28.3 | 12.0 |
| HFO-1123 | mass % | 11.6 | 48.5 | 69.0 | 77.9 |
| R1234ze | mass % | 26.7 | 31.5 | 2.7 | 10.1 |
| R32 | mass % | 0.0 | 0.0 | 0.0 | 0.0 |
| GWP | — | 2 | 4 | 3 | 2 |
| COP ratio | % (relative to R410A) | 99.8 | 97.0 | 92.5 | 92.5 |
| Refrigerating capacity ratio | % (relative to R410A) | 85.0 | 85.0 | 105.7 | 100.9 |
| Condensation glide | ° C. | 4.5 | 6.8 | 0.6 | 2.0 |

TABLE 3

| Item | Unit | Com Ex10 I | Com Ex11 J | Example4 Q | Example5 N | Example6 M | Example7 K | Com Ex12 A | Com Ex13 B |
|---|---|---|---|---|---|---|---|---|---|
| HFO-1132(E) | mass % | 72.0 | 47.1 | 62.1 | 65.9 | 64.5 | 62.5 | 67.3 | 0.0 |
| HFO-1123 | mass % | 0.0 | 52.9 | 34.5 | 21.6 | 15.5 | 12.4 | 0.0 | 61.2 |
| R1234ze | mass % | 28.0 | 0.0 | 3.4 | 12.5 | 20.0 | 25.1 | 27.4 | 33.5 |
| R32 | mass % | 0.0 | 0.0 | 0.0 | 0.0 | 0.0 | 0.0 | 5.3 | 5.3 |
| GWP | — | 2 | 1 | 1 | 2 | 2 | 2 | 38 | 38 |
| COP ratio | % (relative to R410A) | 101.1 | 93.8 | 96.0 | 97.8 | 99.0 | 99.6 | 100.8 | 96.9 |
| Refrigerating capacity ratio | % (relative to R410A) | 82.6 | 106.2 | 102.0 | 94.8 | 89.5 | 86.1 | 85.0 | 85.0 |
| Condensation glide | ° C. | 3.9 | 0.3 | 1.0 | 2.4 | 3.5 | 4.2 | 4.2 | 7.6 |

TABLE 4

| Item | Unit | Com Ex14 C | Com Ex15 D | Com Ex16 G | Example8 G' | Com Ex17 I | Com Ex18 J | Example9 Q | Example10 N |
|---|---|---|---|---|---|---|---|---|---|
| HFO-1132(E) | mass % | 23.0 | 0.0 | 63.3 | 63.3 | 63.3 | 42.5 | 55.5 | 58.1 |
| HFO-1123 | mass % | 71.7 | 87.3 | 31.4 | 3.6 | 0.0 | 52.2 | 41.0 | 26.1 |
| R1234ze | mass % | 0.0 | 7.4 | 0.0 | 33.1 | 31.4 | 0.0 | 3.5 | 10.5 |
| R32 | mass % | 5.3 | 5.3 | 5.3 | 5.3 | 5.3 | 5.3 | 5.3 | 5.3 |
| GWP | — | 37 | 37 | 37 | 38 | 38 | 37 | 37 | 37 |
| COP ratio | % (relative to R410A) | 92.5 | 92.5 | 96.0 | 100.9 | 101.2 | 94.0 | 95.4 | 97.1 |
| Refrigerating capacity ratio | % (relative to R410A) | 109.8 | 104.7 | 105.7 | 83.0 | 82.6 | 108.3 | 104.6 | 98.7 |
| Condensation glide | ° C. | 0.1 | 1.4 | 0.4 | 5.1 | 4.9 | 0.3 | 0.9 | 2.2 |

TABLE 5

| Item | Unit | Example11 M | Example12 K | Com Ex19 A | Com Ex20 B | Com Ex21 C = D | Com Ex22 G | Example13 G' | Com Ex23 I |
|---|---|---|---|---|---|---|---|---|---|
| HFO-1132(E) | mass % | 56.1 | 51.8 | 58.1 | 0.0 | 0.0 | 55.8 | 55.8 | 55.8 |
| HFO-1123 | mass % | 18.6 | 14.1 | 0.0 | 53.4 | 89.9 | 33.1 | 2.1 | 0.0 |
| R1234ze | mass % | 20.0 | 28.8 | 30.8 | 35.5 | 0.0 | 0.0 | 31.0 | 33.1 |
| R32 | mass % | 5.3 | 5.3 | 11.1 | 11.1 | 11.1 | 11.1 | 11.1 | 11.1 |
| GWP | — | 38 | 38 | 77 | 78 | 76 | 76 | 77 | 77 |
| COP ratio | % (relative to R410A) | 98.5 | 99.7 | 101.0 | 98.2 | 92.5 | 95.8 | 100.8 | 101.2 |
| Refrigerating capacity ratio | % (relative to R410A) | 91.9 | 86.0 | 85.0 | 85.0 | 112.0 | 108.0 | 85.1 | 83.6 |
| Condensation glide | ° C. | 3.8 | 5.3 | 5.1 | 8.0 | 0.0 | 0.4 | 5.3 | 5.5 |

TABLE 6

| Item | Unit | Com Ex24 J | Example14 Q | Example15 N | Example16 M | Example17 K | Com Ex25 A | Com Ex26 B | Com Ex27 G |
|---|---|---|---|---|---|---|---|---|---|
| HFO-1132(E) | mass % | 37.0 | 49.0 | 50.9 | 48.7 | 42.8 | 50.2 | 0.0 | 50.2 |
| HFO-1123 | mass % | 51.9 | 36.4 | 27.5 | 20.2 | 14.1 | 0.0 | 46.7 | 33.4 |
| R1234ze | mass % | 0.0 | 3.5 | 10.5 | 20.0 | 32.0 | 33.4 | 36.9 | 0.0 |
| R32 | mass % | 11.1 | 11.1 | 11.1 | 11.1 | 11.1 | 16.4 | 16.4 | 16.4 |
| GWP | — | 76 | 76 | 76 | 77 | 77 | 113 | 113 | 112 |
| COP ratio | % (relative to R410A) | 94.3 | 95.7 | 96.9 | 98.3 | 100.0 | 101.2 | 99.1 | 95.9 |
| Refrigerating capacity ratio | % (relative to R410A) | 110.2 | 106.3 | 100.8 | 94.0 | 85.8 | 85.0 | 85.0 | 109.7 |
| Condensation glide | ° C. | 0.2 | 0.9 | 2.2 | 3.9 | 6.1 | 5.8 | 8.2 | 0.3 |

TABLE 7

| Item | Unit | Com Ex28 J | Example18 Q | Example19 N | Example20 M | Example21 K | Com Ex29 A | Com Ex30 B | Com Ex31 G |
|---|---|---|---|---|---|---|---|---|---|
| HFO-1132(E) | mass % | 33.0 | 44.1 | 45.6 | 43.4 | 36.3 | 36.2 | 0.0 | 41.8 |
| HFO-1123 | mass % | 50.6 | 36.0 | 29.5 | 20.0 | 12.9 | 0.0 | 34.7 | 31.6 |
| R1234ze | mass % | 0.0 | 3.5 | 8.5 | 20.0 | 34.4 | 37.2 | 38.7 | 0.0 |
| R32 | mass % | 16.4 | 16.4 | 16.4 | 16.4 | 16.4 | 26.6 | 26.6 | 26.6 |
| GWP | — | 112 | 112 | 112 | 113 | 113 | 182 | 182 | 180 |
| COP ratio | % (relative to R410A) | 94.7 | 95.9 | 96.7 | 98.4 | 100.4 | 101.8 | 100.7 | 96.4 |
| Refrigerating capacity ratio | % (relative to R410A) | 111.6 | 107.8 | 103.9 | 95.5 | 85.6 | 85.0 | 85.0 | 112.0 |
| Condensation glide | ° C. | 0.1 | 0.9 | 1.8 | 3.9 | 6.6 | 6.6 | 8.0 | 0.2 |

TABLE 8

| Item | Unit | Com Ex32 I | Com Ex33 J | Example22 Q | Example23 N | Example24 M | Example25 K | Com Ex34 A | Com Ex35 B |
|---|---|---|---|---|---|---|---|---|---|
| HFO-1132(E) | mass % | 41.8 | 29.8 | 37.3 | 38.3 | 35.5 | 26.7 | 25.5 | 0.0 |
| HFO-1123 | mass % | 0.0 | 43.6 | 32.6 | 27.1 | 17.9 | 9.1 | 0.0 | 25.0 |
| R1234ze | mass % | 31.6 | 0.0 | 3.5 | 8.0 | 20.0 | 37.6 | 39.2 | 39.7 |
| R32 | mass % | 26.6 | 26.6 | 26.6 | 26.6 | 26.6 | 26.6 | 35.3 | 35.3 |
| GWP | — | 182 | 180 | 180 | 181 | 181 | 182 | 241 | 241 |
| COP ratio | % (relative to R410A) | 101.1 | 95.8 | 96.6 | 97.2 | 98.8 | 101.4 | 102.4 | 101.8 |
| Refrigerating capacity ratio | % (relative to R410A) | 88.5 | 113.3 | 109.8 | 106.3 | 97.5 | 85.3 | 85.0 | 85.0 |
| Condensation glide | ° C. | 5.5 | 0.1 | 0.8 | 1.6 | 3.8 | 7.06 | 6.8 | 7.6 |

TABLE 9

| Item | Unit | Com Ex36 G | Com Ex37 I | Com Ex38 J | Example26 Q | Example27 N | Example28 M | Example29 K | Com Ex39 A |
|---|---|---|---|---|---|---|---|---|---|
| HFO-1132(E) | mass % | 36.4 | 36.4 | 30.0 | 33.6 | 33.9 | 30.1 | 20.6 | 15.9 |
| HFO-1123 | mass % | 28.3 | 0.0 | 34.7 | 27.6 | 24.8 | 14.6 | 4.8 | 0.0 |
| R1234ze | mass % | 0.0 | 28.3 | 0.0 | 3.5 | 6.0 | 20.0 | 39.3 | 40.3 |
| R32 | mass % | 35.3 | 35.3 | 35.3 | 35.3 | 35.3 | 35.3 | 35.3 | 43.8 |
| GWP | — | 239 | 240 | 239 | 239 | 239 | 240 | 241 | 298 |
| COP ratio | % (relative to R410A) | 97.1 | 101.0 | 96.8 | 97.4 | 97.7 | 99.5 | 102.2 | 103.0 |
| Refrigerating capacity ratio | % (relative to R410A) | 113.1 | 92.1 | 113.8 | 110.8 | 108.9 | 98.7 | 85.1 | 85.0 |
| Condensation glide | ° C. | 0.1 | 4.8 | 0.2 | 0.7 | 1.1 | 3.63 | 7.0 | 6.6 |

TABLE 10

| Item | Unit | Com Ex40 B | Com Ex41 G | Com Ex42 I | Com Ex43 J | Example30 Q = N | Example31 M | Example32 K | Com Ex44 A |
|---|---|---|---|---|---|---|---|---|---|
| HFO-1132(E) | mass % | 0.0 | 32.2 | 32.2 | 29.4 | 30.7 | 25.1 | 15.9 | 11.6 |
| HFO-1123 | mass % | 16.0 | 24.0 | 0.0 | 26.8 | 22.0 | 11.1 | 0.0 | 0.0 |
| R1234ze | mass % | 40.2 | 0.0 | 24.0 | 0.0 | 3.5 | 20.0 | 40.3 | 40.6 |
| R32 | mass % | 43.8 | 43.8 | 43.8 | 43.8 | 43.8 | 43.8 | 43.8 | 47.8 |
| GWP | — | 298 | 296 | 297 | 296 | 296 | 297 | 298 | 325 |
| COP ratio | % (relative to R410A) | 102.7 | 97.8 | 100.9 | 97.8 | 98.2 | 100.2 | 103.0 | 103.3 |
| Refrigerating capacity ratio | % (relative to R410A) | 85.0 | 113.7 | 96.0 | 113.9 | 111.2 | 99.4 | 85.0 | 85.0 |
| Condensation glide | ° C. | 6.9 | 0.2 | 3.9 | 0.2 | 0.7 | 3.4 | 6.6 | 6.4 |

TABLE 11

| Item | Unit | Com Ex45 B | Com Ex46 G | Com Ex47 I | Com Ex48 J = Q = N | Example33 M | Example34 K |
|---|---|---|---|---|---|---|---|
| HFO-1132(E) | mass % | 0.0 | 30.4 | 30.4 | 29.0 | 23.0 | 15.9 |
| HFO-1123 | mass % | 11.9 | 21.8 | 0.0 | 23.2 | 9.2 | 0.0 |

TABLE 11-continued

| Item | Unit | Com Ex45<br>B | Com Ex46<br>G | Com Ex47<br>I | Com Ex48<br>J = Q = N | Example33<br>M | Example34<br>K |
|---|---|---|---|---|---|---|---|
| R1234ze | mass % | 40.3 | 0.0 | 21.8 | 0.0 | 20.0 | 36.3 |
| R32 | mass % | 47.8 | 47.8 | 47.8 | 47.8 | 47.8 | 47.8 |
| GWP | — | 325 | 323 | 324 | 323 | 324 | 325 |
| COP ratio | % (relative to R410A) | 103.0 | 98.2 | 100.9 | 98.2 | 100.5 | 102.7 |
| Refrigerating capacity ratio | % (relative to R410A) | 85.0 | 113.8 | 97.8 | 113.9 | 99.5 | 88.0 |
| Condensation glide | ° C. | 6.6 | 0.2 | 3.5 | 0.2 | 3.3 | 5.8 |

The composition of each mixture was defined as WCF. A leak simulation was performed using NIST Standard Reference Data Base Refleak Version 4.0 under the conditions of Equipment, Storage, Shipping, Leak, and Recharge according to the ASHRAE Standard 34-2013. The most flammable fraction was defined as WCFF.

For the flammability, the burning velocity was measured according to the ANSI/ASHRAE Standard 34-2013. Both WCF and WCFF having a burning velocity of 10 cm/s or less were determined to be "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. The propagation state of the flame was recorded using a schlieren system with a Collimating lens and a high-speed digital video camera (frame rate: 600 fps), and stored on a PC as video data. The flame propagation velocity Sb (cm/sec) was measured using the video image. The burning velocity (Su) is the volume of unburned gas in which the flame surface of the unit area is consumed in the unit time, and was calculated according to the following equation.

$$Su = Sb * \rho u / \rho b$$

ρu: Adiabatic flame temperature (unburned)
ρb: Adiabatic flame temperature (already burned)
ρu was the measured temperature, and ρb was calculated from the heat of the combustion of the combustion gas and the specific heat of constant pressure.

Tables 12 to 19 show the results.

TABLE 12

| Item | | Unit | G | G' | I | G | G' | I | G | G' |
|---|---|---|---|---|---|---|---|---|---|---|
| WCF | HFO-1132(E) | mass % | 72.0 | 72.0 | 72.0 | 63.3 | 63.3 | 63.3 | 55.8 | 55.8 |
| | HFO-1123 | mass % | 28.0 | 3.8 | 0.0 | 31.4 | 3.6 | 0.0 | 21 | 2.1 |
| | R1234ze | mass % | 0.0 | 24.2 | 28.0 | 0.0 | 33.1 | 31.4 | 31.0 | 31.0 |
| | R32 | mass % | 0.0 | 0.0 | 0.0 | 5.3 | 5.3 | 5.3 | 11.1 | 11.1 |
| Burning velocity (WCF) | | cm/s | 10 | 10 | 10 | 10 | 10 | 10 | 10 | 10 |

TABLE 13

| Item | | Unit | I | G | G' = I | G | I | G | I | G |
|---|---|---|---|---|---|---|---|---|---|---|
| WCF | HFO-1132(E) | mass % | 55.8 | 50.2 | 50.2 | 41.8 | 41.8 | 36.4 | 36.4 | 32.2 |
| | HFO-1123 | mass % | 0.0 | 33.4 | 0.0 | 31.6 | 0.0 | 28.3 | 0.0 | 24.0 |
| | R1234ze | mass % | 33.1 | 0.0 | 33.4 | 0.0 | 31.6 | 0.0 | 28.3 | 0.0 |
| | R32 | mass % | 11.1 | 16.4 | 16.4 | 26.6 | 26.6 | 35.3 | 35.3 | 43.8 |
| Burning velocity (WCF) | | cm/s | 10 | 10 | 10 | 10 | 10 | 10 | 10 | 10 |

TABLE 14

| Item | | Unit | I | G | I |
|---|---|---|---|---|---|
| WCF | HFO-1132(E) | mass % | 32.2 | 30.4 | 30.4 |
| | HFO-1123 | mass % | 0.0 | 21.8 | 0.0 |
| | R1234ze | mass % | 24.0 | 0.0 | 21.8 |
| | R32 | mass % | 43.8 | 47.8 | 47.8 |
| Burning velocity (WCF) | | cm/s | 10 | 10 | 10 |

TABLE 15

| | Item | Unit | J | Q' | Q | N' | N | M | K | A' |
|---|---|---|---|---|---|---|---|---|---|---|
| WCF | HFO-1132(E) | mass % | 47.1 | 56.5 | 62.1 | 65.4 | 65.9 | 64.5 | 62.5 | 61.7 |
| | HFO-1123 | mass % | 52.9 | 42.4 | 34.5 | 25.5 | 21.6 | 15.5 | 12.4 | 11.6 |
| | R1234ze | mass % | 0.0 | 1.1 | 3.4 | 9.1 | 12.5 | 20.0 | 25.1 | 26.7 |
| | R32 | mass % | 0.0 | 0.0 | 0.0 | 0.0 | 0.0 | 0.0 | 0.0 | 5.3 |
| | Leak conditions for achieving WCFF | | Storage and transport at $-40°$ C. and 92% release, liquid phase side | Storage and transport at $-40°$ C. and 88% release, liquid phase side | Storage and transport at $-40°$ C. and 90% release, gas phase side | Storage and transport at $-40°$ C. and 80% release, gas phase side | Storage and transport at $-40°$ C. and 74% release, gas phase side | Storage and transport at $-40°$ C. and 74% release, gas phase side | Storage and transport at $-40°$ C. and 40% release, gas phase side | Storage and transport at $-40°$ C. and 38% release, gas phase side |
| WCFF | HFO-1132(E) | mass % | 72.0 | 72.0 | 72.0 | 72.0 | 72.0 | 72.0 | 72.0 | 72.0 |
| | HFO-1123 | mass % | 28.0 | 19.7 | 20.4 | 17.1 | 16.0 | 16.0 | 15.4 | 15.2 |
| | R1234ze | mass % | 0.0 | 8.3 | 7.6 | 10.9 | 12.0 | 12.1 | 12.6 | 12.8 |
| | R32 | mass % | 0.0 | 0.0 | 0.0 | 0.0 | 0.0 | 0.0 | 0.0 | 0.0 |
| | Burning velocity (WCF) | cm/s | 8 or less | 8 or less | 8 or less | 8 or less | 8.1 | 8 or less | 8 or less | 8 or less |
| | Burning velocity (WCFF) | cm/s | 10 | 10 | 10 | 10 | 10 | 10 | 10 | 10 |

TABLE 16

| | Item | Unit | J | Q | N | M | K | J | Q | N |
|---|---|---|---|---|---|---|---|---|---|---|
| WCF | HFO-1132(E) | mass % | 42.5 | 55.5 | 58.1 | 56.1 | 51.8 | 37.0 | 49.0 | 50.9 |
| | HFO-1123 | mass % | 52.2 | 35.7 | 26.1 | 18.6 | 14.1 | 51.9 | 36.4 | 27.5 |
| | R1234ze | mass % | 0.0 | 3.5 | 10.5 | 20.0 | 28.8 | 0.0 | 3.5 | 10.5 |
| | R32 | mass % | 5.3 | 5.3 | 5.3 | 5.3 | 5.3 | 11.1 | 11.1 | 11.1 |
| | Leak conditions for achieving WCFF | | Storage and transport at $-40°$ C. and 95% release, liquid phase side | Storage and transport at $-40°$ C. and 88% release, gas phase side | Storage and transport at $-40°$ C. and 76% release, gas phase side | Storage and transport at $-40°$ C. and 62% release, gas phase side | Storage and transport at $-40°$ C. and 30% release, gas phase side | Storage and transport at $-40°$ C. and 95% release, liquid phase side | Storage and transport at $-40°$ C. and 88% release, gas phase side | Storage and transport at $-40°$ C. and 52% release, gas phase side |
| WCFF | HFO-1132(E) | mass % | 65.0 | 64.8 | 64.3 | 62.5 | 60.9 | 56.2 | 57.0 | 53.0 |
| | HFO-1123 | mass % | 30.8 | 23.8 | 21.4 | 20.2 | 19.7 | 33.0 | 25.8 | 29.6 |
| | R1234ze | mass % | 0.0 | 7.1 | 10.6 | 11.4 | 12.4 | 0.0 | 7.1 | 5.4 |
| | R32 | mass % | 4.2 | 4.3 | 4.7 | 5.9 | 7.0 | 10.8 | 10.1 | 12.0 |
| | Burning velocity (WCF) | cm/s | 8 or less | 8 or less | 8 or less | 8 or less | 8 or less | 8 or less | 8 or less | 8.1 |
| | Burning velocity (WCFF) | cm/s | 10 | 10 | 10 | 10 | 10 | 10 | 10 | 10 |

TABLE 17

| | Item | Unit | M | K | J | Q | N | M | K | J |
|---|---|---|---|---|---|---|---|---|---|---|
| WCF | HFO-1132(E) | mass % | 48.7 | 42.8 | 33.0 | 44.1 | 45.6 | 43.4 | 36.3 | 29.8 |
| | HFO-1123 | mass % | 20.2 | 14.1 | 50.6 | 36.0 | 29.5 | 20.0 | 12.9 | 43.6 |
| | R1234ze | mass % | 20.0 | 32.0 | 0.0 | 3.5 | 8.5 | 20.0 | 34.4 | 0.0 |
| | R32 | mass % | 11.1 | 11.1 | 16.4 | 16.4 | 16.4 | 16.4 | 16.4 | 26.6 |
| | Leak conditions for achieving WCFF | | Storage and transport at $-40°$ C. and 52% release, gas phase side | Storage and transport at $-40°$ C. and 18% release, gas phase side | Storage and transport at $-40°$ C. and 95% release, liquid phase side | Storage and transport at $-40°$ C. and 78% release, gas phase side | Storage and transport at $-40°$ C. and 78% release, gas phase side | Storage and transport at $-40°$ C. and 52% release, gas phase side | Storage and transport at $-40°$ C. and 8% release, gas phase side | Storage and transport at $-40°$ C. and 95% release, liquid phase side |
| WCFF | HFO-1132(E) | mass % | 54.2 | 51.5 | 47.6 | 48.1 | 50.0 | 48.3 | 45.1 | 34.5 |
| | HFO-1123 | mass % | 22.2 | 21.7 | 33.2 | 31.4 | 24.4 | 22.2 | 21.2 | 26.5 |
| | R1234ze | mass % | 12.5 | 11.8 | 0.0 | 3.6 | 9.0 | 11.0 | 11.5 | 0.0 |
| | R32 | mass % | 11.1 | 15.0 | 19.2 | 16.9 | 16.6 | 18.5 | 22.2 | 39.0 |
| | Burning velocity (WCF) | cm/s | 8 or less | 8 or less | 8 or less | 8 or less | 8 or less | 8 or less | 8 or less | 8 or less |
| | Burning velocity (WCFF) | cm/s | 10 | 10 | 10 | 10 | 10 | 10 | 10 | 10 |

TABLE 18

| Item | | Unit | Q | N | M | K | J | Q | N | M |
|---|---|---|---|---|---|---|---|---|---|---|
| WCF | HFO-1132(E) | mass % | 37.3 | 38.3 | 35.5 | 26.7 | 30.0 | 33.6 | 33.9 | 30.1 |
| | HFO-1123 | mass % | 32.6 | 27.1 | 17.9 | 9.1 | 34.7 | 27.6 | 24.8 | 14.6 |
| | R1234ze | mass % | 3.5 | 8.0 | 20.0 | 37.6 | 0.0 | 3.5 | 6.0 | 20.0 |
| | R32 | mass % | 26.6 | 26.6 | 26.6 | 26.6 | 35.3 | 35.3 | 35.3 | 35.3 |
| Leak conditions for achieving WCFF | | | Storage and transport at −40° C. and 86% release, gas phase side | Storage and transport at −40° C. and 78% release, gas phase side | Storage and transport at −40° C. and 48% release, gas phase side | Storage and transport at −40° C. and 0% release, gas phase side | Storage and transport at −40° C. and 92% release, liquid phase side | Storage and transport at −40° C. and 76% release, gas phase side | Storage and transport at −40° C. and 22% release, gas phase side | Storage and transport at −40° C. and 16% release, gas phase side |
| WCFF | HFO-1132(E) | mass % | 40.2 | 40.7 | 39.6 | 36.5 | 28.6 | 34.6 | 34.6 | 34.9 |
| | HFO-1123 | mass % | 25.0 | 22.6 | 20.3 | 16.2 | 19.0 | 24.1 | 29.6 | 20.1 |
| | R1234ze | mass % | 5.7 | 8.3 | 10.2 | 12.1 | 0.0 | 3.3 | 2.0 | 6.8 |
| | R32 | mass % | 29.1 | 28.4 | 29.9 | 35.6 | 52.4 | 38.0 | 33.8 | 38.2 |
| Burning velocity (WCF) | | cm/s | 8 or less | 8 or less | 8 or less | 8 or less | 8 or less | 8 or less | 8 or less | 8 or less |
| Burning velocity (WCFF) | | cm/s | 10 | 10 | 10 | 10 | 10 | 10 | 10 | 10 |

TABLE 19

| Item | | Unit | K | J | Q = N | M | K | J = Q = N | M | K |
|---|---|---|---|---|---|---|---|---|---|---|
| WCF | HFO-1132(E) | mass % | 20.6 | 29.4 | 30.7 | 25.1 | 15.9 | 29.0 | 23.0 | 15.9 |
| | HFO-1123 | mass % | 4.8 | 26.8 | 22.0 | 11.1 | 0.0 | 23.2 | 9.2 | 0.0 |
| | R1234ze | mass % | 39.3 | 0.0 | 3.5 | 20.0 | 40.3 | 0.0 | 20.0 | 36.3 |
| | R32 | mass % | 35.3 | 43.8 | 43.8 | 43.8 | 43.8 | 47.8 | 47.8 | 47.8 |
| Leak conditions for achieving WCFF | | | Storage and transport at −40° C. and 0% release, gas phase side | Storage and transport at −40° C. and 78% release, liquid phase side | Storage and transport at −40° C. and 74% release, gas phase side | Storage and transport at −40° C. and 0% release, gas phase side | Storage and transport at −40° C. and 0% release, gas phase side | Storage and transport at −40° C. and 84% release, liquid phase side | Storage and transport at −40° C. and 0% release, gas phase side | Storage and transport at −40° C. and 0% release, gas phase side |
| WCFF | HFO-1132(E) | mass % | 30.8 | 27.4 | 30.9 | 31.1 | 26.1 | 23.8 | 29.5 | 25.5 |
| | HFO-1123 | mass % | 9.0 | 17.0 | 19.2 | '16.6 | 14.8 | 13.1 | 14.0 | 13.2 |
| | R1234ze | mass % | 13.4 | 0.0 | 3.1 | 6.2 | 0.0 | 0.0 | 6.3 | 61.3 |
| | R32 | mass % | 46.8 | 55.6 | 46.8 | 46.1 | 59.1 | 63.1 | 50.2 | 59.1 |
| Burning velocity (WCF) | | cm/s | 8 or less | 8 or less | 8 or less | 8 or less | 8 or less | 8 or less | 8 or less | 8 or less |
| Burning velocity (WCFF) | | cm/s | 10 | 10 | 10 | 10 | 10 | 10 | 10 | 10 |

These results indicate that a mixed refrigerant has a refrigerating capacity ratio of 85% or more relative to that of R410A, and a COP ratio of 92.5% or more relative to that of R410A, and further ensures a WCF lower flammability when the following requirements are satisfied. Specifically, when the mass % of HFO-1132 (E), HFO-1123, R1234ze, and R32 based on their sum in the mixed refrigerant is respectively represented by x, y, z, and a, if $0<a\leq11.1$, coordinates (x,y,z) in a ternary composition diagram in which the sum of HFO-1132 (E), HFO-1123, and R1234ze is (100−a) mass % are within the range of a figure surrounded by straight lines GG', G'B, BD, DC, and CG that connect the following 5 points:
point G $(0.0314a^2-1.8079a+72.0, 100-a-x, 0.0)$,
point G' $(0.0314a^2-1.8079a+72.0, -0.0199a^2+0.0677a+3.8, 100-a-x-y)$
point B $(0.0, 0.0057a^2-1.4197a+68.462, 100-a-y)$,
point D $(0.0, 0.0234a^2+0.0647a+86.3, 100-a-y)$, and
point C $(-0.189a^2-0.8664a+32.9, 100-a-x, 0.0)$,
or on the straight lines GG', G'B, and DC (excluding point B, point D, point C, and point G);

if $11.1<a\leq16.4$, coordinates (x,y,z) in the ternary composition diagram are within the range of a figure surrounded by straight lines GG', G'B, BO, and OG that connect the following 4 points:
point G $(0.015a^2-1.4701a+70.266, 100-a-x, 0.0)$,
point G' $(-1.0566a+67.528, -0.3962a+6.4981, 100-a-x-y)$,
point B $(0.0, 0.0057a^2-1.4197a+68.462, 100-a-y)$, and
point O $(0.0, 100-a, 0.0)$,
or on the straight lines GG' and G'B (excluding point B, point O, and point G);

if $16.4<a\leq26.6$, coordinates (x,y,z) in the ternary composition diagram are within the range of a figure surrounded by straight lines GI, IA, AB, BO, and OG that connect the following 5 points:
point G $(0.015a^2-1.4701a+70.266, 100-a-x, 0.0)$,
point I $(0.015a^2-1.4701a+70.266, 0.0, 100-a-x)$,
point A $(0.0076a^2-1.7a+76.031, 0.0, 100-a-x)$,
point B $(0.0, 0.0057a^2-1.4197a+68.462, 100-a-y)$, and
point O $(0.0, 100-a, 0.0)$,
or on the straight lines GI and AB (excluding point G, point I, point A, and point B);

if $26.6<a\leq43.8$, coordinates (x,y,z) in the ternary composition diagram are within the range of a figure surrounded by straight lines GI, IA, AB, BO, and OG that connect the following 5 points:

point G $(0.00738a^2-1.0762a+65.22, 100-a-x, 0.0)$,
point I $(0.00738a^2-1.0762a+65.22, 0.0, 100-a-x)$,
point A $(0.00582a^2-1.5915a+74.4, 0.0, 100-a-x)$,
point B $(0.0, 0.00328a^2-1.3169a+67.421, 100-a-y)$, and
point O $(0.0, 100-a, 0.0)$,
or on the straight lines GI and AB (excluding point G, point I, point A, and point B); and
  if $43.8<a\leq47.8$, coordinates (x,y,z) in the ternary composition diagram are within the range of a figure surrounded by straight lines GI, IA, AB, BO, and OG that connect the following 5 points:
point G $(-0.45a+51.91, 100-a-x, 0.0)$,
point I $(-0.45a+51.91, 0.0, 100-a-x)$,
point A $(-1.075a+62.985, 0.0, 100-a-x)$,
point B $(0.0, -1.025a+60.895, 100-a-y)$, and
point O $(0.0, 100-a, 0.0)$,
or on the straight lines GI and AB (excluding point G, point I, point A, and point B).

The results also indicate that a mixed refrigerant has a refrigerating capacity ratio of 85% or more relative to that of R410A, and a COP ratio of 92.5% or more relative to that of R410A, and further ensures an ASHRAE lower flammability when the following requirements are satisfied. Specifically, when the mass % of HFO-1132 (E), HFO-1123, R1234ze, and R32 based on their sum in the mixed refrigerant is respectively represented by x, y, z, and a,
  if $0<a\leq11.1$, coordinates (x,y,z) in a ternary composition diagram in which the sum of HFO-1132 (E), HFO-1123, and R1234ze is (100-a) mass % are within the range of a figure surrounded by straight lines JQ, QN, NM, MK, KB, BD, DC, and CJ that connect the following 8 points:
point J $(100-a-y, 0.0072a^2-0.1704a+52.9, 0.0)$,
point Q $(0.0112a^2-1.3048a+62.1, 96.5-a-x, 3.5)$,
point N $(0.0207a^2-1.5817a+65.9, -0.0547a^2+1.1392a+21.6, 100-a-x-y)$,
point M $(0.0278a^2-1.7325a+64.5, 80.0-a-x, 20.0)$,
point K $(0.0421a^2-2.2419a+62.5, 100-a-x-z, -0.0132a^2+0.768a+25.1)$,
point B $(0.0, 0.0057a^2-1.4197a+68.462, 100-a-y)$,
point D $(0.0, 0.0234a^2+0.0647a+86.3, 100-a-y)$, and
point C $(-0.189a^2-0.8664a+32.9, 100-a-x, 0.0)$,
or on the straight lines JQ, QN, NM, MK, and KB (excluding point J and point B);

if $11.1<a\leq26.6$, coordinates (x,y,z) in the ternary composition diagram are within the range of a figure surrounded by straight lines JQ, QN, NM, MK, KB, BO, and OJ that connect the following 7 points:
point J $(100-a-y, -0.0285a^2+0.5371a+49.443, 0.0)$,
point Q $(0.0166a^2-1.382a+62.291, 96.5-a-x, 3.5)$,
point N $(0.0183a^2-1.5044a+65.339, -0.0395a^2+1.4643a+16.116, 100-a-x-y)$,
point M $(0.0145a^2-1.4001a+62.448, 80.0-a-x, 20.0)$,
point K $(0.0184a^2-1.7325a+59.763, 100-a-x-z, -0.009a^2+0.6996a+25.34)$,
point B $(0.0, 0.0057a^2-1.4197a+68.462, 100-a-y)$, and
point O $(0.0, 100-a, 0.0)$,
or on the straight lines JQ, QN, NM, MK, and KB (excluding point J and point B);
  if $26.6<a\leq43.8$, coordinates (x,y,z) in the ternary composition diagram are within the range of a figure surrounded by straight lines JQ, QN, NM, MK, KB, BO, and OJ that connect the following 7 points:
point J $(100-a-y, 0.00542a^2-1.3598a+75.92, 0.0)$,
point Q $(0.0049a^2-0.728a+53.204, 96.5-a-x, 3.5)$,
point N $(0.0075a^2-0.971a+58.81, -0.0038a^2-0.0303a+30.581, 100-a-x-y)$,
point M $(0.0019a^2-0.7375a+53.782, 80.0-a-x, 20.0)$,
point K $(0.0086a^2-1.2345a+53.442, 100-a-x-z, -0.0045a^2+0.4752a+28.157)$,
point B $(0.0, 0.00328a^2-1.3169a+67.421, 100-a-y)$, and
point O $(0.0, 100-a, 0.0)$,
or on the straight lines JQ, QN, NM, MK, and KB (excluding point J and point B); and
  if $43.8<a\leq47.8$, coordinates (x,y,z) in the ternary composition diagram are within the range of a figure surrounded by straight lines JN, NM, MK, KA, AB, BO, and OJ that connect the following 7 points:
point J $(100-a-y, -0.9a+66.22, 0.0)$,
point N $(-0.425a+49.315, -0.3a+8.86, 100-a-x-y)$,
point M $(-0.525a+48.095, 80.0-a-x, 20.0)$,
point K $(15.9, 0.0, 84.1-a)$,
point A $(-1.075a+62.985, 0.0, 100-a-x)$,
point B $(0.0, -1.025a+60.895, 100-a-y)$, and
point O $(0.0, 100-a, 0.0)$,
or on the straight lines NM, MK, KA, and AB (excluding point J and point B).

The approximate expressions representing the coordinates of each point were obtained as shown below.

TABLE 20

| HFO-1132E | mass % | 76.2 | 67.3 | 58.1 | 58.1 | 50.2 | 36.2 |
|---|---|---|---|---|---|---|---|
| HFO-1123 | mass % | 0.0 | 0.0 | 0.0 | 0.0 | 0.0 | 0.0 |
| R1234ze | mass % | 23.8 | 27.4 | 30.8 | 30.8 | 33.4 | 37.2 |
| R32 | mass % | 0.0 | 5.3 | 11.1 | 11.1 | 16.4 | 26.6 |
| a = R32 | | a | | | | a | |
| x = HFO-1132E approximate expression | | $0.0084a^2 - 1.7237a + 76.2$ | | | $0.0076a^2 - 1.7a + 76.031$ | | |
| y = HFO-1123 approximate expression | | 0.0 | | | 0.0 | | |
| z = R1234ze approximate expression | | 100 − a − x | | | 100 − a − x | | |

| HFO-1132E | mass % | 36.2 | 25.5 | 15.9 | 15.9 | 11.6 |
|---|---|---|---|---|---|---|
| HFO-1123 | mass % | 0.0 | 0.0 | 0.0 | 0.0 | 0,0 |
| R1234ze | mass % | 37.2 | 39.2 | 40.3 | 40.3 | 40.6 |
| R32 | mass % | 26.6 | 35.3 | 43.8 | 43.8 | 47.8 |
| a = R32 | | a | | | a | |
| x = HFO-1132E approximate expression | | $0.00582a^2 - 1.5915a + 74.4$ | | | $-1.075a + 62.985$ | | |
| y = HFO-1123 approximate expression | | 0.0 | | | 0.0 | |
| z = R1234ze approximate expression | | 100 − a − x | | | 100 − a − x | |

TABLE 21

| | | | | | | | |
|---|---|---|---|---|---|---|---|
| HFO-1132E | mass% | 0.0 | 0.0 | 0.0 | 0.0 | 0.0 | 0.0 |
| HFO-1123 | mass% | 68.8 | 61.2 | 53.4 | 53.4 | 46.7 | 34.7 |
| R1234ze | mass% | 31.2 | 33.5 | 35.5 | 35.5 | 36.9 | 38.7 |
| R32 | mass% | 0.0 | 5.3 | 11.1 | 11.1 | 16.4 | 26.6 |
| a = R32 | | | a | | | a | |
| x = HFO-1132E approximate expression | | | 0.0 | | | 0.0 | |
| y = HFO-1123 approximate expression | | | $0.008a^2 - 1.4765a + 3068.8$ | | | $0.0057a^2 - 1.4197a + 68.462$ | |
| z = R1234ze approximate expression | | | 100-a-y | | | 100-a-y | |
| HFO-1132E | mass% | 0.0 | 0.0 | 0.0 | 0.0 | 0.0 | |
| HFO-1123 | mass% | 34.7 | 25.0 | 16.0 | 16.0 | 11.9 | |
| R1234ze | mass% | 38.7 | 39.7 | 40.2 | 40.2 | 40.3 | |
| R32 | mass% | 26.6 | 35.3 | 43.8 | 43.8 | 47.8 | |
| a = R32 | | | a | | | a | |
| x = HFO-1132E approximate expression | | | 0.0 | | | 0.0 | |
| y = HFO-1123 approximate expression | | | $0.00328a^2 - 1.3169a + 67.421$ | | | $-1.025a + 60.895$ | |
| z = R1234ze approximate expression | | | 100-a-y | | | 100-a-y | |

TABLE 22

| | | | | |
|---|---|---|---|---|
| HFO-1132E | mass% | 32.9 | 23.0 | 0.0 |
| HFO-1123 | mass% | 67.1 | 71.7 | 89.9 |
| R1234ze | mass% | 0.0 | 0.0 | 0.0 |
| R32 | mass% | 0.0 | 5.3 | 11.1 |
| a = R32 | | | a | |
| x = HFO-1132E approximate expression | | | $-0.189a^2 - 0.8664a + 32.9$ | |
| y = HFO-1123 approximate expression | | | $100 - a - x$ | |
| z = R1234ze approximate expression | | | 0.0 | |

TABLE 23

| | | | | |
|---|---|---|---|---|
| HFO-1132E | mass% | 0.0 | 0.0 | 0.0 |
| HFO-1123 | mass% | 86.3 | 87.3 | 89.9 |
| R1234ze | mass% | 13.7 | 7.4 | 0.0 |
| R32 | mass% | 0.0 | 5.3 | 11.1 |
| a = R32 | | | a | |
| x = HFO-1132E approximate expression | | | 0.0 | |
| y = HFO-1123 approximate expression | | | $0.0234a^2 + 0.0647a + 86.3$ | |
| z = R1234ze approximate expression | | | 100-a-y | |

TABLE 24

| | | | | | | | |
|---|---|---|---|---|---|---|---|
| HFO-1132E | mass % | 72.0 | 63.3 | 55.8 | 55.8 | 50.2 | 41.8 |
| HFO-1123 | mass % | 28.0 | 31.4 | 33.1 | 33.1 | 33.4 | 31.6 |
| R1234ze | mass % | 0.0 | 0.0 | 0.0 | 0.0 | 0.0 | 0.0 |
| R32 | mass % | 0.0 | 5.3 | 11.1 | 11.1 | 16.4 | 26.6 |
| a = R32 | | | a | | | a | |
| x = HFO-1132E approximate expression | | | $0.0314a^2 - 1.8079a + 72.0$ | | | $0.015a^2 - 1.4701a + 70.266$ | |
| y = HFO-1123 approximate expression | | | $100 - a - x$ | | | $100 - a - x$ | |
| z = R1234ze approximate expression | | | 0.0 | | | 0.0 | |
| HFO-1132E | mass % | 41.8 | 36.4 | 32.2 | 32.2 | 30.4 | |
| HFO-1123 | mass % | 31.6 | 28.3 | 24.0 | 24.0 | 21.8 | |
| R1234ze | mass % | 0.0 | 0.0 | 0.0 | 0.0 | 0.0 | |
| R32 | mass % | 26.6 | 35.3 | 43.8 | 43.8 | 47.8 | |
| a = R32 | | | a | | | a | |
| x = HFO-1132E approximate expression | | | $0.00738a^2 - 1.0762a + 65.22$ | | | $-0.45a + 51.91$ | |
| y = HFO-1123 approximate expression | | | $100 - a - x$ | | | $100 - a - x$ | |
| z = R1234ze approximate expression | | | 0.0 | | | 0.0 | |

TABLE 25

| | | | | | | |
|---|---|---|---|---|---|---|
| HFO-1132E | mass % | 72.0 | 63.3 | 55.8 | 55.8 | 50.2 |
| HFO-1123 | mass % | 3.8 | 3.6 | 2.1 | 2.1 | 0.0 |
| R1234ze | mass % | 24.2 | 33.1 | 31.0 | 31.0 | 33.4 |
| R32 | mass % | 0.0 | 5.3 | 11.1 | 11.1 | 16.4 |
| a = R32 | | | a | | | a |
| x = HFO-1132E approximate expression | | | $0.0314a^2 - 1.8079a + 72.0$ | | | $-1.0566a + 67.528$ |
| y = HFO-1123 approximate expression | | | $-0.0199a^2 + 0.0677a + 3.8$ | | | $-0.3962a + 6.4981$ |
| z = R1234ze approximate expression | | | $100 - a - x - y$ | | | $100 - a - x - y$ |

TABLE 26

| | | | | | | | |
|---|---|---|---|---|---|---|---|
| HFO-1132E | mass % | 72.0 | 63.3 | 55.8 | 55.8 | 50.2 | 41.8 |
| HFO-1123 | mass % | 0.0 | 0.0 | 0.0 | 0.0 | 0.0 | 0.0 |
| R1234ze | mass % | 28.0 | 31.4 | 33.1 | 33.1 | 33.4 | 31.6 |
| R32 | mass % | 0.0 | 5.3 | 11.1 | 11.1 | 16.4 | 26.6 |
| a = R32 | | | a | | | a | |
| x = HFO-1132E approximate expression | | | $0.0314a^2 - 1.8079a + 72.0$ | | | $0.015a^2 - 1.4701a + 70.266$ | |

TABLE 26-continued

| | | | | | | |
|---|---|---|---|---|---|---|
| y = HFO-1123 approximate expression | | 0.0 | | | 0.0 | |
| z = R1234ze approximate expression | | 100 − a − x | | | 100 − a − x | |
| HFO-1132E | mass % | 41.8 | 36.4 | 32.2 | 32.2 | 30.4 |
| HFO-1123 | mass % | 0.0 | 0.0 | 0.0 | 0.0 | 0.0 |
| R1234ze | mass % | 31.6 | 28.3 | 24.0 | 24.0 | 21.8 |
| R32 | mass % | 26.6 | 35.3 | 43.8 | 43.8 | 47.8 |
| a = R32 | | a | | | a | |
| x = HFO-1132E approximate expression | | $0.00738a^2 − 1.0762a + 65.22$ | | | $−0.45a + 51.91$ | |
| y = HFO-1123 approximate expression | | 0.0 | | | 0.0 | |
| z = R1234ze approximate expression | | 100 − a − x | | | 100 − a − x | |

TABLE 27

| | | | | | | | |
|---|---|---|---|---|---|---|---|
| HFO-1132E | mass % | 47.1 | 42.5 | 37.0 | 37.0 | 33.0 | 29.8 |
| HFO-1123 | mass % | 52.9 | 52.2 | 51.9 | 51.9 | 50.6 | 43.6 |
| R1234ze | mass % | 0.0 | 0.0 | 0.0 | 0.0 | 0.0 | 0.0 |
| R32 | mass % | 0.0 | 5.3 | 11.1 | 11.1 | 16.4 | 26.6 |
| a = R32 | | a | | | a | | |
| x = HFO-1132E approximate expression | | 100 − a − y | | | 100 − a − y | | |
| y = HFO-1123 approximate expression | | $0.0072a^2 − 0.1704a + 52.9$ | | | $−0.0285a^2 + 0.5371a + 49.443$ | | |
| z = R1234ze approximate expression | | 0.0 | | | 0.0 | | |

| | | | | | | |
|---|---|---|---|---|---|---|
| HFO-1132E | mass % | 29.8 | 30.0 | 29.4 | 29.4 | 29.0 |
| HFO-1123 | mass % | 43.6 | 34.7 | 26.8 | 26.8 | 23.2 |
| R1234ze | mass % | 0.0 | 0.0 | 0.0 | 0.0 | 0.0 |
| R32 | mass % | 26.6 | 35.3 | 43.8 | 43.8 | 47.8 |
| a = R32 | | a | | | a | |
| x = HFO-1132E approximate expression | | 100 − a − y | | | 100 − a − y | |
| y = HFO-1123 approximate expression | | $0.00542a^2 − 1.3598a + 75.92$ | | | $−0.9a + 66.22$ | |
| z = R1234ze approximate expression | | 0.0 | | | 0 | |

TABLE 28

| | | | | | | | |
|---|---|---|---|---|---|---|---|
| HFO-1132E | mass % | 62.1 | 55.5 | 49.0 | 49.0 | 44.1 | 37.3 |
| HFO-1123 | mass % | 34.5 | 41.0 | 36.4 | 36.4 | 36.0 | 32.6 |
| R1234ze | mass % | 3.4 | 3.5 | 3.5 | 3.5 | 3.5 | 3.5 |
| R32 | mass % | 0.0 | 5.3 | 11.1 | 11.1 | 16.4 | 26.6 |
| a = R32 | | a | | | a | | |
| x = HFO-1132E approximate expression | | $0.0112a^2 − 1.3048a + 62.1$ | | | $0.0166a^2 − 1.382a + 62.291$ | | |
| y = HFO-1123 approximate expression | | 96.5 − a − x | | | 96.5 − a − x | | |
| z = R1234ze approximate expression | | 3.5 | | | 3.5 | | |

| | | | | |
|---|---|---|---|---|
| HFO-1132E | mass % | 37.3 | 33.6 | 30.7 |
| HFO-1123 | mass % | 32.6 | 27.6 | 22.0 |
| R1234ze | mass % | 3.5 | 3.5 | 3.5 |
| R32 | mass % | 26.6 | 35.3 | 43.8 |
| a = R32 | | a | | |
| x = HFO-1132E approximate expression | | $0.0049a^2 − 0.728a + 53.204$ | | |
| y = HFO-1123 approximate expression | | 96.5 − a − x | | |
| z = R1234ze approximate expression | | 3.5 | | |

TABLE 29

| | | | | | | | |
|---|---|---|---|---|---|---|---|
| HFO-1132E | mass % | 65.9 | 58.1 | 50.9 | 50.9 | 45.6 | 38.3 |
| HFO-1123 | mass % | 21.6 | 26.1 | 27.5 | 27.5 | 29.5 | 27.1 |
| R1234ze | mass % | 12.5 | 10.5 | 10.5 | 10.5 | 8.5 | 8.0 |
| R32 | mass % | 0.0 | 5.3 | 11.1 | 11.1 | 16.4 | 26.6 |
| a = R32 | | a | | | x | | |
| x = HFO-1132E approximate expression | | $0.0207a^2 − 1.5817a + 65.9$ | | | $0.0183a^2 − 1.5044a + 65.339$ | | |
| y = HFO-1123 approximate expression | | $−0.0547a^2 + 1.1392a + 21.6$ | | | $−0.0395a^2 + 1.4643a + 16.116$ | | |
| z = R1234ze approximate expression | | 100 − a − x − y | | | 100 − a − x − y | | |

| | | | | | | |
|---|---|---|---|---|---|---|
| HFO-1132E | mass % | 38.3 | 33.9 | 30.7 | 30.7 | 29.0 |
| HFO-1123 | mass % | 27.1 | 24.8 | 22.0 | 22.0 | 23.2 |
| R1234ze | mass % | 8.0 | 6.0 | 3.5 | 3.5 | 0.0 |
| R32 | mass % | 26.6 | 35.3 | 43.8 | 43.8 | 47.8 |

TABLE 29-continued

| | | |
|---|---|---|
| a = R32 | a | a |
| x = HFO-1132E approximate expression | $0.0075a^2 - 0.971a + 58.81$ | $-0.425a + 49.315$ |
| y = HFO-1123 approximate expression | $-0.0038a^2 - 0.0303a + 30.581$ | $-0.3a + 8.86$ |
| z = R1234ze approximate expression | $100 - a - x - y$ | |

TABLE 30

| | | | | | | | |
|---|---|---|---|---|---|---|---|
| HFO-1132E | mass % | 64.5 | 56.1 | 48.7 | 48.7 | 43.4 | 35.5 |
| HFO-1123 | mass % | 15.5 | 18.6 | 20.2 | 20.2 | 20.0 | 17.9 |
| R1234ze | mass % | 20.0 | 20.0 | 20.0 | 20.0 | 20.0 | 20.0 |
| R32 | mass % | 0.0 | 5.3 | 11.1 | 11.1 | 16.4 | 26.6 |
| a = R32 | | | a | | | x | |
| x = HFO-1132E approximate expression | | | $0.0278a^2 - 1.7325a + 64.5$ | | | $0.0145a^2 - 1.4001a + 62.448$ | |
| y = HFO-1123 approximate expression | | | $80.0 - a - x$ | | | $80.0 - a - x$ | |
| z = R1234ze approximate expression | | | 20.0 | | | 20.0 | |
| HFO-1132E | mass % | 35.5 | 30.1 | 25.1 | 25.1 | 23.0 | |
| HFO-1123 | mass % | 17.9 | 14.6 | 11.1 | 11.1 | 9.2 | |
| R1234ze | mass % | 20.0 | 20.0 | 20.0 | 20.0 | 20.0 | |
| R32 | mass % | 26.6 | 35.3 | 43.8 | 43.8 | 47.8 | |
| a = R32 | | | x | | | x | |
| x = HFO-1132E approximate expression | | $0.0019a^2 - 0.7375a + 53.782$ | | | $-0.525a + 48.095$ | | |
| y = HFO-1123 approximate expression | | | $80.0 - a - x$ | | | $80.0 - a - x$ | |
| z = R1234ze approximate expression | | | 20.0 | | | 20.0 | |

TABLE 31

| | | | | | | | |
|---|---|---|---|---|---|---|---|
| HFO-1132E | mass % | 62.5 | 51.8 | 42.8 | 42.8 | 36.3 | 26.7 |
| HFO-1123 | mass % | 12.4 | 14.1 | 14.1 | 14.1 | 12.9 | 9.1 |
| R1234ze | mass % | 25.1 | 28.8 | 32.0 | 32.0 | 34.4 | 37.6 |
| R32 | mass % | 0.0 | 5.3 | 11.1 | 11.1 | 16.4 | 26.6 |
| a = R32 | | | a | | | a | |
| x = HFO-1132E approximate expression | | | $0.0421a^2 - 2.2419a + 62.5$ | | | $0.0184a^2 - 1.7325a + 59.763$ | |
| y = HFO-1123 approximate expression | | | $100 - a - x - z$ | | | $100 - a - x - z$ | |
| z = R1234ze approximate expression | | | $-0.0132a^2 + 0.768a + 25.1$ | | | $-0.009a^2 + 0.6996a + 25.34$ | |
| HFO-1132E | mass % | 26.7 | 20.6 | 15.9 | 15.9 | 15.9 | |
| HFO-1123 | mass % | 9.1 | 4.8 | 0.0 | 0.0 | 0.0 | |
| R1234ze | mass % | 37.6 | 39.3 | 40.3 | 40.3 | 36.3 | |
| R32 | mass % | 26.6 | 35.3 | 43.8 | 43.8 | 47.8 | |
| a = R32 | | | a | | | a | |
| x = HFO-1132E approximate expression | | | $0.0086a^2 - 1.2345a + 53.442$ | | | 15.9 | |
| y = HFO-1123 approximate expression | | | $100 - a - x - z$ | | | 0.0 | |
| z = R1234ze approximate expression | | | $-0.0045a^2 + 0.4752a + 28.157$ | | | $84.1 - a$ | |

Next, mixed refrigerants were prepared by mixing HFO-1132 (E), HFO-1123, R1234ze, R1234yf, and R32 at a mass % based on their sum as shown in Tables 32 to 40. In the following, the ratio of R1234yf to the sum of R1234ze and R1234yf is defined as r.

TABLE 32

| Item | Unit | Com Ex 49 $A_{r=0.5}$ | Com Ex 50 $B_{r=0.5}$ | Com Ex 51 $D_{r=0.5}$ | Example 35 $G'_{r=0.5}$ | Com Ex 52 $I_{r=0.5}$ | Example 36 $K_{r=0.5}$ | Com Ex 53 $A_{r=0.59} = G'_{r=0.59}$ = $I_{r=0.59}$ | Com Ex 54 $A_{r=1.0}$ |
|---|---|---|---|---|---|---|---|---|---|
| HFO-1132 (E) | mass % | 72.8 | 0.0 | 0.0 | 72.0 | 72.0 | 62.8 | 72.0 | 68.6 |
| HFO-1123 | mass % | 0.0 | 64.0 | 83.8 | 0.8 | 0.0 | 8.8 | 0.0 | 0.0 |
| R1234 (ze + yf) | mass % | 27.2 | 36.0 | 16.2 | 27.2 | 28.0 | 28.4 | 28.0 | 31.4 |
| R32 | mass % | 0.0 | 0.0 | 0.0 | 0.0 | 0.0 | 0.0 | 0.0 | 0.0 |
| GWP | — | 2 | 2 | 2 | 2 | 2 | 2 | 2 | 2 |
| COP ratio | % (relative to R410A) | 100.5 | 95.6 | 92.5 | 100.4 | 100.5 | 99.6 | 100.4 | 100.0 |
| Refrigerating capacity ratio | % (relative to R410A) | 85.0 | 85.0 | 98.0 | 85.2 | 84.6 | 85.8 | 85.0 | 85.0 |
| Condensation glide | ° C. | 2.7 | 6.1 | 2.3 | 2.7 | 2.7 | 3.4 | 2.5 | 2.0 |

TABLE 33

| Item | Unit | Com Ex 55 $B_{r=1.0}$ | Com Ex 56 $D_{r=1.0}$ | Com Ex 57 $I_{r=1.0}$ | Example 37 $K_{r=1.0}$ | Com Ex 58 $A_{r=0.5} = G'_{r=0.5} = I_{r=0.5}$ | Com Ex 59 $B_{r=0.5}$ | Com Ex 60 $D_{r=0.5}$ | Example 38 $K_{r=0.5}$ |
|---|---|---|---|---|---|---|---|---|---|
| HFO-1132 (E) | mass % | 0.0 | 0.0 | 72.0 | 61.7 | 63.3 | 0.0 | 0.0 | 51.3 |
| HFO-1123 | mass % | 58.7 | 80.1 | 0.0 | 5.9 | 0.0 | 56.1 | 84.7 | 10.6 |
| R1234 (ze + yf) | mass % | 41.3 | 19.9 | 28.0 | 32.4 | 31.4 | 38.6 | 10.0 | 32.8 |
| R32 | mass % | 0.0 | 0.0 | 0.0 | 0.0 | 5.3 | 5.3 | 5.3 | 5.3 |
| GWP | — | 2 | 2 | 2 | 2 | 38 | 38 | 37 | 38 |
| COP ratio | % (relative to R410A) | 95.5 | 92.5 | 99.9 | 99.4 | 100.4 | 96.8 | 92.6 | 99.5 |
| Refrigerating capacity ratio | % (relative to R410A) | 85.0 | 97.7 | 86.6 | 85.5 | 85.0 | 85.0 | 103.9 | 85.7 |
| Condensation glide | ° C. | 5.4 | 1.9 | 1.7 | 2.5 | 3.5 | 6.6 | 1.4 | 4.3 |

TABLE 34

| Item | Unit | Com Ex 61 $A_{r=1.0}$ | Com Ex 62 $B_{r=1.0}$ | Com Ex 63 $D_{r=1.0}$ | Com Ex 64 $I_{r=1.0}$ | Example 39 $K_{r=1.0}$ | Com Ex 65 $A_{r=0.28} = G'_{r=0.28} = I_{r=0.28}$ | Com Ex 66 $A_{r=0.5}$ | Com Ex 67 $B_{r=0.5}$ |
|---|---|---|---|---|---|---|---|---|---|
| HFO-1132 (E) | mass % | 58.5 | 0.0 | 0.0 | 63.3 | 50.2 | 55.8 | 53.7 | 0.0 |
| HFO-1123 | mass % | 0.0 | 50.5 | 82.4 | 0.0 | 7.2 | 0.0 | 0.0 | 48.1 |
| R1234 (ze + yf) | mass % | 36.2 | 44.2 | 12.3 | 31.4 | 37.3 | 33.1 | 35.2 | 40.8 |
| R32 | mass % | 5.3 | 5.3 | 5.3 | 5.3 | 5.3 | 11.1 | 11.1 | 11.1 |
| GWP | — | 38 | 38 | 37 | 38 | 38 | 77 | 77 | 77 |
| COP ratio | % (relative to R410A) | 99.8 | 96.6 | 92.6 | 99.7 | 99.2 | 100.7 | 100.5 | 98.0 |
| Refrigerating capacity ratio | % (relative to R410A) | 85.0 | 85.0 | 103.9 | 87.3 | 85.5 | 85.0 | 85.0 | 85.0 |
| Condensation glide | ° C. | 2.7 | 5.7 | 1.1 | 2.3 | 3.3 | 4.7 | 4.3 | 6.9 |

TABLE 35

| Item | Unit | Com Ex 68 $I_{r=0.5}$ | Example 40 $K_{r=0.5}$ | Com Ex 69 $A_{r=1.0}$ | Com Ex 70 $B_{r=1.0}$ | Com Ex 71 $I_{r=1.0}$ | Example 41 $K_{r=1.0}$ | Com Ex 72 $A_{r=0.5}$ | Com Ex 73 $B_{r=0.5}$ |
|---|---|---|---|---|---|---|---|---|---|
| HFO-1132 (E) | mass % | 37.0 | 42.1 | 48.4 | 0.0 | 37.0 | 40.9 | 45.4 | 0.0 |
| HFO-1123 | mass % | 51.9 | 10.4 | 0.0 | 42.3 | 51.9 | 6.6 | 0.0 | 41.2 |
| R1234 (ze + yf) | mass % | 0.0 | 36.4 | 40.5 | 46.6 | 0.0 | 41.4 | 38.2 | 42.4 |
| R32 | mass % | 11.1 | 11.1 | 11.1 | 11.1 | 11.1 | 11.1 | 16.4 | 16.4 |
| GWP | — | 76 | 77 | 77 | 77 | 76 | 77 | 113 | 113 |
| COP ratio | % (relative to R410A) | 94.3 | 99.7 | 99.8 | 97.6 | 94.3 | 99.3 | 100.6 | 98.9 |
| Refrigerating capacity ratio | % (relative to R410A) | 110.2 | 85.6 | 85.0 | 85.0 | 110.2 | 85.4 | 85.0 | 85.0 |
| Condensation glide | ° C. | 0.2 | 5.0 | 3.4 | 5.8 | 0.2 | 3.8 | 4.8 | 7.0 |

TABLE 36

| Item | Unit | Com Ex74 $I_{r=.5}$ | Example42 $K_{r=0.5}$ | Com Ex75 $A_{r=1.0}$ | Com Ex76 $B_{r=1.0}$ | Com Ex77 $I_{r=1.0}$ | Example43 $K_{r=0.5}$ | Com Ex78 $A_{r=0.5}$ | Com Ex79 $B_{r=0.5}$ |
|---|---|---|---|---|---|---|---|---|---|
| HFO-1132(E) | mass % | 50.2 | 35.4 | 36.4 | 0.0 | 50.2 | 32.6 | 31.0 | 0.0 |
| HFO-1123 | mass % | 0.0 | 9.0 | 0.0 | 33.0 | 0.0 | 3.4 | 0.0 | 29.0 |
| R1234(ze + yf) | mass % | 33.4 | 39.2 | 47.2 | 49.1 | 33.4 | 47.6 | 42.4 | 44.4 |
| R32 | mass % | 16.4 | 16.4 | 16.4 | 16.4 | 16.4 | 16.4 | 26.6 | 26.6 |
| GWP | — | 113 | 113 | 113 | 113 | 113 | 113 | 182 | 182 |
| COP ratio | % (対R410A) | 100.3 | 100.1 | 99.9 | 98.4 | 99.4 | 99.6 | 101.2 | 100.4 |
| Refrigerating capacity ratio | % (対R410A) | 87.7 | 85.4 | 85.0 | 85.0 | 90.2 | 85.3 | 85.0 | 85.0 |
| Condensation glide | ° C. | 4.2 | 5.4 | 3.8 | 5.6 | 2.7 | 4.1 | 5.4 | 6.6 |

TABLE 37

| Item | Unit | Com Ex 80 $I_{r=0.5}$ | Example 44 $K_{r=0.5}$ | Com Ex 81 $A_{r=1.0} = K_{r=1.0}$ | Com Ex 82 $B_{r=1.0}$ | Com Ex 83 $I_{r=1.0}$ | Com Ex 84 $A_{r=0.5} = K_{r=0.5}$ | Com Ex 85 $B_{r=0.5}$ | Com Ex 86 $I_{r=0.5}$ |
|---|---|---|---|---|---|---|---|---|---|
| HFO-1132 (E) | mass % | 41.8 | 25.9 | 24.9 | 0.0 | 41.8 | 19.9 | 0.0 | 36.4 |
| HFO-1123 | mass % | 0.0 | 4.7 | 0.0 | 23.0 | 0.0 | 0.0 | 19.3 | 0.0 |
| R1234 (ze + yf) | mass % | 31.6 | 42.8 | 48.5 | 50.4 | 31.6 | 44.8 | 45.4 | 28.3 |
| R32 | mass % | 26.6 | 26.6 | 26.6 | 26.6 | 26.6 | 35.3 | 35.3 | 35.3 |
| GWP | — | 182 | 182 | 182 | 182 | 181 | 241 | 241 | 240 |
| COP ratio | % (relative to R410A) | 100.2 | 101.0 | 100.4 | 99.8 | 99.4 | 101.8 | 101.4 | 100.3 |
| Refrigerating capacity ratio | % (relative to R410A) | 91.2 | 85.1 | 85.0 | 85.0 | 93.8 | 85.0 | 85.0 | 94.7 |
| Condensation glide | ° C. | 3.9 | 5.6 | 4.1 | 5.0 | 2.5 | 5.42 | 6.0 | 3.3 |

TABLE 38

| Item | Unit | Com Ex 87 $A_{r=1.0}$ | Com Ex 88 $B_{r=1.0}$ | Com Ex 89 $I_{r=1.0}$ | Com Ex 90 $K_{r=1.0}$ | Com Ex 91 $A_{r=0.5}$ | Com Ex 92 $B_{r=0.5}$ | Com Ex 93 $I_{r=0.5}$ | Com Ex 94 $K_{r=0.5}$ |
|---|---|---|---|---|---|---|---|---|---|
| HFO-1132 (E) | mass % | 13.8 | 0.0 | 36.4 | 22.9 | 10.4 | 0.0 | 32.2 | 18.8 |
| HFO-1123 | mass % | 0.0 | 13.2 | 0.0 | 0.0 | 0.0 | 10.4 | 0.0 | 0.0 |
| R1234 (ze + yf) | mass % | 50.9 | 51.5 | 28.3 | 41.8 | 45.8 | 45.8 | 24.0 | 37.4 |
| R32 | mass % | 35.3 | 35.3 | 35.3 | 35.3 | 43.8 | 43.8 | 43.8 | 43.8 |
| GWP | — | 240 | 240 | 240 | 240 | 298 | 298 | 297 | 298 |
| COP ratio | % (relative to R410A) | 101.1 | 100.8 | 99.6 | 100.4 | 102.5 | 102.3 | 100.4 | 101.6 |
| Refrigerating capacity ratio | % (relative to R410A) | 85.0 | 85.0 | 97.1 | 90.1 | 85.0 | 85.0 | 98.2 | 90.3 |
| Condensation glide | ° C. | 3.9 | 4.3 | 2.0 | 3.1 | 5.1 | 5.27 | 2.7 | 4.2 |

TABLE 39

| Item | Unit | Com Ex 95 $A_{r=1.0}$ | Com Ex 96 $B_{r=1.0}$ | Com Ex 97 $I_{r=1.0}$ | Com Ex 98 $K_{r=1.0}$ | Com Ex 99 $A_{r=0.5}$ | Com Ex 100 $B_{r=0.5}$ | Com Ex 101 $I_{r=0.5}$ | Com Ex 102 $K_{r=0.5}$ |
|---|---|---|---|---|---|---|---|---|---|
| HFO-1132 (E) | mass % | 4.1 | 0.0 | 32.2 | 21.2 | 6.2 | 0.0 | 30.4 | 18.4 |
| HFO-1123 | mass % | 0.0 | 4.1 | 0.0 | 0.0 | 0.0 | 2.5 | 0.0 | 0.0 |
| R1234ze | mass % | 52.1 | 52.1 | 24.0 | 35.0 | 46.0 | 46.0 | 21.8 | 33.8 |
| R32 | mass % | 43.8 | 43.8 | 43.8 | 43.8 | 47.8 | 47.8 | 47.8 | 47.8 |
| GWP | — | 298 | 298 | 297 | 297 | 325 | 325 | 324 | 325 |
| COP ratio | % (relative to R410A) | 101.8 | 101.7 | 99.8 | 100.5 | 102.8 | 102.7 | 100.5 | 101.5 |
| Refrigerating capacity ratio | % (relative to R410A) | 85.0 | 85.0 | 100.3 | 94.7 | 85.0 | 85.0 | 99.9 | 92.8 |
| Condensation glide | ° C. | 3.4 | 3.5 | 1.6 | 2.3 | 4.8 | 4.9 | 2.4 | 3.7 |

TABLE 40

| Item | Unit | Com Ex 103 $A_{r-1.0} - B_{r-1.0}$ | Com Ex 104 $I_{r-1.0}$ | Com Ex 105 $K_{r-1.0}$ |
|---|---|---|---|---|
| HFO-1132 (E) | mass% | 0.0 | 30.4 | 20.4 |
| HFO-1123 | mass% | 0.0 | 0.0 | 0.0 |
| R1234(ze + yf) | mass% | 52.2 | 21.8 | 31.8 |
| R32 | mass% | 47.8 | 47.8 | 47.8 |
| GWP | — | 325 | 324 | 324 |
| COP ratio | % (relative to R410A) | 102.1 | 100.0 | 100.6 |
| Refrigerating capacity ratio | % (relative to R410A) | 85.0 | 101.8 | 96.8 |
| Condensation glide | °C. | 3.1 | 1.4 | 2.0 |

Tables 41 to 47 show the results obtained by evaluating the flammability of the mixed refrigerants in the same manner as stated above.

TABLE 41

| | Item | Unit | $G'_{r=0.5}$ | $I_{r=0.5}$ | $A_{r=0.59} = G'_{r=0.59} = I_{r=0.59}$ | $I_{r=1.0}$ | $A_{r=0.5} = G'_{r=0.5} = I_{r=0.5}$ | $I_{r=1.0}$ | $A_{r=0.28} = G'_{r=0.28} = I_{r=0.28}$ | $I_{r=0.5}$ |
|---|---|---|---|---|---|---|---|---|---|---|
| WCF | HFO-1132 (E) | mass % | 72.0 | 72.0 | 72.0 | 72.0 | 63.3 | 63.3 | 55.8 | 37.0 |
| | HFO-1123 | mass % | 0.8 | 0.0 | 0.0 | 0.0 | 0.0 | 0.0 | 0.0 | 51.9 |
| | R1234 (ze + yf) | mass % | 27.2 | 28.0 | 28.0 | 28.0 | 31.4 | 31.4 | 33.1 | 0.0 |

TABLE 41-continued

| Item | Unit | $G'_{r=0.5}$ | $I_{r=0.5}$ | $A_{r=0.59} = G'_{r=0.59} = I_{r=0.59}$ | $I_{r=1.0}$ | $A_{r=0.5} = G'_{r=0.5} = I_{r=0.5}$ | $I_{r=1.0}$ | $A_{r=0.28} = G'_{r=0.28} = I_{r=0.28}$ | $I_{r=0.5}$ |
|---|---|---|---|---|---|---|---|---|---|
| R32 | mass % | 0.0 | 0.0 | 0.0 | 0.0 | 5.3 | 5.3 | 11.1 | 11.1 |
| Burning Verocity (WCF) | cm/s | 10 | 10 | 10 | 10 | 10 | 10 | 10 | 10 |

TABLE 42

| | Item | Unit | $I_{r=1.0}$ | $I_{r=0.5}$ | $I_{r=1.0}$ | $I_{r=0.5}$ | $I_{r=1.0}$ | $I_{r=0.5}$ | $I_{r=1.0}$ | $I_{r=0.5}$ |
|---|---|---|---|---|---|---|---|---|---|---|
| WCF | HFO-1132 (E) | mass % | 37.0 | 50.2 | 50.2 | 41.8 | 41.8 | 36.4 | 36.4 | 32.2 |
| | HFO-1123 | mass % | 51.9 | 0.0 | 0.0 | 0.0 | 0.0 | 0.0 | 0.0 | 0.0 |
| | R1234 (ze + yf) | mass % | 0.0 | 33.4 | 33.4 | 31.6 | 31.6 | 28.3 | 28.3 | 24.0 |
| | R32 | mass % | 11.1 | 16.4 | 16.4 | 26.6 | 26.6 | 35.3 | 35.3 | 43.8 |
| Burning Verocity (WCF) | | cm/s | 10 | 10 | 10 | 10 | 10 | 10 | 10 | 10 |

TABLE 43

| | Item | Unit | $I_{r=1.0}$ | $I_{r=0.5}$ | $I_{r=1.0}$ |
|---|---|---|---|---|---|
| WCF | HFO-1132 (E) | mass % | 32.2 | 30.4 | 30.4 |
| | HFO-1123 | mass % | 0.0 | 0.0 | 0.0 |
| | R1234 (ze + yf) | mass % | 24.0 | 21.8 | 21.8 |
| | R32 | mass % | 43.8 | 47.8 | 47.8 |
| Burning Verocity (WCF) | | cm/s | 10 | 10 | 10 |

TABLE 44

| | Item | Unit | $Q_{r=0.5}$ | $N_{r=0.5}$ | $K_{r=0.5}$ | $Q_{r=1.0}$ | $N_{r=1.0}$ | $K_{r=1.0}$ | $K_{r=0.5}$ | $K_{r=1.0}$ |
|---|---|---|---|---|---|---|---|---|---|---|
| WCF | HFO-1132(E) | mass % | 63.4 | 67.3 | 62.8 | 66.0 | 68.6 | 61.7 | 51.3 | 50.2 |
| | HFO-1123 | mass % | 31.8 | 17.7 | 8.8 | 26.2 | 16.2 | 5.9 | 10.6 | 7.2 |
| | R1234(ze + yf) | mass % | 4.8 | 15.0 | 28.4 | 7.8 | 15.2 | 32.4 | 32.8 | 37.3 |
| | R32 | mass % | 0.0 | 0.0 | 0.0 | 0.0 | 0.0 | 0.0 | 5.3 | 5.3 |
| | Leak conditions for achieving WCFF | | Storage and transport at −40° C. 88% release, gas phase side | Storage and transport at −40° C. 68% release, liquid phase side | Storage and transport at −40° C. 20% release, gas phase side | Storage and transport at −40° C. 86% release, gas phase side | Storage and transport at −40° C. 68% release, gas phase side | Storage and transport at −40° C. 0% release, gas phase side | Storage and transport at −40° C. 0% release, gas phase side | Storage and transport at −40° C. 0% release, gas phase side |
| WCFF | HFO-1132(E) | mass % | 72.0 | 72.0 | 72.0 | 72.0 | 72.0 | 72.0 | 59.6 | 59.3 |
| | HFO-1123 | mass % | 18.7 | 14.5 | 13.4 | 15.7 | 13.1 | 10.9 | 18.3 | 12.8 |
| | R1234ze | mass % | 4.8 | 5.9 | 5.6 | 0.0 | 0.0 | 0.0 | 5.2 | 0.0 |
| | R1234yf | mass % | 4.7 | 7.6 | 9.0 | 12.3 | 14.9 | 18.1 | 8.9 | 19.7 |
| | R32 | mass % | 0.0 | 0.0 | 0.0 | 0.0 | 0.0 | 0.0 | 8.0 | 8.2 |
| | Burning Verocity (WCF) | cm/s | 8 or less | 8.5 | 8 or less | 8.1 | 8.9 | 8 or less | 8 or less | 8 or less |
| | Burning velocity (WCFF) | cm/s | 10 | 10 | 10 | 10 | 10 | 10 | 10 | 10 |

TABLE 45

| | Item | Unit | $K_{r=0.5}$ | $K_{r=1.0}$ | $K_{r=0.5}$ | $K_{r=1.0}$ | $K_{r=0.5}$ | $A_{r=1.0} = K_{r=1.0}$ | $A_{r=0.5} = K_{r=0.5}$ | $K_{r=1.0}$ |
|---|---|---|---|---|---|---|---|---|---|---|
| WCF | HFO-1132 (E) | mass % | 42.1 | 40.9 | 35.4 | 32.6 | 25.9 | 24.9 | 19.9 | 22.9 |
| | HFO-1123 | mass % | 10.4 | 6.6 | 9.0 | 3.4 | 4.7 | 0.0 | 0.0 | 0.0 |
| | R1234 ze | mass % | 36.4 | 41.4 | 39.2 | 47.6 | 42.8 | 48.5 | 44.8 | 41.8 |
| | R32 | mass % | 11.1 | 11.1 | 16.4 | 16.4 | 26.6 | 26.6 | 35.3 | 35.3 |
| | Leak conditions for achieving WCFF | | and transport at −40° C. 0% release, gas phase side | and transport at −40° C. 0% release, gas phase side | and transport at −40° C. 0% release, gas phase side | and transport at −40° C. 0% release, gas phase side | and transport at −40° C. 0% release, gas phase side | and transport at −40° C. 0% release, liquid phase side | and transport at −40° C. 0% release, gas phase side | and transport at −40° C. 0% release, gas phase side |

TABLE 45-continued

| | Item | Unit | $K_{r=0.5}$ | $K_{r=1.0}$ | $K_{r=0.5}$ | $K_{r=1.0}$ | $K_{r=0.5}$ | $A_{r=1.0} = K_{r=1.0}$ | $A_{r=0.5} = K_{r=0.5}$ | $K_{r=1.0}$ |
|---|---|---|---|---|---|---|---|---|---|---|
| WCFF | HFO-1132 (E) | mass % | 50.5 | 50.2 | 44.7 | 43.5 | 36.0 | 35.4 | 30.3 | 31.9 |
| | HFO-1123 | mass % | 17.6 | 11.7 | 15.5 | 6.3 | 8.4 | 0.0 | 0.0 | 0.0 |
| | R1234ze | mass % | 5.9 | 0.0 | 6.2 | 0.0 | 7.1 | 0.0 | 7.9 | 0.0 |
| | R1234yf | mass % | 9.8 | 21.8 | 10.8 | 25.9 | 12.4 | 27.4 | 13.8 | 23.6 |
| | R32 | mass % | 16.2 | 16.3 | 22.8 | 24.3 | 36.1 | 37.2 | 48.0 | 44.5 |
| Burning Verocity (WCF) | | cm/s | 8 or less | 8 or less | 8 or less | 8 or less | 8 or less | 8 or less | 8 or less | 8 or less |
| Burning velocity (WCFF) | | cm/s | 10 | 10 | 10 | 10 | 10 | 10 | 10 | 10 |

TABLE 46

| | Item | Unit | $K_{r=0.5}$ | $K_{r=1.0}$ | $K_{r=0.5}$ | $K_{r=1.0}$ |
|---|---|---|---|---|---|---|
| WCF | HFO-1132 (E) | mass % | 18.8 | 21.2 | 18.4 | 20.4 |
| | HFO-1123 | mass % | 0.0 | 0.0 | 0.0 | 0.0 |
| | R1234ze | mass % | 37.4 | 35.0 | 33.8 | 31.8 |
| | R32 | mass % | 43.8 | 43.8 | 47.8 | 47.8 |
| Leak conditions for achieving WCFF | | | and transport at −40° C. 0% release, gas phase | and transport at −40° C. 0% release, gas phase | and transport at −40° C. 0% release, liquid | and transport at −40° C. 0% release, gas phase |
| WCFF | HFO-1132 (E) | mass % | 27.9 | 29.2 | 27.0 | 28.1 |
| | HFO-1123 | mass % | 0.0 | 0.0 | 0.0 | 0.0 |
| | R1234ze | mass % | 6.5 | 0.0 | 5.9 | 0.0 |
| | R1234yf | mass % | 11.5 | 19.9 | 10.3 | 18.2 |
| | R32 | mass % | 54.1 | 50.9 | 56.8 | 53.7 |
| Burning Verocity (WCF) | | cm/s | 8 or less | 8 or less | 8 or less | 8 or less |
| Burning velocity (WCFF) | | cm/s | 10 | 10 | 10 | 10 |

These results indicate that the refrigerant according to the present disclosure has a refrigerating capacity ratio of 85% or more relative to that of R410A, and a COP ratio of 92.5% or more relative to that of R410A, and further ensures a WCF lower flammability when the following requirements are satisfied. Specifically, when the mass % of HFO-1132 (E), HFO-1123, R1234yf, R1234ze, and R32 based on their sum in the mixed refrigerant is respectively x, y, $z_1$, $z_2$, and a, the sum of $z_1$ and $z_2$ is z, $z_1/z$ is r, and $w=-0.00162a^2-0.0097a+0.592$, if $0<a\le 11.1$, and $0<r\le w$, coordinates (x,y,z) in a ternary composition diagram whose vertices are a point of (100−a) mass % of HFO-1132 (E), a point of (100−a) mass % of HFO-1123, and a point of (100−a) mass % of the sum of R1234yf and R1234ze are within the range of a figure surrounded by straight lines $GG'_r$, $G'_rB_r$, $B_rD_r$, $D_rC$, and CG that connect the following 5 points:

point G $(0.0314a^2-1.8079a+72.0, 100-a-x, 0.0)$,
point $G'_r$ $(0.0314a^2-1.8079a+72.0, (-0.0708a^2+0.9972a-4.8964)r^2+(0.0424a^2-0.7622a-3.5518)r+(-0.0199a^2+0.0677a+3.8), 100-a-x-y)$,
point $B_r$ $(0.0, -r^2+(0.004a^2-0.1343a-9.1)r+(0.008a^2-1.4765a+68.8), 100-a-y)$,
point $D_r$ $(0.0, (-0.0603a^2+0.8857a-2.4)r^2+(0.1143a^2-0.9267a-3.8)r+(0.0079a^2+0.1471a+86.3), 100-a-y)$, and
point C $(-0.189a^2-0.8664a+32.9, 100-a-x, 0.0)$, or on the straight lines $GG'_r$, $G'_rB_r$, and $D_rC$ (excluding point G, point $B_r$, point $D_r$, and point C);
if $0<a\le 11.1$, and $w<r\le 1$, coordinates (x,y,z) in the ternary composition diagram are within the range of a figure surrounded by straight lines GI, $IA_r$, $A_rB_r$, $B_rD_r$, $D_rC$, and CG that connect the following 6 points:

point G $(0.0314a^2-1.8079a+72.0, 100-a-x, 0.0)$,
point I $(0.0314a^2-1.8079a+72.0, 0.0, 100-a-x)$,
point $A_r$ $((-0.0031a^2+0.0165a-1.6)r^2+(0.0095a^2-0.2769a-6.0)r+(0.0084a^2-1.7237a+76.2), 0.0, 100-a-x)$,
point $B_r$ $(0.0, (-a^2)r^2+(0.004a^2-0.1343a-9.1)r+(0.008a^2-1.4765a+68.8), 100-a-y)$,
point $D_r$ $(0.0, (-0.0603a^2+0.8857a-2.4)r^2+(0.1143a^2-0.9267a-3.8)r+(0.0079a^2+0.1471a+86.3), 100-a-y)$, and
point C $(-0.189a^2-0.8664a+32.9, 100-a-x, 0.0)$, or on the straight lines GI, $IA_r$, $A_rB_r$, and $D_rC$ (excluding point G, point I, point $A_r$, point $B_r$, point $D_r$, and point C);
if $11.1<a\le 16.4$, and $0<r\le w$, coordinates (x,y,z) in the ternary composition diagram are within the range of a figure surrounded by straight lines $GG'_r$, $G'_rB_r$, $B_rO$, and OG that connect the following 4 points:

point G $(0.015a^2-1.4701a+70.266, 100-a-x, 0.0)$,
point $G'_r$ $(0.021a^2-0.1227a+4.6878, (4.1824a^2-114.54a+753.47)r^2+(0.0346a^2+0.3301a-14.707)r+(-0.0099a^2-0.1227a+4.6878), 100-a-x-y)$,
point $B_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$, or on the straight lines $GG'_r$ and $G'_rB_r$ (excluding point G and point $B_r$);
if $11.1<a\le 16.4$, and $w<r\le 1$, coordinates (x,y,z) in the ternary composition diagram are within the range of a figure surrounded by straight lines GI, $IA_r$, $A_rB_r$, $B_rO$, and OG that connect the following 5 points:

point G $(0.015a^2-1.4701a+70.266, 100-a-x, 0.0)$,
point I $(0.015a^2-1.4701a+70.266, 0.0, 100-a-x)$,
point $A_r$ $((0.1221a^2-4.6027a-34.247)r^2+(-0.0564a^2+2.0217a-23.397)r+(0.0076a^2-1.7a+76.031), 0.0, 100-a-x)$,
point $B_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines GI, $IA_r$, and $A_rB_r$ (excluding point G, point I, point $A_r$, and point $B_r$);
  if $16.4<a\le26.6$, coordinates (x,y,z) in the ternary composition diagram are within the range of a figure surrounded by straight lines GI, $IA_r$, $A_rB_r$, $B_rO$, and OG that connect the following 5 points:
point G $(0.015a^2-1.4701a+70.266, 100-a-x, 0.0)$,
point I $(0.015a^2-1.4701a+70.266, 0.0, 100-a-x)$, point $A_r$ $((0.1221a^2-4.6027a-34.247)r^2+(-0.0564a^2+2.0217a-23.397)r+(0.0076a^2-1.7a+76.031), 0.0, 100-a-x)$,
point $B_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines GI, $IA_r$, and $A_rB_r$ (excluding point G, point I, point $A_r$, and point $B_r$);
  if $26.6<a\le43.8$, coordinates (x,y,z) in the ternary composition diagram are within the range of a figure surrounded by straight lines GI, $IA_r$, $A_rB_r$, $B_rO$, and OG that connect the following 5 points:
point G $(0.00738a^2-1.0762a+65.22, 100-a-x, 0.0)$,
point I $(0.00738a^2-1.0762a+65.22, 0.0, 100-a-x)$,
point $A_r$ $((-0.009465a^2+0.6769a-13.119)r^2+(0.01143a^2-0.846a+4.9102)r+(0.005842a^2-1.5915a+74.4), 0.100-a-x)$,
point $B_r$ $(0.0, (-0.00279a^2+0.1483a-2.5871)r^2+(0.00277a^2-0.1588a-8.822)r+(0.00327a^2-1.3169a+67.421), 100-a-y)$, and
point O $(0.0, 100-a, 0.0)$,
or on the straight lines GI, $IA_r$, and $A_rB_r$ (excluding point G, point I, point $A_r$, and point $B_r$); and
  if $43.8<a\le47.8$, coordinates (x,y,z) in the ternary composition diagram are within the range of a figure surrounded by straight lines GI, $IA_r$, $A_rB_r$, $B_rO$, and OG that connect the following 5 points:
point G $(-0.45a+51.91, 100-a-x, 0.0)$,
point I $(-0.45a+51.91, 0.0, 100-a-x)$,
point $A_r$ $((-1.6r^2+(0.05a-12.39)r+(-1.075a+62.985), 0.100-a-x)$,
point $B_r$ $(0.0, (3.8a-167.84)r^2+(-3.8a+155.94)r+(-1.025a+60.895), 100-a-y)$, and
point O $(0.0, 100-a, 0.0)$,
or on the straight lines GI, $IA_r$, and $A_rB_r$ (excluding point G, point I, point $A_r$, and point $B_r$).

The results also indicate that the refrigerant according to the present disclosure has a refrigerating capacity ratio of 85% or more relative to that of R410A, and a COP ratio of 92.5% or more relative to that of R410A, and further ensures an ASHRAE lower flammability when the following requirements are satisfied. Specifically, when the mass % of HFO-1132(E), HFO-1123, R1234yf, R1234ze, and R32 based on their sum in the mixed refrigerant is respectively x, y, $z_1$, $z_2$, and a, the sum of $z_1$ and $z_2$ is z, $z_1/z$ is r, and $v=-0.0581a+2.5484$,
  if $0<a\le11.1$, coordinates (x,y,z) in a ternary composition diagram whose vertices are a point of (100-a) mass % of HFO-1132(E), a point of (100-a) mass % of HFO-1123, and a point of (100-a) mass % of the sum of R1234yf and R1234ze are within the range of a figure surrounded by straight lines $JK_r$, $K_rB_r$, $B_rD_r$, $D_2C$, and CJ that connect the following 5 points:
point J $(-0.0072a^2-0.8296a+47.1, 100-a-x, 0.0)$,
point $K_r$ $((-0.0241a^2+0.4296a-2.8)r^2+(0.033a^2-0.6279a+2.0)r+(0.0421a^2-2.2419a+62.5), (0.0142a^2-0.3016a+1.4)r^2+(-0.0167a^2+0.2395a-7.9)r+(-0.0289a^2+0.4739a+12.4), 100-a-x-y)$,
point $B_r$ $(0.0, r^2+(0.004a^2-0.1343a-9.1)r+(0.008a^2-1.4765a+68.8), 100-a-y)$,
point $D_r$ $(0.0, (-0.0603a^2+0.8857a-2.4)r^2+(0.1143a^2-0.9267a-3.8)r+(0.0079a^2+0.1471x+86.3), 100-a-y)$, and
point C $(-0.189a^2-0.8664a+32.9, 100-a-x, 0.0)$,
or on the straight lines $JK_r$, $K_rB_r$, $B_rD_r$, and $D_rC$ (excluding point J, point $B_r$, point $D_r$, and point C);
  if $11.1<a\le26.6$, coordinates (x,y,z) in the ternary composition diagram are within the range of a figure surrounded by straight lines $JK_r$, $K_rB_r$, $B_rO$, and OJ that connect the following 4 points;
point J $(0.0285a^2-1.5371a+50.557, 100-a-x, 0.0)$,
point $K_r$ $((0.0556a^2-2.057a+14.984)r^2+(-0.0217a^2+0.7843a-6.9374)r+(0.0184a^2-1.7325a+59.763), (0.0567a^2-2.162a+16.817)r^2+(-0.0298a^2+1.0456a-15.236)r+(-0.0094a^2+0.0329a+14.897), 100-a-x-y)$,
point $B_r$ $(0.0, (0.0839a^2-3.138a+23.492)r^2+(-0.0396a^2+1.4292a-21.082)r+(0.0057a^2-1.4197a+68.462), 100-a-y)$, and
point O $(0.0, 100-a, 0.0)$,
or on the straight lines $JK_r$ and $K_rB_r$ (excluding point J and point $B_r$);
  if $26.6<a\le35.3$, and $0<r\le v$, coordinates (x,y,z) in the ternary composition diagram are within the range of a figure surrounded by straight lines $JK_r$, $K_rB_r$, $B_rO$, and OJ that connect the following 4 points;
point J $(-0.00542a^2+0.3598a+24.08, 100-a-x, 0.0)$,
point $K_r$ $((-0.2299a+5.7149)(0.1379a-5.069)r+(-0.7011x+45.351), (0.069a-2.4345)r^2+(-0.1264a-5.1368)r+(-0.4943a+22.247), 100-a-x-y)$,
point $B_r$ $(0.0, (-0.00279a^2+0.1483a-2.5871)r^2+(0.00277a^2-0.1588a-8.822)r+(0.00327a^2-1.3169a+67.421), 100-a-y)$, and
point O $(0.0, 100-a, 0.0)$,
or on the straight lines $JK_r$ and $K_rB_r$ (excluding point J and point $B_r$);
  if $26.6<a\le35.3$, and $v<r\le1$, coordinates (x,y,z) in the ternary composition diagram are within the range of a figure surrounded by straight lines $JK_r$, $K_rA_r$, $A_rB_r$, $B_rO$, and OJ that connect the following 5 points;
point J $(-0.00542a^2+0.3598a+24.08, 0.0, 100-a-x)$,
point $K_r$ $((-0.3218a+8.1609)r^2+(1.4023a-38.701)r+(-1.3103a+61.555), 0.0, 100-a-x)$,
point $A_r$ $((-0.00946a^2+0.6769a-13.119)r^2+(0.01143a^2-0.846a+4.9102)r+(0.00584a^2-1.5915a+74.4), 0.0, 100-a-x)$,
point $B_r$ $(0.0, (-0.00279a^2+0.1483a-2.5871)r^2+(0.00277a^2-0.1588a-8.822)r+(0.00327a^2-1.3169a+67.421), 100-a-y)$, and
point O $(0.0, 100-a, 0.0)$,
or on the straight lines $JK_r$, $K_rA_r$, and $A_rB_r$ (excluding point J, point $A_r$, and point $B_r$);
  if $35.3<a\le43.8$, and $0<r\le v$, coordinates (x,y,z) in the ternary composition diagram are within the range of a figure surrounded by straight lines $JK_r$, $K_rB_r$, $B_rO$, and OJ that connect the following 4 points;

point J ($-0.00542a^2+0.3598a+24.08$, $100-a-x$, 0.0),
point $K_r$ (($(0.2824a-12.367)r^2+(0.0235a-1.0306)r+(-0.5529a+40.119)$, $(1.1294a-49.468)r+(-0.5647a+24.734)$, $100-a-x-y$),
point $B_r$ (0.0, $(-0.00279a^2+0.1483a-2.5871)r^2+(0.00277a^2-0.1588a-8.822)r+(0.00327a^2-1.3169a+67.421)$, $100-a-y$), and
point O (0.0, $100-a$, 0.0),
or on the straight lines $JK_r$ and $K_rB_r$ (excluding point J and point $B_r$);

if $35.3 < a \le 43.8$, and $v < r \le 1$, coordinates (x,y,z) in the ternary composition diagram are within the range of a figure surrounded by straight lines $JK_r$, $K_rA_r$, $A_rB_r$, $B_rO$, and OJ that connect the following 5 points;
point J ($-0.00542a^2+0.3598a+24.08$, $100-a-x$, 0.0),
point $K_r$ (($(0.2588a-12.336)r^2+(-0.5294a+29.488)r+(0.0706a+12.808)$, 0.0, $100-a-x$)),
point $A_r$ (($(-0.00946a^2+0.6769a-13.119)r^2+(0.01143a^2-0.846a+4.9102)r+(0.00584a^2-1.5915a+74.4)$, 0.0, $100-a-x$),
point $B_r$ (0.0, $(-0.00279a^2+0.1483a-2.5871)r^2+(0.00277a^2-0.1588a-8.822)r+(0.00327a^2-1.3169a+67.421)$, $100-a-y$), and
point O (0.0, $100-a$, 0.0),
or on the straight lines $JK_r$, $K_rA_r$, and $A_rB_r$ (excluding point J, point $A_r$, and point $B_r$); and if $43.8 < a \le 47.8$, coordinates (x,y,z) in the ternary composition diagram are within the range of a figure surrounded by straight lines $JK_r$, $K_rA_r$, $A_rB_r$, $B_rO$, and OJ that connect the following 5 points;
point J ($-0.1a+33.78$, $100-a-x$, 0.0),
point $K_r$ ($-r^2+(-0.2a+15.06)r+15.9$, 0.0, $100-a-x$),
point $A_r$ ($1.6r^2+(0.05a-12.39)r+(-1.075a+62.985)$, 0.0, $100-a-x$),
point $B_r$ (0.0, $(3.8a-167.84)r^2+(-3.8a+155.94)r+(-1.025a+60.895)$, $100-a-y$), and
point O (0.0, $100-a$, 0.0),
or on the straight lines $JK_r$, $K_rA_r$, and $A_rB_r$ (excluding point J, point $A_r$, and point $B_r$).

The approximate expressions representing the coordinates of each point were obtained as shown below.

TABLE 47

| | | $11.1 \ge a > 0$ Point G, I, J | | | | | | | | |
|---|---|---|---|---|---|---|---|---|---|---|
| | Point | G | | | I | | | J | | |
| Refrigerant | a | 0.0 | 5.3 | 11.1 | 0.0 | 5.3 | 11.1 | 0.0 | 5.3 | 11.1 |
| HFO-1132E | mass % | 72.0 | 63.3 | 55.8 | 72.0 | 63.3 | 55.8 | 47.1 | 42.5 | 37.0 |
| HFO-1123 | mass % | 28.0 | 31.4 | 33.1 | 0.0 | 0.0 | 0.0 | 52.9 | 52.2 | 51.9 |
| (R1234ze + R1234yf) | mass % | 0.0 | 0.0 | 0.0 | 28.0 | 31.4 | 33.1 | 0.0 | 0.0 | 0.0 |
| HFO-1132E approximate expression | mass % | $0.0314a^2 - 1.8079a + 72.0$ | | | $0.0314a^2 - 1.8079a + 72.0$ | | | $-0.0072a^2 - 0.8296a + 47.1$ | | |
| HFO-1123 approximate expression | mass % | $100 - a - x$ | | | 0.0 | | | $100 - a - x$ | | |
| (R1234yf + R1234ze) approximate expression | mass % | 0.0 | | | $100 - a - x$ | | | 0.0 | | |

| | | Point C | | |
|---|---|---|---|---|
| | Point | C | | |
| Refrigerant | a | 0.0 | 5.3 | 11.1 |
| HFO-1132E | mass % | 32.9 | 23.0 | 0.0 |
| HFO-1123 | mass % | 67.1 | 71.7 | 88.9 |
| (R1234ze + R1234yf) | mass % | 0.0 | 0.0 | 0.0 |
| HFO-1132E approximate expression | mass % | $-0.189a^2 - 0.8664a + 32.9$ | | |
| HFO-1123 approximate expression | mass % | $100 - a - x$ | | |
| (R1234yf + R1234ze) approximate expression | mass % | 0.0 | | |

| | | Point Ar approximated as $x = br^2 + cr + d$ | | | | | | | | |
|---|---|---|---|---|---|---|---|---|---|---|
| Refrigerant | r | 0.0 | 0.5 | 1.0 | 0.0 | 0.5 | 1.0 | 0.0 | 0.5 | 1.0 |
| HFO-1132E | mass % | 76.2 | 72.8 | 68.6 | 67.3 | 63.3 | 58.5 | 58.1 | 53.7 | 48.4 |
| HFO-1123 | mass % | 0.0 | 0.0 | 0.0 | 0.0 | 0.0 | 0.0 | 0.0 | 0.0 | 0.0 |
| (R1234ze + R1234yf) | mass % | 23.8 | 27.2 | 31.4 | 27.4 | 31.4 | 36.2 | 30.8 | 35.2 | 40.5 |
| a = R32 | mass % | 0.0 | 0.0 | 0.0 | 5.3 | 5.3 | 5.3 | 11.1 | 11.1 | 11.1 |
| HFO-1132E approximate expression | mass % | $-1.6r^2 - 6.0r + 76.2$ | | | $-1.6r^2 - 7.2r + 67.3$ | | | $-1.8r^2 - 7.9r + 58.1$ | | |
| HFO-1123 approximate expression | mass % | 0.0 | | | 0.0 | | | 0.0 | | |
| a = R32 | | 0.0 | | | 5.3 | | | 11.1 | | |
| Coefficient b | | $-1.6$ | | | $-1.6$ | | | $-1.8$ | | |
| Coefficient c | | $-6.0$ | | | $-7.2$ | | | $-7.9$ | | |
| Coefficient d | | 76.2 | | | 67.3 | | | 58.1 | | |
| Coefficient b approximate expression | | $-0.0031a^2 + 0.0165a - 1.6$ | | | | | | | | |
| Coefficient c approximate expression | | $0.0095a^2 - 0.2769a - 6.0$ | | | | | | | | |
| Coefficient d approximate expression | | $0.0084a^2 - 1.7237a + 76.2$ | | | | | | | | |
| x = HFO-1132E approximate expression | | $(-0.0031a^2 + 0.0165a - 1.6) r^2 + (0.0095a^2 - 0.2769a - 6.0) r + (0.0084a^2 - 1.7237a + 76.2)$ | | | | | | | | |
| y = HFO-1123 approximate expression | | 0.0 | | | | | | | | |
| z = (R1234ze + R1234yf) approximate expression | | $100 - a - x$ | | | | | | | | |

TABLE 48

Point Br approximated as $y = er^2 + fr + g$

| Refrigerant | | r | 0.0 | 0.5 | 1.0 | 0.0 | 0.5 | 1.0 | 0.0 | 0.5 | 1.0 |
|---|---|---|---|---|---|---|---|---|---|---|---|
| HFO-1132E | mass % | | 0.0 | 0.0 | 0.0 | 0.0 | 0.0 | 0.0 | 0.0 | 0.0 | 0.0 |
| HFO-1123 | mass % | | 68.8 | 64.0 | 58.7 | 61.2 | 56.1 | 50.5 | 53.4 | 48.1 | 42.3 |
| (R1234ze + R1234yf) | mass % | | 31.2 | 36.0 | 41.3 | 33.5 | 38.6 | 44.2 | 35.5 | 40.8 | 46.6 |
| a = R32 | mass % | | 0.0 | 0.0 | 0.0 | 5.3 | 5.3 | 5.3 | 11.1 | 11.0 | 11.1 |
| HFO-1132E approximate expression | mass % | | | 0.0 | | | 0.0 | | | 0.0 | |
| HFO-1123 approximate expression | mass % | | $-1.0r^2 - 9.1r + 68.8$ | | | $-1.0r^2 - 9.7r + 61.2$ | | | $-1.0r^2 - 10.1r + 53.4$ | | |
| a = R32 | | | | 0.0 | | | 5.3 | | | 11.1 | |
| Coefficient e | | | | −1.0 | | | −1.0 | | | −1.0 | |
| Coefficient f | | | | −9.1 | | | −9.7 | | | −10.1 | |
| Coefficient g | | | | 68.8 | | | 61.2 | | | 53.4 | |
| Coefficient e approximate expression | | | | | | | −1.0 | | | | |
| Coefficient f approximate expression | | | | | | | $0004a^2 - 0.1343a - 9.1$ | | | | |
| Coefficient g approximate expression | | | | | | | $0.008a^2 - 1.4765a + 68.8$ | | | | |
| x = HFO-1132E approximate expression | | | | | | | 0.0 | | | | |
| y = HFO-1123 approximate expression | | | | | | | $(-r^2 + (0.004a^2 - 0.1343a - 9.1)r + (0.008a^2 - 1.4765a + 68.8)$ | | | | |
| z = (R1234ze + R1234yf) approximate expression | | | | | | | $100 - a - y$ | | | | |

TABLE 49

PointDr approximated as $y = er^2 + fr + g$

| Refrigerant | | r | 0.0 | 0.5 | 1.0 | 0.0 | 0.5 | 1.0 | 0.0 | 0.5 | 1.0 |
|---|---|---|---|---|---|---|---|---|---|---|---|
| HFO-1132E | mass % | | 0.0 | 0.0 | 0.0 | 0.0 | 0.0 | 0.0 | 0.0 | 0.0 | 0.0 |
| HFO-1123 | mass % | | 86.3 | 83.8 | 80.1 | 87.3 | 84.7 | 82.4 | 88.9 | 88.9 | 88.9 |
| (R1234ze + R1234yf) | mass % | | 13.7 | 16.2 | 19.9 | 7.4 | 10.0 | 12.3 | 0.0 | 0.0 | 0.0 |
| a = R32 | mass % | | 0.0 | 0.0 | 0.0 | 5.3 | 5.3 | 5.3 | 11.1 | 11.1 | 11.1 |
| HFO-1132E approximate expression | mass % | | | 0.0 | | | 0.0 | | | 0.0 | |
| HFO-1123 approximate expression | mass % | | $-2.4r^2 - 3.8r + 86.3$ | | | $0.6r^2 - 5.5r + 87.3$ | | | 88.9 | | |
| a = R32 | | | | 0.0 | | | 5.3 | | | 11.1 | |
| Coefficient e | | | | −2.4 | | | 0.6 | | | 0.0 | |
| Coefficient f | | | | −3.8 | | | −5.5 | | | 0.0 | |
| Coefficient g | | | | 86.3 | | | 87.3 | | | 88.9 | |
| Coefficient e approximate expression | | | | | | | $-0.0603a^2 + 0.8857a - 2.4$ | | | | |
| Coefficient f approximate expression | | | | | | | $0.1143a^2 - 0.9267a - 3.8$ | | | | |
| Coefficient g approximate expression | | | | | | | $0.0079a^2 + 0.1471a + 86.3$ | | | | |
| x = HFO-1132E approximate expression | | | | | | | 0.0 | | | | |
| y = HFO-1123 approximate expression | | | | | | | $(-0.0603a^2 + 0.8857a - 2.4)r2 + (0.1143a^2 - 0.9267a - 3.8)r + (0.0079a^2 + 0.1471a + 86.3)$ | | | | |
| z = (R1234ze + R1234yf) approximate expression | | | | | | | $100 - a - y$ | | | | |

TABLE 50

PointKr approximated as $x = br^2 + cr + d$, $y = er^2 + dr + e$

| Refrigerant | | r | 0.0 | 0.5 | 1.0 | 0.0 | 0.5 | 1.0 | 0.0 | 0.5 | 1.0 |
|---|---|---|---|---|---|---|---|---|---|---|---|
| HFO-1132E | mass % | | 62.5 | 62.8 | 61.7 | 51.8 | 51.3 | 50.2 | 42.8 | 42.1 | 40.9 |
| HFO-1123 | mass % | | 12.4 | 8.8 | 5.9 | 14.1 | 10.6 | 7.2 | 14.1 | 10.4 | 6.6 |
| (R1234ze + R1234yf) | mass % | | 25.1 | 28.4 | 32.4 | 28.8 | 32.8 | 37.3 | 32.0 | 36.4 | 41.4 |

TABLE 50-continued

PointKr approximated as x = br² + cr + d, y = er² + dr + e

| Refrigerant | r | 0.0 | 0.5 | 1.0 | 0.0 | 0.5 | 1.0 | 0.0 | 0.5 | 1.0 |
|---|---|---|---|---|---|---|---|---|---|---|
| a = R32 | mass % | 0.0 | 0.0 | 0.0 | 5.3 | 5.3 | 5.3 | 11.1 | 11.1 | 11.1 |
| HFO-1132E approximate expression | mass % | \multicolumn{3}{c}{−2.8r² + 2.0r + 62.5} | | | \multicolumn{3}{c}{−1.2r² − 0.4r + 51.8} | | | \multicolumn{3}{c}{−1.0r² − 0.9r + 42.8} |
| HFO-1123 approximate expression | mass % | \multicolumn{3}{c}{1.4r² − 7.9r + 12.4} | | | \multicolumn{3}{c}{0.2r² − 7.1r + 14.1} | | | \multicolumn{3}{c}{−0.2r² − 7.3r + 14.1} |
| a = R32 | | | 0.0 | | | 5.3 | | | 11.1 | |
| Coefficient b | | | −2.8 | | | −1.2 | | | −1.0 | |
| Coefficient c | | | 2.0 | | | −0.4 | | | −0.9 | |
| Coefficient c | | | 62.5 | | | 51.8 | | | 42.8 | |
| Coefficient a | | | | | −0.0241a² + 0.4296a − 2.8 | | | | | |
| Coefficient b approximate expression | | | | | 0.033a² − 0.6279a + 2.0 | | | | | |
| Coefficient d approximate expression | | | | | 0.0421a² − 2.2419a + 62.5 | | | | | |
| a = R32 | | | 0.0 | | | 5.3 | | | 11.1 | |
| Coefficient e | | | 1.4 | | | 0.2 | | | −0.2 | |
| Coefficient f | | | −7.9 | | | −7.1 | | | −7.3 | |
| Coefficient g | | | 12.4 | | | 14.1 | | | 14.1 | |
| Coefficient e approximate expression | | | | | 0.0142a² − 0.3016a + 1.4 | | | | | |
| Coefficient f approximate expression | | | | | −0.0167a² + 0.2395a − 7.9 | | | | | |
| Coefficient g approximate expression | | | | | −0.0289a² + 0.4739a + 12.4 | | | | | |
| x = HFO-1132E approximate expression | | | | | (−0.0241a² + 0.4296a − 2.8)r2 + (0.033a² − 0.6279a + 2.0)r + (0.0421a² − 2.2419a + 62.5) | | | | | |
| y = HFO-1123 approximate expression | | | | | (0.0142a² − 0.3016a + 1.4)r2 + (−0.0167a² + 0.2395a − 7.9)r + (−0.0289a² + 0.4739a + 12.4) | | | | | |
| z = (R1234ze + R1234yf) approximate expression | | | | | 100 − a − x − y | | | | | |

TABLE 51

PointG'r approximated as y = er² + fr + g

| Refrigerant | | r | 0.0 | 0.5 | 0.590 | 0.00 | 0.25 | 0.50 | 0.0 | 0.140 | 0.280 |
|---|---|---|---|---|---|---|---|---|---|---|---|
| HFO-1132E | mass % | | 72.0 | 72.0 | 72.0 | 63.3 | 63.3 | 63.3 | 55.8 | 55.8 | 55.8 |
| HFO-1123 | mass % | | 3.8 | 0.8 | 0.0 | 3.6 | 1.9 | 0.0 | 2.1 | 1.1 | 0.0 |
| (R1234ze + R1234yf) | mass % | | 24.2 | 27.2 | 28.0 | 33.1 | 29.5 | 31.4 | 31.0 | 32.0 | 33.1 |
| a = R32 | mass % | | 0.0 | 0.0 | 0.0 | 5.3 | 5.3 | 5.3 | 11.1 | 11.1 | 11.1 |
| HFO-1132E approximate expression | mass % | | | | | 0.0314a² − 1.8079a + 72.0 | | | | | |
| HFO-1123 approximate expression | mass % | | \multicolumn{3}{c}{−4.8964r² − 3.5518r + 3.8} | | | \multicolumn{3}{c}{−1.6r² − 6.4r + 3.6} | | | \multicolumn{3}{c}{−2.551r² − 6.7857r + 2.1} |
| a = R32 | | | | 0.0 | | | 5.3 | | | 11.1 | |
| Coefficient e | | | | −4.8964 | | | −1.6000 | | | −2.5510 | |
| Coefficient f | | | | −3.5518 | | | −6.4000 | | | −6.7857 | |
| Coefficient g | | | | 3.8000 | | | 3.6000 | | | 2.1000 | |
| Coefficient e approximate expression | | | | | | −0.0708a² + 0.9972a − 4.8964 | | | | | |
| Coefficient f approximate expression | | | | | | 0.0424a² − 0.7622a − 3.5518 | | | | | |
| Coefficient g approximate expression | | | | | | −0.0199a² + 0.0677a + 3.8 | | | | | |
| x = HFO-1132E approximate expression | | | | | | 0.0314a² − 1.8079a + 72.0 | | | | | |
| y = HFO-1123 approximate expression | | | | | | (−0.0708a² + 0.9972a − 4.8964)r² + (0.0424a² − 0.7622a − 3.5518)r + (−0.0199a² + 0.0677a + 3.8) | | | | | |
| z = (R1234ze + R1234yf) approximate expression | | | | | | 100 − a − x − y | | | | | |

TABLE 52

| | | 26.6 ≥ a > 11.1 | | | | | | | |
|---|---|---|---|---|---|---|---|---|---|
| | | Points G, I, and J | | | | | | | |
| | | Point | | | | | | | |
| | | G | | | I | | | J | |
| Refrigerant | a | 11.1 | 16.4 | 26.6 | 11.1 | 16.4 | 26.6 | 11.1 | 16.4 | 26.6 |
| HFO-1132E | mass % | 55.8 | 50.2 | 41.8 | 55.8 | 50.2 | 41.8 | 37.0 | 33.0 | 29.8 |
| HFO-1123 | mass % | 33.1 | 33.4 | 31.6 | 0.0 | 0.0 | 0.0 | 51.9 | 50.6 | 43.6 |
| (R1234ze + R1234yf) | mass % | 0.0 | 0.0 | 0.0 | 33.1 | 33.4 | 31.6 | 0.0 | 0.0 | 0.0 |
| HFO-1132E approximate expression | mass % | $0.015a^2 - 1.4701a + 70.266$ | | | $0.015a^2 - 1.4701a + 70.266$ | | | $0.0285a^2 - 1.5371a + 50.557$ | | |
| HFO-1123 approximate expression | mass % | $100 - a - x$ | | | $0.0$ | | | $100 - a - x$ | | |
| (R1234yf + R1234ze) approximate expression | mass % | $0.0$ | | | $100 - a - x$ | | | $0.0$ | | |

| | | PointAr approximated as $x = br^2 + cr + d$ | | | | | | | | |
|---|---|---|---|---|---|---|---|---|---|---|
| Refrigerant | r | 0.0 | 0.5 | 1.0 | 0.0 | 0.5 | 1.0 | 0.0 | 0.5 | 1.0 |
| HFO-1132E | mass % | 58.1 | 53.7 | 48.4 | 50.2 | 45.4 | 36.4 | 36.2 | 31.0 | 24.9 |
| HFO-1123 | mass % | 0.0 | 0.0 | 0.0 | 0.0 | 0.0 | 0.0 | 0.0 | 0.0 | 0.0 |
| (R1234ze + R1234yf) | mass % | 30.8 | 35.2 | 40.5 | 33.4 | 38.2 | 47.2 | 37.2 | 42.4 | 48.5 |
| a = R32 | mass % | 11.1 | 11.1 | 11.1 | 16.4 | 16.4 | 16.4 | 26.6 | 26.6 | 26.6 |
| HFO-1132E approximate expression | mass % | $-1.8r^2 - 7.9r + 58.1$ | | | $-8.4r^2 - 5.4r + 50.2$ | | | $-1.8r^2 - 95r + 36.2$ | | |
| HFO-1123 approximate expression | mass % | 0.0 | | | 0.0 | | | 0.0 | | |
| a = R32 | | 11.1 | | | 16.4 | | | 26.6 | | |
| Coefficient b | | −1.8 | | | −8.4 | | | −1.8 | | |
| Coefficient c | | −7.9 | | | −5.4 | | | −9.5 | | |
| Coefficient d | | 58.1 | | | 50.2 | | | 36.2 | | |
| Coefficient b approximate expression | | $0.1221a^2 - 4.6027a + 34.247$ | | | | | | | | |
| Coefficient c approximate expression | | $-0.0564a^2 + 2.0217a - 23.397$ | | | | | | | | |
| Coefficient d approximate expression | | $0.0076a^2 - 1.7a + 76.031$ | | | | | | | | |
| x = HFO-1132E approximate expression | | $(0.1221a^2 - 4.6027a + 34.247)r^2 + (-0.0564a^2 + 2.02117a - 23.397)r + (0.0076a^2 - 1.7a + 76.031)$ | | | | | | | | |
| y = HFO-1123 approximate expression | | 0.0 | | | | | | | | |
| z = (R1234ze + R1234yf) approximate expression | | $100 - a - x$ | | | | | | | | |

TABLE 53

| | | PointBr approximated as $y = er^2 + fr + g$ | | | | | | | | |
|---|---|---|---|---|---|---|---|---|---|---|
| Refrigerant | r | 0.0 | 0.5 | 1.0 | 0.0 | 0.5 | 1.0 | 0.0 | 0.5 | 1.0 |
| HFO-1132E | mass % | 0.0 | 0.0 | 0.0 | 0.0 | 0.0 | 0.0 | 0.0 | 0.0 | 0.0 |
| HFO-1123 | mass % | 53.4 | 48.1 | 42.3 | 46.7 | 41.2 | 33.0 | 34.7 | 29.0 | 23.0 |
| (R1234ze + R1234yf) | mass % | 35.5 | 40.8 | 46.6 | 36.9 | 42.4 | 49.1 | 38.7 | 44.4 | 50.4 |
| a = R32 | mass % | 11.1 | 11.1 | 11.1 | 16.4 | 16.4 | 16.4 | 26.6 | 26.6 | 26.6 |
| HFO-1132E approximate expression | mass % | 0.0 | | | 0.0 | | | 0.0 | | |
| HFO-1123 approximate expression | mass % | $-1.0r^2 - 10.1r + 53.4$ | | | $-5.4r^2 - 8.3r + 46.7$ | | | $-0.6r^2 - 11.1r + 34.7$ | | |
| a = R32 | | 11.1 | | | 16.4 | | | 26.6 | | |
| Coefficient e | | −1.0 | | | −5.4 | | | −0.6 | | |

TABLE 53-continued

| PointBr approximated as y = er² + fr + g | | | | | | | | | |
|---|---|---|---|---|---|---|---|---|---|
| Refrigerant | r | 0.0 | 0.5 | 1.0 | 0.0 | 0.5 | 1.0 | 0.0 | 0.5 | 1.0 |
| Coefficient f | | | −10.1 | | | −8.3 | | | −11.1 | |
| Coefficient g | | | 53.4 | | | 46.7 | | | 34.7 | |
| Coefficient e approximate expression | | | | | $0.0839a^2 - 3.138a + 23.492$ | | | | | |
| Coefficient f approximate expression | | | | | $-0.0396a^2 + 1.4292a - 21.082$ | | | | | |
| Coefficient g approximate expression | | | | | $0.0057a^2 - 1.4197a + 68.462$ | | | | | |
| x = HFO-1132E approximate expression | | | | | 0.0 | | | | | |
| y = HFO-1123 approximate expression | | | | | $(0.0839a^2 - 3.138a + 23.492)r^2 + (-0.0396a^2 + 1.4292a - 21.082)r + (0.0057a^2 - 1.4197a + 68.462)$ | | | | | |
| z = (R1234ze + R1234yf) approximate expression | | | | | $100 - a - y$ | | | | | |

TABLE 54

| PointKr approximated as x = br² + cr + d, y = er² + dr + e | | | | | | | | | |
|---|---|---|---|---|---|---|---|---|---|
| Refrigerant | r | 0.0 | 0.5 | 1.0 | 0.0 | 0.5 | 1.0 | 0.0 | 0.5 | 1.0 |
| HFO-1132E | mass % | 42.8 | 42.1 | 40.9 | 36.3 | 35.4 | 32.6 | 26.7 | 25.9 | 24.9 |
| HFO-1123 | mass % | 14.1 | 10.4 | 6.6 | 12.9 | 9.0 | 3.4 | 9.1 | 4.7 | 0.0 |
| (R1234ze + R1234yf) | mass % | 32.0 | 36.4 | 41.4 | 34.4 | 38.2 | 47.6 | 37.6 | 42.8 | 48.5 |
| a = R32 | mass % | 11.1 | 11.0 | 11.1 | 16.4 | 16.4 | 16.4 | 26.6 | 26.6 | 26.6 |
| HFO-1132E approximate expression | mass % | | $-1.0r^2 - 0.9r + 42.8$ | | | $-3.8r^2 + 0.1r + 36.3$ | | | $-0.4r^2 - 1.4r + 26.7$ | |
| HFO-1123 approximate expression | mass % | | $-0.2r^2 - 7.3r + 14.1$ | | | $-3.4r^2 - 6.1r + 12.9$ | | | $-0.6r^2 - 8.5r + 9.1$ | |
| a = R32 | | | 11.1 | | | 16.4 | | | 26.6 | |
| Coefficient b | | | −1.0 | | | −3.8 | | | −0.4 | |
| Coefficient c | | | −0.9 | | | 0.1 | | | −1.4 | |
| Coefficient c | | | 42.8 | | | 36.3 | | | 26.7 | |
| Coefficient a approximate expression | | | | | $0.0556a^2 - 2.057a + 14.984$ | | | | | |
| Coefficient b approximate expression | | | | | $-0.0217a^2 + 0.7843a - 6.9374$ | | | | | |
| Coefficient d approximate expression | | | | | $0.0184a^2 - 1.7325a + 59.763$ | | | | | |
| a = R32 | | | 11.1 | | | 16.4 | | | 26.6 | |
| Coefficient e | | | −0.2 | | | −3.4 | | | −0.6 | |
| Coefficient f | | | −7.3 | | | −6.1 | | | −8.5 | |
| Coefficient g | | | 14.1 | | | 12.9 | | | 9.1 | |
| Coefficient e approximate expression | | | | | $0.0567a^2 - 2.162a + 16.817$ | | | | | |
| Coefficient f approximate expression | | | | | $-0.0298a^2 + 1.0456a - 15.236$ | | | | | |
| Coefficient g approximate expression | | | | | $-0.0094a^2 + 0.0329a + 14.897$ | | | | | |
| x = HFO-1132E approximate expression | | | | | $(0.0556a^2 - 2.057a + 14.984)r^2 + (-0.0217a^2 + 0.7843a - 6.9374)r + (0.0184a^2 - 1.7325a + 59.763)$ | | | | | |
| y = HFO-1123 approximate expression | | | | | $(0.0567a^2 - 2.162a + 16.817)r^2 + (-0.0298a^2 + 1.0456a - 15.236)r + (-0.0094a^2 + 0.0329a + 14.897)$ | | | | | |
| z = (R1234ze + R1234yf) approximate expression | | | | | $100 - a - x - y$ | | | | | |

TABLE 55

| PointG'r approximated as y = er² + fr + g | | | | | | | | | |
|---|---|---|---|---|---|---|---|---|---|
| Refrigerant | r | 0.0 | 0.140 | 0.280 | 0.00 | 0.07 | 0.14 | 0.0 | 0.0 | 0.0 |
| HFO-1132E | mass % | 55.8 | 55.8 | 55.8 | 52.8 | 52.8 | 52.8 | 50.2 | 50.2 | 50.2 |
| HFO-1123 | mass % | 2.1 | 1.1 | 0.0 | 1.1 | 0.7 | 0.0 | 0.0 | 0.0 | 0.0 |
| (R1234ze + R1234yf) | mass % | 31.0 | 32.0 | 33.1 | 32.3 | 33.4 | 32.3 | 33.4 | 33.4 | 334 |

TABLE 55-continued

| | PointG' r approximated as y = er² + fr + g | | | | | | | | | |
|---|---|---|---|---|---|---|---|---|---|---|
| Refrigerant | | r | 0.0 | 0.140 | 0.280 | 0.00 | 0.07 | 0.14 | 0.0 | 0.0 | 0.0 |
| a = R32 | mass % | | 11.1 | | | 13.8 | | | 16.4 | | |
| HFO-1132E approximate expression | mass % | | | | | $0.021^a - 1.6331a + 71.345$ | | | | | |
| HFO-1123 approximate expression | mass % | | $-2.551r^2 - 6.7857r + 2.1$ | | | $-30.612r^2 - 3.5714r + 1.1$ | | | 0.0 | | |
| a = R32 | | | 11.1 | | | 13.8 | | | 16.4 | | |
| Coefficient e | | | −2.5510 | | | −30.6120 | | | 0.0000 | | |
| Coefficient f | | | −6.7857 | | | −3.5714 | | | 0.0000 | | |
| Coefficient g | | | 2.1000 | | | 1.1000 | | | 0.0000 | | |
| Coefficient e approximate expression | | | | | | $4.1824a^2 - 114.54a + 753.47$ | | | | | |
| Coefficient f approximate expression | | | | | | $0.0346a^2 + 0.3301a - 14.707$ | | | | | |
| Coefficient g approximate expression | | | | | | $-0.0099a^2 - 0.1227a + 4.6878$ | | | | | |
| x = HFO-1132E approximate expression | | | | | | $0.021a^2 - 1.6331a + 71.345$ | | | | | |
| y = HFO-1123 approximate expression | | | | | | $(4.1824a^2 - 114.54a + 753.47)r^2 + (0.0346a^2 + 0.3301a - 14.707)r + (-0.0099a^2 - 0.1227a + 4.6878)$ | | | | | |
| z = (R1234ze + R1234yf) approximate expression | | | | | | $100 - a - x - y$ | | | | | |

TABLE 56

$43.8 \geq a > 26.6$

PointG, I, J

| | | Point | | | | | | | | |
|---|---|---|---|---|---|---|---|---|---|---|
| | | G | | | I | | | J | | |
| Refrigerant | a | 26.6 | 35.3 | 43.8 | 26.6 | 35.3 | 43.8 | 26.6 | 35.3 | 43.8 |
| HFO-1132E | mass % | 41.8 | 36.4 | 32.2 | 41.8 | 36.4 | 32.2 | 29.8 | 30.0 | 29.4 |
| HFO-1123 | mass % | 31.6 | 28.3 | 24.0 | 0.0 | 0.0 | 0.0 | 43.6 | 34.7 | 26.8 |
| (R1234ze + R1234yf) | mass % | 0.0 | 0.0 | 0.0 | 31.6 | 28.3 | 24.0 | 0.0 | 0.0 | 0.0 |
| HFO-1132E approximate expression | mass % | $0.00738a^2 - 1.0762a + 65.22$ | | | $0.00738a^2 - 1.0762a + 65.22$ | | | $-0.00542a^2 + 0.3598a + 24.08$ | | |
| HFO-1123 approximate expression | mass % | $100 - a - x$ | | | 0.0 | | | $100 - a - x$ | | |
| (R1234yf + R1234ze) approximate expression | mass % | 0.0 | | | $100 - a - x$ | | | 0.0 | | |

| | PointAr approximated as x = br² + cr + d | | | | | | | | | |
|---|---|---|---|---|---|---|---|---|---|---|
| Refrigerant | r | 0.0 | 0.5 | 1.0 | 0.0 | 0.5 | 1.0 | 0.0 | 0.5 | 1.0 |
| HFO-1132E | mass % | 36.2 | 31.0 | 24.9 | 25.5 | 19.9 | 13.8 | 15.9 | 10.4 | 4.1 |
| HFO-1123 | mass % | 0.0 | 0.0 | 0.0 | 0.0 | 0.0 | 0.0 | 0.0 | 0.0 | 0.0 |
| (R1234ze + R1234yf) | mass % | 37.2 | 42.4 | 48.5 | 39.2 | 44.8 | 50.9 | 40.3 | 45.8 | 52.1 |
| a = R32 | mass % | 26.6 | 26.6 | 26.6 | 35.3 | 35.3 | 35.3 | 43.8 | 43.8 | 43.8 |
| HFO-1132E approximate expression | mass % | $-1.8r^2 - 9.5r + 36.2$ | | | $-1.0r^2 - 10.7r + 25.5$ | | | $-1.6r^2 - 10.2r + 15.9$ | | |
| HFO-1123 approximate expression | mass % | 0.0 | | | 0.0 | | | 0.0 | | |
| a = R32 | | | 26.6 | | | 35.3 | | | 43.8 | | |
| Coefficient b | | | −1.8 | | | −1.0 | | | −1.6 | | |
| Coefficient c | | | −9.5 | | | −10.7 | | | −10.2 | | |
| Coefficient d | | | 36.2 | | | 25.5 | | | 15.9 | | |
| Coefficient b approximate expression | | | | | | $-0.00946a^2 + 0.6769a - 13.11$ | | | | | |
| Coefficient c approximate expression | | | | | | $0.01143a^2 - 0.846a + 4.9102$ | | | | | |
| Coefficient d approximate expression | | | | | | $0.00584a^2 - 1.5915a + 74.4$ | | | | | |
| x = HFO-1132E approximate expression | | | | | | $(-0.00946a^2 + 0.6769a - 13.119)r^2 + (0.01143a^2 - 0.846a + 4.9102)r + (0.00584a^2 - 1.5915a + 74.4)$ | | | | | |
| y = HFO-1123 approximate expression | | | | | | 0.0 | | | | | |

TABLE 56-continued

| $43.8 \geq a > 26.6$ | |
|---|---|
| z = (R1234ze + R1234yf) approximate expression | $100 - a - x$ |

TABLE 57

PointBr approximated as $y = er^2 + fr + g$

| Refrigerant | r | 0.0 | 0.5 | 1.0 | 0.0 | 0.5 | 1.0 | 0.0 | 0.5 | 1.0 |
|---|---|---|---|---|---|---|---|---|---|---|
| HFO-1132E | mass % | 0.0 | 0.0 | 0.0 | 0.0 | 0.0 | 0.0 | 0.0 | 0.0 | 0.0 |
| HFO-1123 | mass % | 34.7 | 29.0 | 23.0 | 25.0 | 19.3 | 13.2 | 16.0 | 10.4 | 4.1 |
| (R1234ze + R1234yf) | mass % | 38.7 | 44.4 | 50.4 | 39.7 | 45.4 | 51.5 | 40.2 | 45.8 | 52.1 |
| a = R32 | mass % | 26.6 | 26.6 | 26.6 | 35.3 | 35.3 | 35.3 | 43.8 | 43.8 | 43.8 |
| HFO-1132E approximate expression | mass % | | 0.0 | | | 0.0 | | | 0.0 | |
| HFO-1123 approximate expression | mass % | $-0.6r^2 - 11.1r + 34.7$ | | | $-0.8r^2 - 11.0r + 25.0$ | | | $-1.4r^2 - 10.5r + 16.0$ | | |
| a = R32 | | | 26.6 | | | 35.3 | | | 43.8 | |
| Coefficient e | | | −0.6 | | | −0.8 | | | −1.4 | |
| Coefficient f | | | −11.1 | | | −11.0 | | | −10.5 | |
| Coefficient g | | | 34.7 | | | 25.0 | | | 16.0 | |
| Coefficient e approximate expression | | | | | $-0.00279a^2 + 0.1483a - 2.5871$ | | | | | |
| Coefficient f approximate expression | | | | | $0.00277a^2 - 0.1588a - 8.822$ | | | | | |
| Coefficient g approximate expression | | | | | $0.00327a^2 - 1.3169a + 67.421$ | | | | | |
| x = HFO-1132E approximate expression | | | | | 0.0 | | | | | |
| y = HFO-1123 approximate expression | | | | | $(-0.00279a^2 + 0.1483a - 2.5871)r^2 + (0.00277a^2 - 0.1588a - 8.822)r + (0.00327a^2 - 1.3169a + 67.421)$ | | | | | |
| z = (R1234ze + R1234yf) approximate expression | | | | | $100 - a - y$ | | | | | |

TABLE 58

$35.3 \geq a > 26.6$
$v = 0.581a + 2.5484$
$v \geq r > 0$
PointKr approximated as $x = br^2 + cr + d$, $y = er^2 + dr + e$

| Refrigerant | | r | 0.0 | 0.5 | 1.0 | 0.00 | 0.25 | 0.50 |
|---|---|---|---|---|---|---|---|---|
| HFO-1132E | | mass% | 26.7 | 25.9 | 24.9 | 20.6 | 20.4 | 19.9 |
| HFO-1123 | | mass% | 9.1 | 4.7 | 0.0 | 4.8 | 2.4 | 0.0 |
| (R1234ze + R1234yf) | | mass% | 37.6 | 42.8 | 48.5 | 39.3 | 41.9 | 44.8 |
| a = R32 | | mass% | 26.6 | 26.6 | 26.6 | 35.3 | 35.3 | 35.3 |
| HFO-1132E approximate expression | | mass% | $-0.4r^2 - 1.4r + 26.7$ | | | $-2.4r^2 - 0.2r + 20.6$ | | |
| HFO-1123 approximate expression | | mass% | $-0.6r^2 - 8.5r + 9.1$ | | | $-9.6r + 4.8$ | | |
| a = R32 | | | | 26.6 | | | 35.3 | |
| Coefficient b | | | | −0.4 | | | −2.4 | |
| Coefficient c | | | | −1.4 | | | −0.2 | |
| Coefficient c | | | | 26.7 | | | 20.6 | |
| Coefficient b approximate expression | | | | | $-0.2299a + 5.7149$ | | | |
| Coefficient c approximate expression | | | | | $0.1379a - 5.069$ | | | |
| Coefficient d approximate expression | | | | | $-0.7011a + 45.351$ | | | |
| a = R32 | | | | 26.6 | | | 35.3 | |
| Coefficient e | | | | −0.6 | | | 0.0 | |
| Coefficient f | | | | −8.5 | | | −9.6 | |
| Coefficient g | | | | 9.1 | | | 4.8 | |
| Coefficient e approximate expression | | | | | $0.069a - 2.4345$ | | | |
| Coefficient f approximate expression | | | | | $-0.1264a - 5.1368$ | | | |
| Coefficient g approximate expression | | | | | $-0.4943a + 22.247$ | | | |
| x = HFO-1132E approximate expression | | | | | $(-0.2299a + 5.7149)r^2 + (0.1379a - 5.069)r + (-0.7011a + 45.351)$ | | | |
| y = HFO-1123 approximate expression | | | | | $(0.069a - 2.4345)r^2 + (-0.1264a - 5.1368)r + (-0.4943a + 22.247)$ | | | |
| z = (R1234ze + R1234yf) approximate expression | | | | | $100 - a - x - y$ | | | |

TABLE 59

$1 \geq r > v$
PointK approximated as $x = br^2 + cr + d$

| Refrigerant | | r | 0.0 | 0.5 | 1.0 | 0.50 | 0.75 | 1.00 |
|---|---|---|---|---|---|---|---|---|
| HFO-1132E | mass % | | 26.7 | 25.9 | 24.9 | 19.9 | 21.6 | 22.9 |
| HFO-1123 | mass % | | 9.1 | 4.7 | 0.0 | 0.0 | 0.0 | 0.0 |
| (R1234ze + R1234yf) | mass % | | 37.6 | 42.8 | 48.5 | 44.8 | 43.1 | 41.8 |
| a = R32 | mass % | | 26.6 | 26.6 | 26.6 | 35.3 | 35.3 | 35.3 |
| HFO-1132E approximate expression | mass % | | $-0.4r^2 - 1.4r + 26.7$ | | | $-3.2r^2 + 10.8r + 15.3$ | | |
| HFO-1123 approximate expression | mass % | | $-0.6r^2 - 8.5r + 9.1$ | | | 0.0 | | |
| a = R32 | | | 26.6 | | | 35.3 | | |
| Coefficient b | | | −0.4 | | | −3.2 | | |
| Coefficient c | | | −1.4 | | | 10.8 | | |
| Coefficient d approximate expression | | | 26.7 | | | 15.3 | | |
| Coefficient b approximate expression | | | $-0.3218a + 8.1609$ | | | | | |
| Coefficient c approximate expression | | | $1.4023a - 38.701$ | | | | | |
| Coefficient d approximate expression | | | $-1.3103a + 61.555$ | | | | | |
| x = HFO-1132E approximate expression | | | $(-0.3218a + 8.1609)r^2 + (1.4023a - 38.701)r + (-1.3103a + 61.555)$ | | | | | |
| y = HFO-1123 approximate expression | | | 0.0 | | | | | |
| z = (R1234ze + R1234yf) approximate expression | | | $100 - a - x$ | | | | | |

TABLE 60

$43.8 \geq a > 35.3$
$v = 0.581a + 2.5484$
$v \geq r > 0$
PointKr approximated as $x = br^2 + cr + d$, $y = er^2 + dr + e$

| Refrigerant | | r | 0.00 | 0.25 | 0.50 | 0.0 | 0.0 | 0.0 |
|---|---|---|---|---|---|---|---|---|
| HFO-1132E | mass % | | 20.6 | 20.4 | 19.9 | 15.9 | 15.9 | 15.9 |
| HFO-1123 | mass % | | 4.8 | 2.4 | 0.0 | 0.0 | 0.0 | 0.0 |
| (R1234ze + R1234yf) | mass % | | 39.3 | 41.9 | 44.8 | 40.3 | 40.3 | 40.3 |
| a = R32 | mass % | | 35.3 | 35.3 | 35.3 | 43.8 | 43.8 | 43.8 |
| HFO-1132E approximate expression | mass % | | $-2.4r^2 - 0.2r + 20.6$ | | | 15.9 | | |
| HFO-1123 approximate expression | mass % | | $-9.6r + 4.8$ | | | 0.0 | | |
| a = R32 | | | 35.3 | | | 43.8 | | |
| Coefficient b | | | −2.4 | | | 0.0 | | |
| Coefficient c | | | −0.2 | | | 0.0 | | |
| Coefficient d approximate expression | | | 20.6 | | | 15.9 | | |
| Coefficient b approximate expression | | | $0.2824a - 12.367$ | | | | | |
| Coefficient c approximate expression | | | $0.0235a - 1.0306$ | | | | | |
| Coefficient d approximate expression | | | $-0.5529a + 40.119$ | | | | | |
| a = R32 | | | 35.3 | | | 43.8 | | |
| Coefficient e | | | 0.0 | | | 0.0 | | |
| Coefficient f | | | −9.6 | | | 0.0 | | |
| Coefficient g | | | 4.8 | | | 0.0 | | |
| Coefficient e approximate expression | | | 0.0 | | | | | |
| Coefficient f approximate expression | | | $1.1294a - 49.468$ | | | | | |
| Coefficient g approximate expression | | | $-0.5647a + 24.734$ | | | | | |

TABLE 60-continued $$43.8 \geq a > 35.3$$
$$v = 0.581a + 2.5484$$
$$v \geq r > 0$$

PointKr approximated as $x = br^2 + cr + d$, $y = er^2 + dr + e$

| Refrigerant | r | 0.00 | 0.25 | 0.50 | 0.0 | 0.0 | 0.0 |
|---|---|---|---|---|---|---|---|
| x = HFO-1132E approximate expression | | $(0.2824a - 12.367)r^2 + (0.0235a - 1.0306)r + (-0.5529a + 40.119)$ | | | | | |
| y = HFO-1123 approximate expression | | $(1.1294a - 49.468)r + (-0.5647a + 24.734)$ | | | | | |
| z = (R1234ze + R1234yf) approximate expression | | $100 - a - x - y$ | | | | | |

TABLE 61

$$1 > r \geq v$$

PointKr approximated as $x = br^2 + cr + d$

| Refrigerant | | r | 0.50 | 0.75 | 1.00 | 0.0 | 0.5 | 1.0 |
|---|---|---|---|---|---|---|---|---|
| HFO-1132E | mass % | | 19.9 | 21.6 | 22.9 | 15.9 | 18.8 | 21.2 |
| HFO-1123 | mass % | | 0.0 | 0.0 | 0.0 | 0.0 | 0.0 | 0.0 |
| (R1234ze + R1234yf) | mass % | | 44.8 | 43.1 | 41.8 | 40.3 | 37.4 | 35.0 |
| a = R32 | mass % | | 35.3 | 35.3 | 35.3 | 43.8 | 43.8 | 43.8 |
| HFO-1132E approximate expression | mass % | | $-3.2r^2 + 10.8r + 15.3$ | | | $-1.0r^2 + 6.3r + 15.9$ | | |
| HFO-1123 approximate expression | mass % | | 0.0 | | | 0.0 | | |
| a = R32 | | | 35.3 | | | 43.8 | | |
| Coefficient b | | | -3.2 | | | -1.0 | | |
| Coefficient c | | | 10.8 | | | 6.3 | | |
| Coefficient c | | | 15.3 | | | 15.9 | | |
| Coefficient b approximate expression | | | $0.2588a - 12.336$ | | | | | |
| Coefficient c approximate expression | | | $-0.5294a + 29.488$ | | | | | |
| Coefficient d approximate expression | | | $0.0706a + 12.808$ | | | | | |
| x = HFO-1132E approximate expression | | | $(0.2588a - 12.336)r^2 + (-0.5294a + 29.488)r + (0.0706a + 12.808)$ | | | | | |
| y = HFO-1123 approximate expression | | | 0.0 | | | | | |
| z = (R1234ze + R1234yf) approximate expression | | | $100 - a - x$ | | | | | |

TABLE 62

$$47.8 \geq a > 43.8$$

PointG, I, J

| | | Point | | | | | |
|---|---|---|---|---|---|---|---|
| | | G | | I | | J | |
| Refrigerant | a | 43.8 | 47.8 | 43.8 | 47.8 | 43.8 | 47.8 |
| HFO-1132E | mass % | 32.2 | 30.4 | 32.2 | 30.4 | 29.4 | 29.0 |
| HFO-1123 | mass % | 24.0 | 21.8 | 0.0 | 0.0 | 26.8 | 23.2 |

TABLE 62-continued $$47.8 \geq a > 43.8$$

| | | | | | | | |
|---|---|---|---|---|---|---|---|
| (R1234ze + R1234yf) | mass % | 0.0 | 0.0 | 24.0 | 21.8 | 0.0 | 0.0 |
| HFO-1132E approximate expression | mass % | $-0.45a + 51.91$ | | $-0.45a + 51.91$ | | $-0.1a + 33.78$ | |
| HFO-1123 approximate expression | mass % | $100 - a - x$ | | 0.0 | | $100 - a - x$ | |
| (R1234yf + R1234ze) approximate expression | mass % | 0.0 | | $100 - a - x$ | | 0.0 | |

PointAr approximated as $x = br^2 + cr + d$

| Refrigerant | | r | 0.0 | 0.5 | 1.0 | 0.0 | 0.5 | 1.0 |
|---|---|---|---|---|---|---|---|---|
| HFO-1132E | mass % | | 15.9 | 10.4 | 4.1 | 11.6 | 6.2 | 0.0 |
| HFO-1123 | mass % | | 0.0 | 0.0 | 0.0 | 0.0 | 0.0 | 0.0 |
| (R1234ze + R1234yf) | mass % | | 40.3 | 45.8 | 52.1 | 40.6 | 46.0 | 52.2 |
| a = R32 | mass % | | 43.8 | 43.8 | 43.8 | 47.8 | 47.8 | 47.8 |
| HFO-1132E approximate expression | mass % | | $-1.6r^2 - 10.2r + 15.9$ | | | $-1.6r^2 - 10.0r + 11.6$ | | |
| HFO-1123 approximate expression | mass % | | 0.0 | | | 0.0 | | |
| a = R32 | | | 43.8 | | | 47.8 | | |
| Coefficient b | | | -1.6 | | | -1.6 | | |
| Coefficient c | | | -10.2 | | | -10.0 | | |
| Coefficient d | | | 15.9 | | | 11.6 | | |
| Coefficient b approximate expression | | | -1.6 | | | | | |
| Coefficient c approximate expression | | | $0.05a - 12.39$ | | | | | |
| Coefficient d approximate expression | | | $-1.075a + 62.985$ | | | | | |
| x = HFO-1132E approximate expression | | | $-1.6r^2 + (0.05a - 12.39)r + (-1.075a + 62.985)$ | | | | | |
| y = HFO-1123 approximate expression | | | 0.0 | | | | | |
| z = (R1234ze + R1234yf) approximate expression | | | $100 - a - x$ | | | | | |

TABLE 63

PointBr approximated as $y = er^2 + fr + g$

| Refrigerant | | r | 0.0 | 0.5 | 1.0 | 0.0 | 0.5 | 1.0 |
|---|---|---|---|---|---|---|---|---|
| HFO-1132E | mass % | | 0.0 | 0.0 | 0.0 | 0.0 | 0.0 | 0.0 |
| HFO-1123 | mass % | | 16.0 | 10.4 | 4.1 | 11.9 | 2.5 | 0.0 |
| (R1234ze + R1234yf) | mass % | | 40.2 | 45.8 | 52.1 | 40.3 | 46.0 | 52.2 |

TABLE 63-continued

| PointBr approximated as y = er² + fr + g | | | | | | | |
|---|---|---|---|---|---|---|---|
| Refrigerant | r | 0.0 | 0.5 | 1.0 | 0.0 | 0.5 | 1.0 |
| a = R32 | mass % | 43.8 | 43.8 | 43.8 | 47.8 | 47.8 | 47.8 |
| HFO-1132E approximate expression | mass % | | 0.0 | | | 0.0 | |
| HFO-1123 approximate expression | mass % | | $-1.4r^2 - 10.5r + 16.0$ | | | $13.8r^2 - 25.7r + 11.9$ | |
| a = R32 | | | 43.8 | | | 47.8 | |
| Coefficient e | | | −1.4 | | | 13.8 | |
| Coefficient f | | | −10.5 | | | −25.7 | |
| Coefficient g | | | 16.0 | | | 11.9 | |
| Coefficient e approximate expression | | | | $3.8a - 167.84$ | | | |
| Coefficient f approximate expression | | | | $-3.8a + 155.94$ | | | |
| Coefficient g approximate expression | | | | $-1.025a + 60.895$ | | | |
| x = HFO-1132E approximate expression | | | | 0.0 | | | |
| y = HFO-1123 approximate expression | | | | $(3.8a - 167.84)r^2 + (-3.8a + 155.94)r + (-1.025a + 60.895)$ | | | |
| z = (R1234ze + R1234yf) approximate expression | | | | $100 - a - y$ | | | |

TABLE 64

| PointKr approximated as x = br² + cr + d | | | | | | | |
|---|---|---|---|---|---|---|---|
| Refrigerant | r | 0.0 | 0.5 | 1.0 | 0.0 | 0.5 | 1.0 |
| HFO-1132E | mass % | 15.9 | 18.8 | 21.2 | 15.9 | 18.4 | 20.4 |
| HFO-1123 | mass % | 0.0 | 0.0 | 0.0 | 0.0 | 0.0 | 0.0 |
| (R1234ze + R1234yf) | mass % | 40.3 | 37.4 | 35.0 | 36.3 | 33.8 | 31.8 |
| a = R32 | mass % | 43.8 | 43.8 | 43.8 | 47.8 | 47.8 | 47.8 |
| HFO-1132E approximate expression | mass % | | $-1.0r^2 + 6.3r + 15.9$ | | | $-1.0r^2 + 5.5r + 15.9$ | |
| HFO-1123 approximate expression | mass % | | 0.0 | | | 0.0 | |
| a = R32 | | | 43.8 | | | 47.8 | |
| Coefficient b | | | −1.0 | | | −1.0 | |
| Coefficient c | | | 6.3 | | | 5.5 | |
| Coefficient c | | | 15.9 | | | 15.9 | |
| Coefficient b approximate expression | | | | −1.0 | | | |
| Coefficient c approximate expression | | | | $-0.2a + 15.06$ | | | |
| Coefficient d approximate expression | | | | 15.9 | | | |
| x = HFO-1132E approximate expression | | | | $-r^2 + (-0.2a + 15.06)r + 15.9$ | | | |
| y = HFO-1123 approximate expression | | | | 0.0 | | | |
| z = (R1234ze + R1234yf) approximate expression | | | | $100 - a - x$ | | | |

DESCRIPTION OF REFERENCE NUMERALS

1: Sample cell
2: High-speed camera
3: Xenon lamp
4: Collimating lens
5: Collimating lens
6: Ring filter

The invention claimed is:

1. A composition comprising a refrigerant, the refrigerant comprising trans-1,2-difluoroethylene (HFO-1132 (E)), trifluoroethylene (HFO-1123), 1,3,3,3-tetrafluoropropene (R1234ze), and difluoromethane (R32), wherein
when the mass % of HFO-1132 (E), HFO-1123, R1234ze, and R32 based on their sum in the refrigerant is respectively represented by x, y, z, and a,
if 0<a≤11.1, coordinates (x,y,z) in a ternary composition diagram in which the sum of HFO-1132 (E), HFO-1123, and R1234ze is (100-a) mass % are within the range of a figure surrounded by straight lines GG', G'B, BD, DC, and CG that connect the following 5 points:
point G $(0.0314a^2 - 1.8079a + 72.0, 100 - a - x, 0.0)$,
point G' $(0.0314a^2 - 1.8079a + 72.0, -0.0199a^2 + 0.0677a + 3.8, 100 - a - x - y)$,
point B $(0.0, 0.0057a^2 - 1.4197a + 68.462, 100 - a - y)$,
point D $(0.0, 0.0234a^2 + 0.0647a + 86.3, 100 - a - y)$, and
point C $(-0.189a^2 - 0.8664a + 32.9, 100 - a - x, 0.0)$,
or on the straight lines GG', G'B, and DC (excluding point B, point D, point C, and point G);
if 11.1<a≤16.4, coordinates (x,y,z) in the ternary composition diagram are within the range of a figure surrounded by straight lines GG', G'B, BO, and OG that connect the following 4 points:
point G $(0.015a^2 - 1.4701a + 70.266, 100 - a - x, 0.0)$,
point G' $(-1.0566a + 67.528, -0.3962a + 6.4981, 100 - a - x - y)$,
point B $(0.0, 0.0057a^2 - 1.4197a + 68.462, 100 - a - y)$, and
point O $(0.0, 100 - a, 0.0)$,
or on the straight lines GG' and G'B (excluding point B, point O, and point G);
if 16.4<a≤26.6, coordinates (x,y,z) in the ternary composition diagram are within the range of a figure surrounded by straight lines GI, IA, AB, BO, and OG that connect the following 5 points:
point G $(0.015a^2 - 1.4701a + 70.266, 100 - a - x, 0.0)$,
point I $(0.015a^2 - 1.4701a + 70.266, 0.0, 100 - a - x)$,
point A $(0.0076a^2 - 1.7a + 76.031, 0.0, 100 - a - x)$,
point B $(0.0, 0.0057a^2 - 1.4197a + 68.462, 100 - a - y)$, and
point O $(0.0, 100 - a, 0.0)$,
or on the straight lines GI and AB (excluding point G, point I, point A, and point B);

if 26.6<a≤43.8, coordinates (x,y,z) in the ternary composition diagram are within the range of a figure surrounded by straight lines GI, IA, AB, BO, and OG that connect the following 5 points:
point G ($0.00738a^2-1.0762a+65.22$, 100−a−x, 0.0),
point I ($0.00738a^2-1.0762a+65.22$, 0.0, 100−a−x),
point A ($0.00582a^2-1.5915a+74.4$, 0.0, 100−a−x),
point B (0.0, $0.00328a^2-1.3169a+67.421$, 100−a−y), and
point O (0.0, 100−a, 0.0),
or on the straight lines GI and AB (excluding point G, point I, point A, and point B); and
  if 43.8<a≤47.8, coordinates (x,y,z) in the ternary composition diagram are within the range of a figure surrounded by straight lines GI, IA, AB, BO, and OG that connect the following 5 points:
point G (−0.45a+51.91, 100−a−x, 0.0),
point I (−0.45a+51.91, 0.0, 100−a−x),
point A (−1.075a+62.985, 0.0, 100−a−x),
point B (0.0, −1.025a+60.895, 100−a−y), and
point O (0.0, 100−a, 0.0),
or on the straight lines GI and AB (excluding point G, point I, point A, and point B).

2. A composition comprising a refrigerant,
the refrigerant comprising trans-1,2-difluoroethylene (HFO-1132 (E)), trifluoroethylene (HFO-1123), 1,3,3,3-tetrafluoropropene (R1234ze), and difluoromethane (R32), wherein
when the mass % of HFO-1132 (E), HFO-1123, R1234ze, and R32 based on their sum in the refrigerant is respectively represented by x, y, z, and a,
if 0<a≤11.1, coordinates (x,y,z) in a ternary composition diagram in which the sum of HFO-1132 (E), HFO-1123, and R1234ze is (100−a) mass % are within the range of a figure surrounded by straight lines JQ, QN, NM, MK, KB, BD, DC, and CJ that connect the following 8 points:
point J (100−a−y, $0.0072a^2-0.1704a+52.9$, 0.0),
point Q ($0.0112a^2-1.3048a+62.1$, 96.5−a−x, 3.5),
point N ($0.0207a^2-1.5817a+65.9$, $-0.0547a^2+1.1392a+21.6$, 100−a−x−y),
point M ($0.0278a^2-1.7325a+64.5$, 80.0−a−x, 20.0),
point K ($0.0421a^2-2.2419a+62.5$, 100−a−x−z, $-0.0132a^2+0.768a+25.1$),
point B (0.0, $0.0057a^2-1.4197a+68.462$, 100−a−y),
point D (0.0, $0.0234a^2+0.0647a+86.3$, 100−a−y), and
point C ($-0.189a^2-0.8664a+32.9$, 100−a−x, 0.0),
or on the straight lines JQ, QN, NM, MK, and KB (excluding point J and point B);
  if 11.1<a≤26.6, coordinates (x,y,z) in the ternary composition diagram are within the range of a figure surrounded by straight lines JQ, QN, NM, MK, KB, BO, and OJ that connect the following 7 points:
point J (100−a−y, $-0.0285a^2+0.5371a+49.443$, 0.0),
point Q ($0.0166a^2-1.382a+62.291$, 96.5−a−x, 3.5),
point N ($0.0183a^2-1.5044a+65.339$, $-0.0395a^2+1.4643a+16.116$, 100−a−x−y),
point M ($0.0145a^2-1.4001a+62.448$, 80.0−a−x, 20.0),
point K ($0.0184a^2-1.7325a+59.763$, 100−a−x−z, $-0.009a^2+0.6996a+25.34$),
point B (0.0, $0.0057a^2-1.4197a+68.462$, 100−a−y), and
point O (0.0, 100−a, 0.0),
or on the straight lines JQ, QN, NM, MK, and KB (excluding point J and point B);
  if 26.6<a≤43.8, coordinates (x,y,z) in the ternary composition diagram are within the range of a figure surrounded by straight lines JQ, QN, NM, MK, KB, BO, and OJ that connect the following 7 points:
point J (100−a−y, $0.00542a^2-1.3598a+75.92$, 0.0),
point Q ($0.0049a^2-0.728a+53.204$, 96.5−a−x, 3.5),
point N ($0.0075a^2-0.971a+58.81$, $-0.0038a^2-0.0303a+30.581$, 100−a−x−y),
point M ($0.0019a^2-0.7375a+53.782$, 80.0−a−x, 20.0),
point K ($0.0086a^2-1.2345a+53.442$, 100−a−x−z, $-0.0045a^2+0.4752a+28.157$),
point B (0.0, $0.00328a^2-1.3169a+67.421$, 100−a−y), and
point O (0.0, 100−a, 0.0),
or on the straight lines JQ, QN, NM, MK, and KB (excluding point J and point B); and
  if 43.8<a≤47.8, coordinates (x,y,z) in the ternary composition diagram are within the range of a figure surrounded by straight lines JN, NM, MK, KA, AB, BO, and OJ that connect the following 7 points:
point J (100−a−y, −0.9a+66.22, 0.0),
point N (−0.425a+49.315, −0.3a+8.86, 100−a−x−y),
point M (−0.525a+48.095, 80.0−a−x, 20.0),
point K (15.9, 0.0, 84.1−a),
point A (−1.075a+62.985, 0.0, 100−a−x),
point B (0.0, −1.025a+60.895, 100−a−y), and
point O (0.0, 100−a, 0.0),
or on the straight lines NM, MK, KA, and AB (excluding point J and point B).

3. A composition comprising a refrigerant,
the refrigerant comprising trans-1,2-difluoroethylene (HFO-1132 (E)), trifluoroethylene (HFO-1123), 1,3,3,3-tetrafluoropropene (R1234ze), difluoromethane (R32), and 2,3,3,3-tetrafluoro-1-propene (R1234yf), wherein
when the mass % of HFO-1132 (E), HFO-1123, R1234yf, R1234ze, and R32 based on their sum in the refrigerant is respectively x, y, $z_1$, $z_2$, and a, the sum of $z_1$ and $z_2$ is z, $z_1/z$ is r, and w=$-0.00162a^2-0.0097a+0.592$,
if 0<a≤11.1, and 0<r≤w, coordinates (x,y,z) in a ternary composition diagram whose vertices are a point of (100−a) mass % of HFO-1132 (E), a point of (100−a) mass % of HFO-1123, and a point of (100−a) mass % of the sum of R1234yf and R1234ze are within the range of a figure surrounded by straight lines GG'$_r$, G'$_r$B$_r$, B$_r$D$_r$, D$_r$C, and CG that connect the following 5 points:
point G ($0.0314a^2-1.8079a+72.0$, 100−a−x, 0.0),
point G'$_r$ ($0.0314a^2-1.8079a+72.0$, $(-0.0708a^2+0.9972a-4.8964)$ $r^2+(0.0424a^2-0.7622a-3.5518)$ r+$(-0.0199a^2+0.0677a+3.8)$, 100−a−x−y),
point B$_r$ (0.0, $-r^2+(0.004a^2-0.1343a-9.1)$ r+$(0.008a^2-1.4765a+68.8)$, 100−a−y),
point D$_r$ (0.0, $(-0.0603a^2+0.8857a-2.4)$ $r^2+(0.1143a^2-0.9267a-3.8)$ r+$(0.0079a^2+0.1471a+86.3)$, 100−a−y), and
point C ($-0.189a^2-0.8664a+32.9$, 100−a−x, 0.0),
or on the straight lines GG'$_r$, G'$_r$B$_r$, and D$_r$C (excluding point G, point B$_r$, point D$_r$, and point C);
  if 0<a≤11.1, and w<r≤1, coordinates (x,y,z) in the ternary composition diagram are within the range of a figure surrounded by straight lines GI, IA$_r$, A$_r$B$_r$, B$_r$D$_r$, D$_r$C, and CG that connect the following 6 points:
point G ($0.0314a^2-1.8079a+72.0$, 100−a−x, 0.0),
point I ($0.0314a^2-1.8079a+72.0$, 0.0, 100−a−x),
point A$_r$ (($-0.0031a^2+0.0165a-1.6$) $r^2+(0.0095a^2-0.2769a-6.0)$ r+$(0.0084a^2-1.7237a+76.2)$, 0.0, 100−a−x),
point B$_r$ (0.0, $(-a^2)$ $r^2+(0.004a^2-0.1343a-9.1)$ r+$(0.008a^2-1.4765a+68.8)$, 100−a−y), point $D_r$ (0.0, $(-0.0603a^2+0.8857a-2.4)$ $r^2+(0.1143a^2-0.9267a-3.8)$ $r+(0.0079a^2+0.1471a+86.3)$, $100-a-y$), and point C $(-0.189a^2-0.8664a+32.9, 100-a-x, 0.0)$, or on the straight lines GI, $IA_r$, $A_rB_r$, and $D_rC$ (excluding point G, point I, point $A_r$, point $B_r$, point $D_r$, and point C);

if $11.1 < a \leq 16.4$, and $0 < r \leq w$, coordinates (x,y,z) in the ternary composition diagram are within the range of a figure surrounded by straight lines $GG'_r$, $G'_rB_r$, $B_rO$, and OG that connect the following 4 points:

point G $(0.015a^2-1.4701a+70.266, 100-a-x, 0.0)$, point $G'_r$ $(0.021a^2-0.1227a+4.6878, (4.1824a^2-114.54a+753.47) r^2+(0.0346a^2+0.3301a-14.707)r+(-0.0099a^2-0.1227a+4.6878), 100-a-x-y)$, point $B_r$ $(0.0, (0.0839a^2-3.138a+23.492) r^2+(-0.0396a^2+1.4292a-21.082) r+(0.0057a^2+1.4197a+68.462), 100-a-y)$, and point O $(0.0, 100-a, 0.0)$, or on the straight lines $GG'_r$ and $G'_rB_r$ (excluding point G and point $B_r$);

if $11.1 < a \leq 16.4$, and $w < r \leq 1$, coordinates (x,y,z) in the ternary composition diagram are within the range of a figure surrounded by straight lines GI, $IA_r$, $A_rB_r$, $B_rO$, and OG that connect the following 5 points:

point G $(0.015a^2-1.4701a+70.266, 100-a-x, 0.0)$, point I $(0.015a^2-1.4701a+70.266, 0.0, 100-a-x)$, point $A_r$ $((0.1221a^2-4.6027a-34.247) r^2+(-0.0564a^2+2.0217a-23.397) r+(0.0076a^2-1.7a+76.031), 0.0, 100-a-x)$, point $B_r$ $(0.0, (0.0839a^2-3.138a+23.492) r^2+(-0.0396a^2+1.4292a-21.082) r+(0.0057a^2-1.4197a+68.462), 100-a-y)$, and point O $(0.0, 100-a, 0.0)$, or on the straight lines GI, $IA_r$, and $A_rB_r$ (excluding point G, point I, point $A_r$, and point $B_r$);

if $16.4 < a \leq 26.6$, coordinates (x,y,z) in the ternary composition diagram are within the range of a figure surrounded by straight lines GI, $IA_r$, $A_rB_r$, $B_rO$, and OG that connect the following 5 points:

point G $(0.015a^2-1.4701a+70.266, 100-a-x, 0.0)$, point I $(0.015a^2-1.4701a+70.266, 0.0, 100-a-x)$, point $A_r$ $((0.1221a^2-4.6027a-34.247) r^2+(-0.0564a^2+2.0217a-23.397) r+(0.0076a^2-1.7a+76.031), 0.0, 100-a-x)$, point $B_r$ $(0.0, (0.0839a^2-3.138a+23.492) r^2+(-0.0396a^2+1.4292a-21.082) r+(0.0057a^2-1.4197a+68.462), 100-a-y)$, and point O $(0.0, 100-a, 0.0)$, or on the straight lines GI, $IA_r$, and $A_rB_r$ (excluding point G, point I, point $A_r$, and point $B_r$);

if $26.6 < a \leq 43.8$, coordinates (x,y,z) in the ternary composition diagram are within the range of a figure surrounded by straight lines GI, $IA_r$, $A_rB_r$, $B_rO$, and OG that connect the following 5 points:

point G $(0.00738a^2-1.0762a+65.22, 100-a-x, 0.0)$, point I $(0.00738a^2-1.0762a+65.22, 0.0, 100-a-x)$, point $A_r$ $((-0.009465a^2+0.6769a-13.119) r^2+(0.01143a^2-0.846a+4.9102) r+(0.005842a^2-1.5915a+74.4), 0.100-a-x)$, point $B_r$ $(0.0, (-0.00279a^2+0.1483a-2.5871) r^2+(0.00277a^2-0.1588a-8.822) r+(0.00327a^2-1.3169a+67.421), 100-a-y)$, and point O $(0.0, 100-a, 0.0)$, or on the straight lines GI, $IA_r$, and $A_rB_r$ (excluding point G, point I, point $A_r$, and point $B_r$); and if $43.8 < a \leq 47.8$, coordinates (x,y,z) in the ternary composition diagram are within the range of a figure surrounded by straight lines GI, $IA_r$, $A_rB_r$, $B_rO$, and OG that connect the following 5 points:

point G $(-0.45a+51.91, 100-a-x, 0.0)$, point I $(-0.45a+51.91, 0.0, 100-a-x)$, point $A_r$ $((-1.6r^2+(0.05a-12.39) r+(-1.075a+62.985), 0.100-a-x)$, point $B_r$ $(0.0, (3.8a-167.84) r^2+(-3.8a+155.94) r+(-1.025a+60.895), 100-a-y)$, and point O $(0.0, 100-a, 0.0)$, or on the straight lines GI, $IA_r$, and $A_rB_r$ (excluding point G, point I, point $A_r$, and point $B_r$).

4. A composition comprising a refrigerant, the refrigerant comprising trans-1,2-difluoroethylene (HFO-1132 (E)), trifluoroethylene (HFO-1123), 1,3,3,3-tetrafluoropropene (R1234ze), difluoromethane (R32), and 2,3,3,3-tetrafluoro-1-propene (R1234yf), wherein when the mass % of HFO-1132 (E), HFO-1123, R1234yf, R1234ze, and R32 based on their sum in the refrigerant is respectively x, y, $z_1$, $z_2$, and a, the sum of $z_1$ and $z_2$ is z, $z_1/z$ is r, and $v=-0.0581a+2.5484$, if $0 < a \leq 11.1$, coordinates (x,y,z) in a ternary composition diagram whose vertices are a point of (100−a) mass % of HFO-1132 (E), a point of (100−a) mass % of HFO-1123, and a point of (100−a) mass % of the sum of R1234yf and R1234ze are within the range of a figure surrounded by straight lines $JK_r$, $K_rB_r$, $B_rD_r$, $D_rC$, and CJ that connect the following 5 points:

point J $(-0.0072a^2-0.8296a+47.1, 100-a-x, 0.0)$, point $K_r$ $((-0.0241a^2+0.4296a-2.8) r^2+(0.033a^2-0.6279a+2.0) r+(0.0421a^2-2.2419a+62.5), (0.0142a^2-0.3016a+1.4) r^2 + (-0.0167a^2+0.2395a-7.9) r+(-0.0289a^2+0.4739a+12.4), 100-a-x-y)$, point $B_r$ $(0.0, 12+(0.004a^2-0.1343a-9.1) r+(0.008a^2-1.4765a+68.8), 100-a-y)$, point $D_r$ $(0.0, (-0.0603a^2+0.8857a-2.4) r^2+(0.1143a^2-0.9267a-3.8) r+(0.0079a^2+0.1471x+86.3), 100-a-y)$, point C $(-0.189a^2-0.8664a+32.9, 100-a-x, 0.0)$, or on the straight lines $JK_r$, $K_rB_r$, $B_rD_r$, and $D_rC$ (excluding point J, point $B_r$, point $D_r$, and point C);

if $11.1 < a \leq 26.6$, coordinates (x,y,z) in the ternary composition diagram are within the range of a figure surrounded by straight lines $JK_r$, $K_rB_r$, $B_rO$, and OJ that connect the following 4 points:

point J $(0.0285a^2-1.5371a+50.557, 100-a-x, 0.0)$, point $K_r$ $((0.0556a^2-2.057a+14.984) r^2+(-0.0217a^2+0.7843a-6.9374) r+(0.0184a^2-1.7325a+59.763), (0.0567a^2-2.162a+16.817) r^2 + (-0.0298a^2+1.0456a-15.236) r+(-0.0094a^2+0.0329a+14.897), 100-a-x-y)$, point $B_r$ $(0.0, (0.0839a^2-3.138a+23.492) r^2+(-0.0396a^2+1.4292a-21.082) r+(0.0057a^2-1.4197a+68.462), 100-a-y)$, and point O $(0.0, 100-a, 0.0)$, or on the straight lines $JK_r$ and $K_rB_r$ (excluding point J and point $B_r$);

if $26.6 < a \leq 35.3$, and $0 < r \leq v$, coordinates (x,y,z) in the ternary composition diagram are within the range of a figure surrounded by straight lines $JK_r$, $K_rB_r$, $B_rO$, and OJ that connect the following 4 points:

point J $(-0.00542a^2+0.3598a+24.08, 100-a-x, 0.0)$, point $K_r$ $((-0.2299a+5.7149) r^2+(0.1379a-5.069) r+(-0.7011x+45.351), (0.069a-2.4345) r^2+(-0.1264a-5.1368) r+(-0.4943a+22.247), 100-a-x-y)$, point $B_r$ (0.0, $(-0.00279a^2+0.1483a-2.5871)$ $r^2+$ $(0.00277a^2-0.1588a-8.822)$ $r+(0.00327a^2-1.3169a+67.421)$, 100−a−y), and point O (0.0, 100−a, 0.0), or on the straight lines $JK_r$ and $K_rB_r$ (excluding point J and point $B_r$);

if $26.6 < a \le 35.3$, and $v < r \le 1$, coordinates (x,y,z) in the ternary composition diagram are within the range of a figure surrounded by straight lines $JK_r$, $K_rA_r$, $A_rB_r$, $B_rO$, and OJ that connect the following 5 points:

point J $(-0.00542a^2+0.3598a+24.08, 0.0, 100-a-x)$, point $K_r$ $((-0.3218a+8.1609)$ $r^2+(1.4023a-38.701)$ $r+(-1.3103a+61.555)$, 0.0, 100−a−x), point $A_r$ $((-0.00946a^2+0.6769a-13.119)$ $r^2+(0.01143a^2-0.846a+4.9102)$ $r+(0.00584a^2-1.5915a+74.4)$, 0.0, 100−a−x), point $B_r$ (0.0, $(-0.00279a^2+0.1483a-2.5871)$ $r^2+$ $(0.00277a^2-0.1588a-8.822)$ $r+(0.00327a^2-1.3169a+67.421)$, 100−a−y), and point O (0.0, 100−a, 0.0), or on the straight lines $JK_r$, $K_rA_r$, and $A_rB_r$ (excluding point J, point $A_r$, and point $B_r$);

if $35.3 < a \le 43.8$, and $0 < r \le v$, coordinates (x,y,z) in the ternary composition diagram are within the range of a figure surrounded by straight lines $JK_r$, $K_rB_r$, $B_rO$, and OJ that connect the following 4 points:

point J $(-0.00542a^2+0.3598a+24.08, 100-a-x, 0.0)$, point $K_r$ $((0.2824a-12.367)$ $r^2+(0.0235a-1.0306)$ $r+(-0.5529a+40.119)$, $(1.1294a-49.468)$ $r+(-0.5647a+24.734)$, 100−a−x−y), point $B_r$ (0.0, $(-0.00279a^2+0.1483a-2.5871)$ $r^2+$ $(0.00277a^2-0.1588a-8.822)$ $r+(0.00327a^2-1.3169a+67.421)$, 100−a−y), and point O (0.0, 100−a, 0.0), or on the straight lines $JK_r$ and $K_rB_r$ (excluding point J and point $B_r$);

if $35.3 < a \le 43.8$, and $v < r \le 1$, coordinates (x,y,z) in the ternary composition diagram are within the range of a figure surrounded by straight lines $JK_r$, $K_rA_r$, $A_rB_r$, $B_rO$, and OJ that connect the following 5 points:

point J $(-0.00542a^2+0.3598a+24.08, 100-a-x, 0.0)$, point $K_r$ $((0.2588a-12.336)$ $r^2+(-0.5294a+29.488)$ $r+(0.0706a+12.808)$, 0.0, 100−a−x)), point $A_r$ $((-0.00946a^2+0.6769a-13.119)$ $r^2+(0.01143a^2-0.846a+4.9102)$ $r+(0.00584a^2-1.5915a+74.4)$, 0.0, 100−a−x), point $B_r$ (0.0, $(-0.00279a^2+0.1483a-2.5871)$ $r^2+$ $(0.00277a^2-0.1588a-8.822)$ $r+(0.00327a^2-1.3169a+67.421)$, 100−a−y), and point O (0.0, 100−a, 0.0), or on the straight lines $JK_r$, $K_rA_r$, and $A_rB_r$ (excluding point J, point $A_r$, and point $B_r$); and if $43.8 < a \le 47.8$, coordinates (x,y,z) in the ternary composition diagram are within the range of a figure surrounded by straight lines $JK_r$, $K_rA_r$, $A_rB_r$, $B_rO$, and OJ that connect the following 5 points:

point J $(-0.1a+33.78, 100-a-x, 0.0)$, point $K_r$ $(-r^2+(-0.2a+15.06)$ $r+15.9$, 0.0, 100−a−x), point $A_r$ $(-1.6r^2+(0.05a-12.39)$ $r+(-1.075a+62.985)$, 0.0, 100−a−x), point $B_r$ (0.0, $(3.8a-167.84)$ $r^2+(-3.8a+155.94)$ $r+(-1.025a+60.895)$, 100−a−y), and point O (0.0, 100−a, 0.0), or on the straight lines $JK_r$, $K_rA_r$, and $A_rB_r$ (excluding point J, point $A_r$, and point $B_r$).

5. A refrigerating machine comprising the composition according to claim 1 as a working fluid.

6. A method for operating a refrigerating machine, comprising the step of circulating the composition according to claim 1 as a working fluid in a refrigerating machine.

7. A method for operating a refrigerating machine, comprising the step of circulating the composition according to claim 1 as a working fluid in a refrigerating machine, wherein the composition is an alternative refrigerant for R410A.

8. A refrigerating machine comprising the composition according to claim 2 as a working fluid.

9. A method for operating a refrigerating machine, comprising the step of circulating the composition according to claim 2 as a working fluid in a refrigerating machine.

10. A method for operating a refrigerating machine, comprising the step of circulating the composition according to claim 2 as a working fluid in a refrigerating machine, wherein the composition is an alternative refrigerant for R410A.

11. A refrigerating machine comprising the composition according to claim 3 as a working fluid.

12. A method for operating a refrigerating machine, comprising the step of circulating the composition according to claim 3 as a working fluid in a refrigerating machine.

13. A method for operating a refrigerating machine, comprising the step of circulating the composition according to claim 3 as a working fluid in a refrigerating machine, wherein the composition is an alternative refrigerant for R410A.

14. A refrigerating machine comprising the composition according to claim 4 as a working fluid.

15. A method for operating a refrigerating machine, comprising the step of circulating the composition according to claim 4 as a working fluid in a refrigerating machine.

16. A method for operating a refrigerating machine, comprising the step of circulating the composition according to claim 4 as a working fluid in a refrigerating machine, wherein the composition is an alternative refrigerant for R410A.

* * * * *